United States Patent
Mitsutani et al.

(10) Patent No.: US 10,858,967 B2
(45) Date of Patent: Dec. 8, 2020

(54) VALVE TIMING ADJUSTMENT DEVICE AND CHECK VALVE

(71) Applicant: DENSO CORPORATION, Kariya (JP)

(72) Inventors: Tetsuro Mitsutani, Kariya (JP); Jing Xu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/502,404

(22) Filed: Jul. 3, 2019

(65) Prior Publication Data

US 2019/0323389 A1 Oct. 24, 2019

Related U.S. Application Data

(63) Continuation of application No. PCT/JP2018/001387, filed on Jan. 18, 2018.

(30) Foreign Application Priority Data

Jan. 19, 2017 (JP) .................................. 2017-007516
Dec. 22, 2017 (JP) .................................. 2017-246489

(51) Int. Cl.
*F01L 1/344* (2006.01)
*F15B 15/12* (2006.01)
(Continued)

(52) U.S. Cl.
CPC .......... *F01L 1/3442* (2013.01); *F15B 13/027* (2013.01); *F15B 13/0402* (2013.01);
(Continued)

(58) Field of Classification Search
CPC ........... F01L 1/3442; F01L 2001/34423; F01L 2001/34426; F01L 2001/3443;
(Continued)

(56) References Cited

U.S. PATENT DOCUMENTS

| 7,600,531 B2 * | 10/2009 | Patze ..................... F16K 15/142 137/512.15 |
| 2009/0133652 A1 * | 5/2009 | Fujyoshi ............. F01L 1/34409 123/90.17 |

(Continued)

FOREIGN PATENT DOCUMENTS

| JP | 58-183985 | 12/1983 |
| JP | 2015-129564 | 7/2015 |

(Continued)

OTHER PUBLICATIONS

U.S. Appl. No. 16/502,333 of Mitsutani, filed Jul. 3, 2019 (57 pages).

(Continued)

*Primary Examiner* — Jorge L Leon, Jr.
(74) *Attorney, Agent, or Firm* — Nixon & Vanderhye P.C.

(57) ABSTRACT

When a supply check valve is opened, the supply check valve enables a flow of oil from an oil supply source toward a pressure accumulation space. When the supply check valve is closed, the supply check valve limits a flow of the oil from the pressure accumulation space toward the oil supply source. When a recycle check valve is opened, the recycle check valve enables a flow of the oil from a retard chamber or an advance chamber toward the pressure accumulation space. When the recycle check valve is closed, the recycle check valve limits a flow of the oil from the pressure accumulation space toward the retard chamber or the advance chamber. A characteristic of the supply check valve with respect to valve opening of the supply check valve is different from a characteristic of the recycle check valve with respect to valve opening of the recycle check valve.

16 Claims, 23 Drawing Sheets

(51) Int. Cl.
*F15B 13/02* (2006.01)
*F16K 15/18* (2006.01)
*F16K 11/07* (2006.01)
*F15B 13/04* (2006.01)

(52) U.S. Cl.
CPC .............. *F15B 15/12* (2013.01); *F16K 11/07* (2013.01); *F16K 15/185* (2013.01); *F01L 2001/34426* (2013.01)

(58) Field of Classification Search
CPC ... F01L 2001/34433; F01L 2001/34479; F01L 1/46; F16K 15/185
USPC ...................................................... 123/90.17
See application file for complete search history.

(56) References Cited

U.S. PATENT DOCUMENTS

| 2009/0241878 A1* | 10/2009 | Yamaguchi | F01L 1/3442 123/90.17 |
|---|---|---|---|
| 2011/0247576 A1 | 10/2011 | Knecht et al. | |
| 2012/0042843 A1 | 2/2012 | Kubota et al. | |
| 2015/0369092 A1* | 12/2015 | Parker | F01L 1/3442 123/90.12 |
| 2016/0024978 A1* | 1/2016 | Lichti | F01L 1/3442 123/90.15 |
| 2016/0201822 A1* | 7/2016 | Takada | F16K 15/16 251/129.15 |
| 2017/0130618 A1* | 5/2017 | Haltiner, Jr. | F01L 1/3442 |
| 2018/0355766 A1* | 12/2018 | Leblay | F01L 1/053 |

FOREIGN PATENT DOCUMENTS

| WO | 2018/135573 | 7/2018 |
|---|---|---|
| WO | 2018/135577 | 7/2018 |
| WO | 2018/135586 | 7/2018 |
| WO | 2018/164022 | 9/2018 |
| WO | 2018/194076 | 10/2018 |

OTHER PUBLICATIONS

U.S. Appl. No. 16/502,361 of Mitsutani, filed Jul. 3, 2019 (52 pages).
U.S. Appl. No. 16/502,376 of Mitsutani, filed Jul. 3, 2019 (35 pages).
U.S. Appl. No. 16/542,460 of Mitsutani, filed Aug. 16, 2019 (66 pages).
U.S. Appl. No. 16/555,122 of Mitsutani, filed Aug. 29, 2019 (61 pages).

* cited by examiner

VALVE TIMING ADJUSTMENT DEVICE AND CHECK VALVE

CROSS REFERENCE TO RELATED APPLICATIONS

This application is a continuation application of International Patent Application No. PCT/JP2018/001387 filed on Jan. 18, 2018, which designated the U.S. and claims the benefit of priority from Japanese Patent Application No. 2017-7516 filed on Jan. 19, 2017 and Japanese Patent Application No. 2017-246489 filed on Dec. 22, 2017. The entire disclosures of all of the above applications are incorporated herein by reference.

TECHNICAL FIELD

The present disclosure relates to a valve timing adjustment device and a check valve.

BACKGROUND

There is known a valve timing adjustment device that is installed in a drive force transmission path for transmitting a drive force from a drive shaft to a driven shaft of an internal combustion engine and adjusts a valve timing of an intake valve or an exhaust valve that is driven to open and close by the driven shaft. In a case where the valve timing adjustment device is a hydraulic type, the valve timing adjustment device includes: a housing that is rotated synchronously with one of the drive shaft and the driven shaft; and a vane rotor that is fixed to an end portion of the other one of the drive shaft and the driven shaft. The valve timing adjustment device rotates the vane rotor in an advancing direction or a retarding direction relative to the housing by supplying hydraulic oil to one of a primary hydraulic chamber and a secondary hydraulic chamber defined by the vane rotor in the inside of the housing. The hydraulic oil is supplied through a passage change valve.

SUMMARY

According to one aspect of the present disclosure, there is provided a valve timing adjustment device that is configured to be installed in a drive force transmission path for transmitting a drive force from a drive shaft to a driven shaft of an internal combustion engine and is configured to adjust a valve timing of a valve that is driven to open and close by the driven shaft. The valve timing adjustment device includes a supply check valve and a recycle check valve. The supply check valve is configured to enable a flow of hydraulic oil from a hydraulic oil supply source toward a pressure accumulation space through one or more supply passages at a time of opening the supply check valve and is configured to limit a flow of the hydraulic oil from the pressure accumulation space toward the hydraulic oil supply source through the one or more supply passages at a time of closing the supply check valve. The recycle check valve is configured to enable a flow of the hydraulic oil from one or more primary hydraulic chambers or one or more secondary hydraulic chambers toward the pressure accumulation space through one or more recycle passages at a time of opening the recycle check valve and is configured to limit a flow of the hydraulic oil from the pressure accumulation space toward the one or more primary hydraulic chambers or the one or more secondary hydraulic chambers through the one or more recycle passages at a time of closing the recycle check valve.

According to another aspect of the present disclosure, there is provided a check valve that is configured to be installed at an inside of a tubular member, which is shaped in a tubular form and includes one or more inflow holes that communicate between an outer peripheral wall and an inner peripheral wall of the tubular member. The check valve is configured to enable a flow of fluid toward the inside of the tubular member through the one or more inflow holes and is configured to limit a flow of the fluid from the inside of the tubular member toward the one or more inflow holes. The check valve includes a valve main body that is made of a single plate material that is rolled and is thereby shaped in a tubular form.

BRIEF DESCRIPTION OF DRAWINGS

The present disclosure, together with additional objectives, features and advantages thereof, will be best understood from the following description in view of the accompanying drawings.

DETAILED DESCRIPTION

Figure 1:
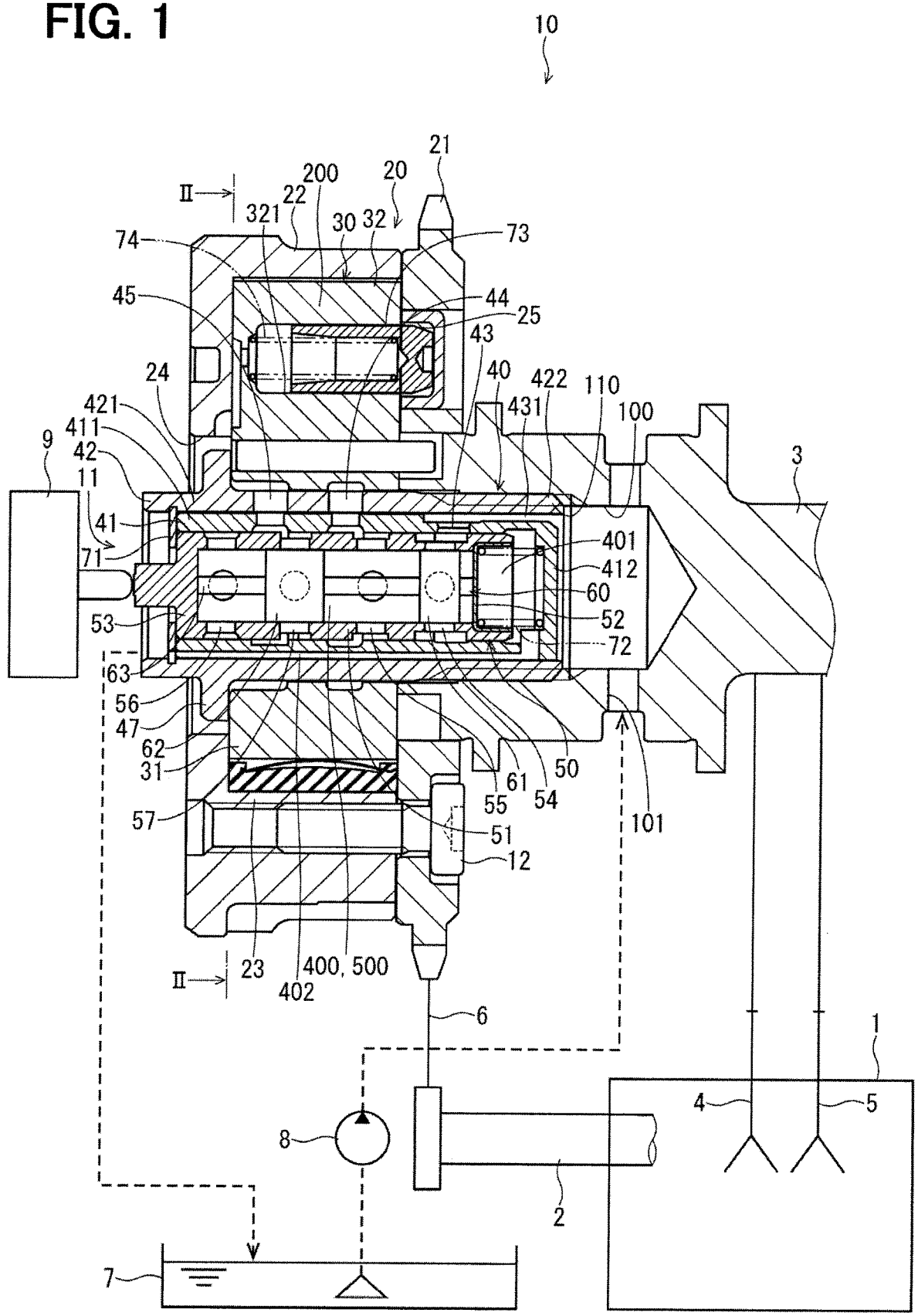
FIG. 1 is a cross-sectional view illustrating a valve timing adjustment device according to a first embodiment.

In a previously proposed valve timing adjustment device, a spool of a passage change valve includes: a supply passage that is configured to supply hydraulic oil to a pressure accumulation space located at an inside of the spool; and a recycle passage that is configured to connect between the pressure accumulation space and a primary hydraulic chamber or a secondary hydraulic chamber. The recycle passage enables reuse of the hydraulic oil discharged from the primary hydraulic chamber and the secondary hydraulic chamber. A supply check valve is placed on a radially inner side of the spool. The supply check valve enables a flow of the hydraulic oil from the hydraulic oil supply source toward the pressure accumulation space through the supply passage and limits a flow of the hydraulic oil from the pressure accumulation space toward the hydraulic oil supply source through the supply passage. Thereby, it is possible to limit a backflow of the hydraulic oil from the pressure accumulation space toward the hydraulic oil supply source. Moreover, a recycle check valve is placed on the radially inner side of the spool to correspond with the recycle passage. The recycle check valve enables a flow of the hydraulic oil from the primary hydraulic chamber or the secondary hydraulic chamber toward the pressure accumulation space through the recycle passage and limits a flow of the hydraulic oil from the pressure accumulation space toward the primary hydraulic chamber or the secondary hydraulic chamber through the recycle passage. This can limit a backflow of the hydraulic oil from the pressure accumulation space toward the primary hydraulic chamber or the secondary hydraulic chamber through the recycle passage.

In view of the pressure loss and the response time, a characteristic of the supply check valve with respect to valve opening of the supply check valve, which needs to be prioritized, is different from a characteristic of the recycle check valve with respect to valve opening of the recycle check valve, which needs to be prioritized. However, in the previously proposed valve timing adjustment device, the characteristic of the supply check valve with respect to the valve opening of the supply check valve and the characteristic of the recycle check valve with respect to the valve opening of the recycle check valve are not taken into consideration. Therefore, a valve opening pressure of the supply check valve may possibly be set to be the same as a valve opening pressure of the recycle check valve. As a result, if the supply check valve has a characteristic of that the valve opening pressure of the supply check valve is set to be higher than an appropriate value, and thereby valve opening of the supply check valve is difficult, a pressure loss of the hydraulic oil at the time of passing through the supply check valve is increased. Thus, there is a possibility of increasing the pressure loss of the hydraulic oil to be supplied to each hydraulic chamber. Furthermore, if the recycle check valve has a characteristic of that the valve opening pressure of the recycle check valve is set to be higher than an appropriate value, and thereby the valve opening of the recycle check valve is easy, the recycle check valve cannot follow positive and negative cam torque fluctuations in a high frequency range at the time of high speed rotation of the valve timing adjustment device. Thus, there is a possibility of deteriorating responsiveness of the valve timing adjustment device.

Furthermore, there has been proposed a check valve that is installed at an inside of a tubular member that is shaped in a tubular form and has an inflow hole, which communicates between an outer peripheral wall and an inner peripheral wall of the tubular member. The check valve enables a flow of fluid toward the inside of the tubular member through the inflow hole and limits a flow of the fluid from the inside of the tubular member toward the inflow hole. Here, the check valve includes a valve main body that is shaped in a tubular form by rolling a single plate material. The valve main body has a constant curvature along an entire extent of the valve main body that is from an inner end of the valve main body, which is one circumferential end of the valve main body, to an outer end of the valve main body, which is the other circumferential end of the valve main body. Thus, when the check valve is radially inwardly deformed to shrink and is opened at the inside of the tubular member by the flow of the fluid applied from the inflow hole, the inner end acts as a support point, and a large stress may possibly be generated due to a bias of a load at a location that is circumferentially displaced from the inner end by about 90°. This may lead to deformation or damage of the check valve.

According to a first aspect of the present disclosure, there is provided a valve timing adjustment device that is configured to be installed in a drive force transmission path for transmitting a drive force from a drive shaft to a driven shaft of an internal combustion engine and is configured to adjust a valve timing of a valve that is driven to open and close by the driven shaft. The valve timing adjustment device includes a housing, a vane rotor, a sleeve, a spool, a supply check valve and a recycle check valve.

One of the drive shaft and the driven shaft is defined as a first shaft while the other one of the drive shaft and the driven shaft is defined as a second shaft. The housing is configured to be rotated synchronously with the first shaft. The housing is configured to be fitted to an end portion of the second shaft and is configured to be rotatably supported by the second shaft.

The vane rotor is configured to be fixed to the end portion of the second shaft and includes one or more vanes that partition an inside space of the housing into one or more primary hydraulic chambers and one or more secondary hydraulic chambers while each of the one or more primary hydraulic chambers is located on one side of a corresponding one of the one or more vanes in a circumferential direction, and each of the one or more secondary hydraulic chambers is located on the other side of the corresponding one of the one or more vanes in the circumferential direction. The vane rotor is configured to be rotated relative to the housing depending on a pressure of hydraulic oil supplied from a hydraulic oil supply source to the one or more primary hydraulic chambers and a pressure of the hydraulic oil supplied from the hydraulic oil supply source to the one or more secondary hydraulic chambers.

The sleeve is shaped in a tubular form. The sleeve includes: one or more supply ports, which are communicated with the hydraulic oil supply source; one or more primary control ports, which are communicated with the one or more primary hydraulic chambers; and one or more secondary control ports, which are communicated with the one or more secondary hydraulic chambers.

The spool is shaped in a tubular form and is configured to reciprocate in an axial direction at an inside of the sleeve. The spool includes: a pressure accumulation space, which is formed at an inside of the spool; one or more supply passages, which are configured to connect the pressure accumulation space to the one or more supply ports; one or more control passages, which are configured to connect the pressure accumulation space to the one or more primary control ports or the one or more secondary control ports; and one or more recycle passages, which are configured to connect the pressure accumulation space to the one or more primary control ports or the one or more secondary control ports. The one or more recycle passages enable reuse of the hydraulic oil discharged from the one or more primary hydraulic chambers and the one or more secondary hydraulic chambers.

The supply check valve is configured to enable a flow of the hydraulic oil from the hydraulic oil supply source toward the pressure accumulation space through the one or more supply passages at a time of opening the supply check valve and is configured to limit a flow of the hydraulic oil from the pressure accumulation space toward the hydraulic oil supply source through the one or more supply passages at a time of closing the supply check valve. Thereby, it is possible to limit a backflow of the hydraulic oil from the pressure accumulation space toward the hydraulic oil supply source. In this way, in the state where the supply pressure of the hydraulic oil supply source is low, it is possible to limit the flow of the hydraulic oil from the passage change valve toward the hydraulic oil supply source.

The recycle check valve is configured to enable a flow of the hydraulic oil from the one or more primary hydraulic chambers or the one or more secondary hydraulic chambers toward the pressure accumulation space through the one or more recycle passages at a time of opening the recycle check valve and is configured to limit a flow of the hydraulic oil from the pressure accumulation space toward the one or more primary hydraulic chambers or the one or more secondary hydraulic chambers through the one or more recycle passages at a time of closing the recycle check valve. Thereby, it is possible to limit a backflow of the hydraulic oil from the pressure accumulation space toward the one or more primary hydraulic chambers or the one or more secondary hydraulic chambers. As a result, the responsiveness of the valve timing adjustment device can be increased by the structure that enables the reuse of the hydraulic oil.

In the present disclosure, a characteristic of the supply check valve with respect to valve opening of the supply check valve is different from a characteristic of the recycle check valve with respect to valve opening of the recycle check valve. When the characteristic of the supply check valve is set in view of a degree of the pressure loss in such a manner that the valve opening pressure of the supply check valve is relatively low, and thereby the supply check valve can be easily opened, the pressure loss of the hydraulic oil at the time of passing through the supply check valve is reduced, and thereby the pressure loss of the hydraulic oil supplied to each hydraulic chamber can be reduced. Moreover, when the characteristic of the recycle check valve is set in view of followability of the recycle check valve in such a manner that the valve opening pressure of the recycle check valve is relatively high, and thereby the recycle check valve cannot be easily opened, the recycle check valve can follow positive and negative cam torque fluctuations in a high frequency range at the time of high speed rotation of the valve timing adjustment device, and thereby responsiveness of the valve timing adjustment device can be improved.

According to a second aspect of the present disclosure, there is provided a check valve that is configured to be installed at an inside of a tubular member, which is shaped in a tubular form and includes one or more inflow holes that communicate between an outer peripheral wall and an inner peripheral wall of the tubular member. The check valve is configured to enable a flow of fluid toward the inside of the tubular member through the one or more inflow holes and is configured to limit a flow of the fluid from the inside of the tubular member toward the one or more inflow holes. The check valve includes a valve main body. The valve main body is made of a single plate material that is rolled and is thereby shaped in a tubular form.

In a free state of the check valve, the valve main body includes: a constant curvature portion that has a curvature, which is constant. The constant curvature portion is placed at a specific portion of the valve main body that is located between an inner end, which is one end of the valve main body in a circumferential direction, and an outer end, which is another end of the valve main body in the circumferential direction; and a small curvature portion that has a curvature, which is smaller than the curvature of the constant curvature portion. The small curvature portion is placed at another portion of the valve main body that is other than the constant curvature portion in the circumferential direction. Accordingly, the timing of starting the deformation of the inner end side portion of the valve main body can be delayed relative to the timing of starting the deformation of the outer end side portion of the valve main body when the check valve is radially inwardly deformed to shrink and is opened at the inside of the tubular member by the flow of the fluid applied from the inflow hole. Therefore, it is possible to limit the phenomenon, in which the inner end acts as the support point, and the stress caused by the bias of the load is generated at the location that is circumferentially displaced from the inner end by about 90°. As a result, deformation or the damage of the check valve can be limited.

Hereinafter, a valve timing adjustment device according to various embodiments of the present disclosure will be described with reference to the drawings. Components, which are substantially the same in the embodiments, are denoted by the same reference signs and will not be described redundantly.

First Embodiment

FIG. 1 illustrates a valve timing adjustment device according to a first embodiment of the present disclosure. The valve timing adjustment device 10 changes a rotational phase of a camshaft 3 relative to a crankshaft 2 of an engine 1 (serving as an internal combustion engine), so that the valve timing adjustment device 10 adjusts a valve timing of intake valves 4 among the intake valves 4 and exhaust valves 5 driven to open and close by the camshaft 3. The valve timing adjustment device 10 is installed in a drive force transmission path that extends from the crankshaft 2 to the camshaft 3. The crankshaft 2 corresponds to a drive shaft. The camshaft 3 corresponds to a driven shaft.

The structure of the valve timing adjustment device 10 will be described with reference to FIGS. 1 and 2.

The valve timing adjustment device 10 includes a housing 20, a vane rotor 30, and a passage change valve 11.

The housing 20 includes a sprocket 21 and a case 22. The sprocket 21 is fitted to an end portion of the camshaft 3. The camshaft 3 rotatably supports the sprocket 21. A chain 6 is wound around the sprocket 21 and the crankshaft 2. The sprocket 21 is rotated synchronously with the crankshaft 2. The case 22 is shaped in a bottomed tubular form. The case 22 is fixed to the sprocket 21 by bolts 12 while an opening end of the case 22 contacts the sprocket 21. The case 22 forms a plurality of partition wall portions 23 that inwardly project in the radial direction. An opening 24 is formed at a center of a bottom of the case 22 such that the opening 24 opens to a space, which is located at the outside of the case 22. The opening 24 is located on an opposite side of the vane rotor 30, which is opposite to the camshaft 3.

The vane rotor 30 has a boss 31 and a plurality of vanes 32. The boss 31 is shaped in a tubular form and is fixed to the end portion of the camshaft 3. Each of the vanes 32 outwardly projects from the boss 31 in the radial direction and is placed between corresponding adjacent two of the partition wall portions 23. An inside space 200 of the housing 20 is divided into retard chambers 201 and advance chambers 202 by the vanes 32. Each of the retard chambers 201 corresponds to a primary hydraulic chamber and is positioned on one side of the corresponding vane 32 in the circumferential direction. Each of the advance chambers 202 corresponds to a secondary hydraulic chamber and is positioned on the other side of the corresponding vane 32 in the circumferential direction. The vane rotor 30 rotates relative to the housing 20 in a retarding direction or an advancing direction according to an oil pressure in the respective retard chambers 201 and an oil pressure in the respective advance chambers 202.

The passage change valve 11 has a sleeve 40, a spool 50 and a check valve 60.

The sleeve 40 has an inner sleeve 41, an outer sleeve 42, a plurality of supply ports 43, a plurality of primary control ports 44, a plurality of secondary control ports 45 and a retaining portion 47.

The inner sleeve 41 is made of metal, such as aluminum, which has relatively low hardness. The inner sleeve 41 has a sleeve tube 411 and a sleeve bottom 412. The sleeve tube 411 is shaped in a substantially cylindrical tubular form. The sleeve bottom 412 is integrally formed with the sleeve tube 411 in one piece such that the sleeve bottom 412 closes one end of the sleeve tube 411.

The outer sleeve 42 is made of metal, such as iron. The outer sleeve 42 has a sleeve tube 421 and a threaded portion 422. The sleeve tube 421 is shaped in a substantially cylindrical tubular form. The threaded portion 422 is formed at an outer wall of one end portion of the sleeve tube 421.

The inner sleeve 41 is placed at an inside of the outer sleeve 42 such that the sleeve bottom 412 faces the threaded portion 422. An outer wall of the inner sleeve 41 is fitted to an inner wall of the outer sleeve 42. An inside space 400, which is shaped in a substantially cylindrical tubular form, is formed at an inside of the sleeve tube 411 of the inner sleeve 41 placed at the inside of the sleeve tube 421 of the outer sleeve 42.

Each of the supply ports 43 is formed such that the supply port 43 connects between the outer wall and an inner wall of the sleeve tube 411 of the inner sleeve 41. The outer wall of an end portion of the sleeve tube 411 of the inner sleeve 41, which is located on the sleeve bottom 412 side, is partially cut in the circumferential direction. As a result, a cut-out passage 431 is formed between the sleeve tube 411 and the sleeve tube 421. The inside space 400 is communicated with the space at the outside of the sleeve 40 through the supply ports 43 and the cut-out passage 431.

Each of the primary control ports 44 is formed such that the primary control port 44 connects between the outer wall of the sleeve tube 421 of the outer sleeve 42 and the inner wall of the sleeve tube 411 of the inner sleeve 41. The plurality of primary control ports 44 is arranged one after the other in the circumferential direction of the sleeve 40.

Each of the secondary control ports 45 is formed such that the secondary control port 45 connects between the outer wall of the sleeve tube 421 of the outer sleeve 42 and the inner wall of the sleeve tube 411 of the inner sleeve 41. The plurality of secondary control ports 45 is arranged one after the other in the circumferential direction of the sleeve 40.

The supply ports 43, the primary control ports 44 and the secondary control ports 45 are arranged in this order at predetermined intervals from one end side to the other end side of the sleeve 40.

The retaining portion 47 is shaped in a ring form and radially outwardly projects from the outer wall of the other end portion of the sleeve tube 421.

A shaft hole 100 and a plurality of supply holes 101 are formed at an end portion of the camshaft 3 located on the valve timing adjustment device 10 side. The shaft hole 100 is formed to extend in an axial direction of the camshaft 3 from a center part of an end surface of the camshaft 3 while the end surface of the camshaft 3 is located on the valve timing adjustment device 10 side. Each of the supply holes 101 is formed such that the supply hole 101 inwardly extends from an outer wall of the camshaft 3 in the radial direction and is communicated with the shaft hole 100.

A shaft-side threaded portion 110 is formed at an inner wall of the shaft hole 100 of the camshaft 3 to threadably engage with the threaded portion 422 of the outer sleeve 40.

The sleeve 40 is inserted through the inside of the boss 31 of the vane rotor 30 and is fixed to the camshaft 3 such that the threaded portion 422 of the sleeve 40 is engaged with the shaft-side threaded portion 110 of the camshaft 3. At this time, the retaining portion 47 of the sleeve 40 retains an end surface of the boss 31 of the vane rotor 30, which is opposite to the camshaft 3. In this way, the vane rotor 30 is fixed to the camshaft 3 such that the vane rotor 30 is held between the camshaft 3 and the retaining portion 47. The sleeve 40 is thus installed to the center of the vane rotor 30.

An oil pump 8 is connected to the supply holes 101. The oil pump 8 suctions the hydraulic oil stored in the oil pan 7 and supplies the suctioned hydraulic oil to the supply holes 101. As a result, the hydraulic oil flows into the shaft hole 100. Here, the oil pump 8 corresponds to a hydraulic oil supply source.

The hydraulic oil, which is supplied to the shaft hole 100, is conducted to the inside space 400 through the cut-out passage 431 and the supply ports 43.

In a state where the sleeve 40 is installed at the center of the vane rotor 30, the primary control ports 44 are communicated with the retard chambers 201 through retard passages 301 formed at the boss 31. Furthermore, the secondary control ports 45 are communicated with the advance chambers 202 through advance passages 302 formed at the boss 31.

The spool 50 has a spool tube 51, a spool cover 52, a spool bottom 53, a plurality of supply passages 54, a plurality of primary control passages 55, a plurality of secondary control passages 56 and a plurality of recycle passages 57. The primary control passages 55 and the secondary control passages 56 serve as control passages.

The spool tube 51 is shaped in a substantially cylindrical tubular form. The spool cover 52 is formed such that the spool cover 52 closes one end of the spool tube 51. In the present embodiment, the spool cover 52 is formed separately from the spool tube 51. The spool bottom 53 is formed integrally with the spool tube 51 in one piece such that the spool bottom 53 closes the other end of the spool tube 51. A pressure accumulation space 500, which is shaped in a substantially cylindrical tubular form, is formed by an inner wall of the spool tube 51, the spool cover 52 and the spool bottom 53.

Each of the supply passages 54 is formed such that the supply passage 54 connects between the inner wall of the spool tube 51 and an annular recess, which is formed at an outer wall of the spool tube 51. In the present embodiment, the number of the supply passages 54 is four, and these four supply passages 54 are arranged one after the other at equal intervals in the circumferential direction of the spool 50. An inner diameter of each supply passage 54 is set to be equal to an inner diameter of the other supply passages 54.

Each of the primary control passages 55 is formed such that the primary control passage 55 connects between the inner wall of the spool tube 51 and an annular recess, which is formed at the outer wall of the spool tube 51. In the present embodiment, the number of the primary control passages 55 is four, and these primary control passages 55 are arranged one after the other at equal intervals in the circumferential direction of the spool 50.

Each of the secondary control passages 56 is formed such that the secondary control passage 56 connects between the inner wall of the spool tube 51 and an annular recess, which is formed at the outer wall of the spool tube 51. In the present embodiment, the number of the secondary control passages 56 is four, and these secondary control passages 56 are arranged one after the other at equal intervals in the circumferential direction of the spool 50.

Each of the recycle passages 57 is formed such that the recycle passage 57 connects between the inner wall of the spool tube 51 and an annular recess, which is formed at the outer wall of the spool tube 51. In the present embodiment, the number of the recycle passages 57 is four, and these four recycle passages 57 are arranged one after the other at equal intervals in the circumferential direction of the spool 50. An inner diameter of each recycle passage 57 is set to be equal to an inner diameter of the other recycle passages 57. Moreover, the inner diameter of each recycle passage 57 is set to be equal to the inner diameter of each supply passage 54. Therefore, a total passage cross sectional area of the recycle passages 57 is equal to a total passage cross sectional area of the supply passages 54.

The supply passages 54, the primary control passages 55, the recycle passages 57 and the secondary control passages 56 are arranged in this order at predetermined intervals from one end side to the other end side of the spool 50.

The spool 50 is provided at the inside of the sleeve 40, i.e., at the inside space 400 such that the spool cover 52 faces the sleeve bottom 412. The spool 50 can reciprocate in the axial direction at the inside space 400.

A retaining portion 71 is located on a side of the spool tube 51 that is away from the sleeve bottom 412. The retaining portion 71 is shaped in a ring form, and an outer periphery of the retaining portion 71 is fitted to the inner wall of the outer sleeve 42. The retaining portion 71 can hold the end part of spool tube 51, which is opposite to the spool bottom 53. In this way, removable of the spool 50 toward the side away from the sleeve bottom 412 is limited.

The spool 50 forms a variable volume space 401 between the spool cover 52 and the sleeve bottom 412 at the inside space 400 of the sleeve 40. A volume of the variable volume space 401 changes when the spool 50 is moved in the axial direction.

A spring 72 is installed between the spool cover 52 and the sleeve bottom 412. The spring 72 urges the spool 50 toward the retaining portion 71. In this way, the spool 50 is urged against the retaining portion 71.

A linear solenoid 9 is located on the opposite side of the spool 50, which is opposite to the camshaft 3. When the linear solenoid 9 is energized, the linear solenoid 9 urges the spool 50 toward the camshaft 3 against the urging force of the spring 72. As a result, the position of the spool 50 changes in the axial direction with respect to the sleeve 40. A movable range of the spool 50 extends from a position, at which the spool 50 contacts the retaining portion 71, to a position, at which the spool 50 contacts the sleeve bottom 412.

The supply passages 54 are communicated with the supply ports 43 regardless of the axial position of the spool 50 relative to the sleeve 40.

When the spool 50 is positioned to contact the retaining portion 71 (see FIG. 1), the primary control passages 55 are communicated with the primary control ports 44, and the secondary control ports 45 are communicated with the recycle passages 57. In this way, the oil pump 8 is connected to the retard chambers 201, and the advance chambers 202 are connected to the recycle passages 57.

When the spool 50 is positioned to contact the sleeve bottom 412, the secondary control passages 56 are communicated with the secondary control ports 45, and the primary control ports 44 are communicated with the recycle passages 57. In this way, the oil pump 8 is connected to the advance chambers 202, and the retard chambers 201 are connected to the recycle passages 57.

When the spool 50 is placed at an intermediate position between the retaining portion 71 and the sleeve bottom 412, the communications of the primary control passages 55, the recycle passages 57 and the secondary control passages 56 to the primary control ports 44 and the secondary control ports 45 are blocked. In this way, both of the retard chambers 201 and the advance chambers 202 are closed.

Figure 3A:
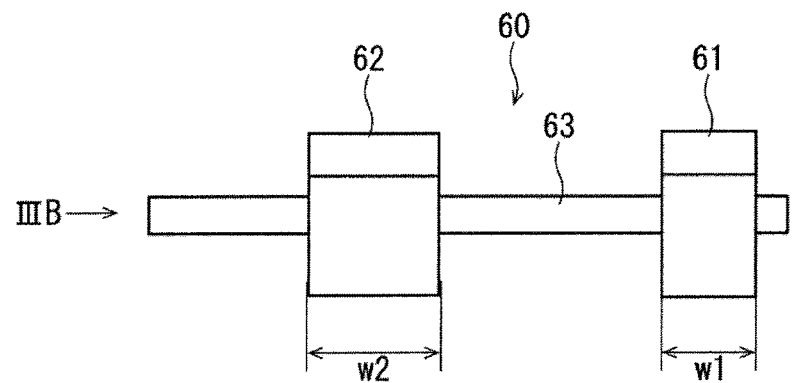
FIG. 3A is a view of a check valve of the valve timing adjustment device according to the first embodiment.
Figure 3B:
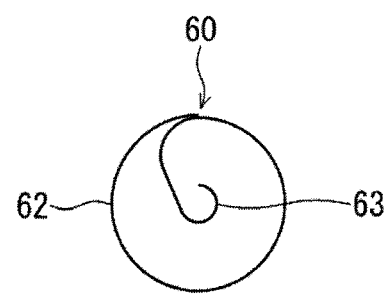
FIG. 3B is a view taken in a direction of an arrow IIIB in FIG. 3A.
Figure 3C:
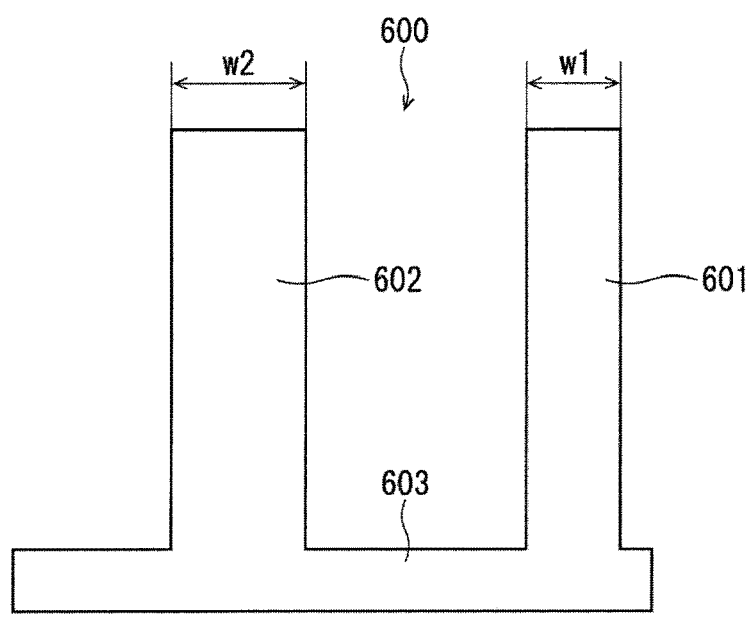
FIG. 3C is a developed view of the check valve.

As illustrated in FIGS. 3A to 3C, the check valve 60 has a supply check valve 61, a recycle check valve 62, and a shaft 63.

The check valve 60 is formed, for example, by rolling a thin plate 600 made of metal as illustrated in FIG. 3C. The thin plate 600 has a substantially uniform plate thickness.

The thin plate 600 has a supply check valve corresponding portion 601, a recycle check valve corresponding portion 602 and a shaft corresponding portion 603. The supply check valve corresponding portion 601, the recycle check valve corresponding portion 602, and the shaft corresponding portion 603 are respectively shaped in a rectangular plate form. The supply check valve corresponding portion 601 and the recycle check valve corresponding portion 602 are formed integrally with the shaft corresponding portion 603 in one piece such that each of the supply check valve corresponding portion 601 and the recycle check valve corresponding portion 602 projects from an elongated side of the shaft corresponding portion 603 in a transverse direction that is perpendicular to a longitudinal direction of the shaft corresponding portion 603. Here, a width of the supply check valve corresponding portion 601 is indicated by w1, and a width of the recycle check valve corresponding portion 602 is indicated by w2. The supply check valve corresponding portion 601 and the recycle check valve corresponding portion 602 are formed to satisfy a relationship of w1<w2 (see FIG. 3C). The check valve 60 is formed by rolling the shaft corresponding portion 603, the supply check valve corresponding portion 601 and the recycle check valve corresponding portion 602 in the transverse direction of the shaft corresponding portion 603.

The shaft 63 is shaped in a substantially cylindrical tubular form (see FIGS. 3A and 3B). The shaft 63 is formed such that the plate material, i.e., the shaft corresponding portion 603 does not have an overlapping portion, in which a part of the shaft corresponding portion 603 overlaps with another part of the shaft corresponding portion 603 in the circumferential direction.

The supply check valve 61 radially outwardly extends from the shaft 63 at a location around one end portion of the shaft 63 such that the supply check valve 61 is wound all around the shaft 63 and is thereby shaped in a substantially cylindrical tubular form (see FIGS. 3A and 3B). In this way, the supply check valve 61 is formed such that the supply check valve 61 is resiliently deformable in the radial direction. When the supply check valve 61 is radially inwardly deformed, an outer diameter of the supply check valve 61 is reduced. More specifically, the supply check valve 61 has an overlapping portion, in which a part of the plate material, i.e., the supply check valve corresponding portion 601 overlaps with another part of the supply check valve corresponding portion 601 in the circumferential direction. When a size of this overlapping portion is increased, it is radially inwardly deformed and thereby shrinks in the radial direction. In contrast, when the size of this overlapping portion is reduced, it is radially outwardly deformed and thereby expands in the radial direction. A space, which is formed at the inside of the supply check valve 61 shaped in the substantially cylindrical tubular form, is opened in the axial direction of the check valve 60.

The recycle check valve 62 radially outwardly extends from the shaft 63 such that the recycle check valve 62 is wound all around the shaft 63 and is thereby shaped in a substantially cylindrical tubular form (see FIGS. 3A and 3B). In this way, the recycle check valve 62 is formed such that the recycle check valve 62 is resiliently deformable in the radial direction. When the recycle check valve 62 is radially inwardly deformed, an outer diameter of the recycle check valve 62 is reduced. More specifically, the recycle check valve 62 has an overlapping portion, in which a part of the plate material, i.e., the recycle check valve corresponding portion 602 overlaps with another part of the recycle check valve corresponding portion 602 in the circumferential direction (see FIG. 3B). When a size of this overlapping portion is increased, it is radially inwardly deformed and thereby shrinks in the radial direction. In contrast, when the size of this overlapping portion is reduced, it is radially outwardly deformed and thereby expands in the radial direction. A space, which is formed at the inside of the recycle check valve 62 shaped in the substantially cylindrical tubular form, is opened in the axial direction of the check valve 60.

Here, the width of the supply check valve 61, i.e., the length of the supply check valve 61 measured in the axial direction is w1. The width of the recycle check valve 62, i.e., the length of the recycle check valve 62 measured in the axial direction is w2 (see FIGS. 3A and 3C). Therefore, the supply check valve 61 and the recycle check valve 62 are formed to satisfy the relationship of w1<w2. The supply check valve 61 is more easily deformable in the radial direction in comparison to the recycle check valve 62. Specifically, when the equal force is radially inwardly applied to both of the supply check valve 61 and the recycle check valve 62, the amount of deformation of the supply check valve 61 becomes larger than the amount of deformation of the recycle check valve 62.

The check valve 60 is installed at the pressure accumulation space 500 such that the supply check valve 61 corresponds to the supply passages 54, and the recycle check valve 62 corresponds to the recycle passages 57 (see FIG. 1). The shaft 63 is positioned between the spool cover 52 and the spool bottom 53 and supports the supply check valve 61 and the recycle check valve 62.

When the hydraulic oil flows from the oil pump 8 toward the pressure accumulation space 500 through the supply passages 54, an outer peripheral surface of the supply check valve 61 is radially inwardly urged by the hydraulic oil. Thus, the supply check valve 61 is radially inwardly deformed and is opened. Thereby, a gap is formed between the inner wall of the spool 50 and the supply check valve 61. As a result, the hydraulic oil can flow into the pressure accumulation space 500 through the supply passages 54. In contrast, when the hydraulic oil flows from the pressure accumulation space 500 toward the oil pump 8 through the supply passages 54, an inner peripheral surface of the supply check valve 61 is radially outwardly urged by the hydraulic oil. Thus, the supply check valve 61 is radially outwardly deformed and is thereby closed. Thereby, the supply check valve 61 is urged against the inner wall of the spool 50 to close the supply passages 54. In this way, the outflow of the hydraulic oil from the pressure accumulation space 500 to the outside of the spool 50 through the supply passages 54 is limited. Thus, the supply check valve 61 enables the flow of the hydraulic oil from the oil pump 8 to the pressure accumulation space 500 through the supply passages 54 and limits the flow of the hydraulic oil from the pressure accumulation space 500 to the oil pump 8 through the supply passages 54.

When the hydraulic oil flows from the retard chambers 201 or the advance chambers 202 toward the pressure accumulation space 500 through the recycle passages 57, an outer peripheral surface of the recycle check valve 62 is radially inwardly urged by the hydraulic oil. Thus, the recycle check valve 62 is radially inwardly deformed and is opened. Thereby, a gap is formed between the inner wall of the spool 50 and the recycle check valve 62. In this way, the hydraulic oil can flow into the pressure accumulation space 500 through the recycle passages 57. In contrast, when the hydraulic oil flows from the pressure accumulation space 500 toward retard chambers 201 or the advance chambers 202 through the recycle passages 57, an inner peripheral surface of the recycle check valve 62 is radially outwardly urged by the hydraulic oil. Thus, the recycle check valve 62 is radially outwardly deformed and is thereby closed. Thereby, the recycle check valve 62 is urged against the inner wall of the spool 50 to close the recycle passages 57. In this way, the outflow of the hydraulic oil from the pressure accumulation space 500 to the outside of the spool 50 through the recycle passages 57 is limited. Thus, the recycle check valve 62 enables the flow of the hydraulic oil from the retard chambers 201 or the advance chambers 202 toward the pressure accumulation space 500 through the recycle passages 57 and limits the flow of the hydraulic oil from the pressure accumulation space 500 toward the retard chambers 201 or the advance chambers 202 through the recycle passages 57.

As described above, the supply check valve 61 is more easily deformable in the radial direction in comparison to the recycle check valve 62. Furthermore, the total passage cross sectional area of the recycle passages 57 is equal to the total passage cross sectional area of the supply passages 54. Thus, a valve opening pressure of the supply check valve 61 is set to be lower than a valve opening pressure of the recycle check valve 62. In other words, a characteristic of the supply check valve 61 with respect to the valve opening of the supply check valve 61 is set such that the valve opening of the supply check valve 61 is easier than the valve opening of the recycle check valve 62.

In the present embodiment, the characteristic of the supply check valve 61 is set such that the valve opening pressure of the supply check valve 61 is relative low, and thereby the valve opening of the supply check valve 61 is relatively easy. Thus, a backflow of the hydraulic oil from the pressure accumulation space 500 to the oil pump 8 can be limited, and at the same time, a pressure loss of the hydraulic oil flowing from the oil pump 8 toward the pressure accumulation space 500 can be reduced.

When the valve timing adjustment device 10 is rotated at a high rotational speed, positive and negative cam torque fluctuations in a high frequency range are applied to the recycle check valve 62. Therefore, the recycle check valve 62 may not be able to follow the cam torque fluctuations. However, in the present embodiment, the characteristic of the recycle check valve 62 is set such that the valve opening pressure of the recycle check valve 62 is relatively high, and thereby the valve opening of the recycle check valve 62 is relatively difficult. Thus, a backflow of the hydraulic oil from the pressure accumulation space 500 toward the retard chambers 201 or the advance chambers 202 can be limited, and at the same time, the recycle check valve 62 can follow the cam torque fluctuations.

In the present embodiment, the sleeve 40 further includes a breathing hole 402.

The breathing hole 402 is radially inwardly recessed at the outer wall of the inner sleeve 41 and extends in the axial direction of the inner sleeve 41 (see FIG. 1). Specifically, the breathing hole 402 is formed between the inner sleeve 41 and the outer sleeve 42 on the outer side of the inside space 400. The breathing hole 402 enables communication between the variable volume space 401 and the outside (i.e., the atmosphere) of the valve timing adjustment device 10, which is a space opposite to the variable volume space 401 of the sleeve 40. As a result, the pressure in the variable volume space 401 can be made equal to the atmospheric pressure.

The passage change valve 11 is operable among a first operating state, a second operating state and a holding state by urging the spool 50 through the operation of the linear solenoid 9. In the first operating state, the oil pump 8 is connected to the retard chambers 201, and the advance chambers 202 are connected to the recycle passages 57. In the second operating state, the oil pump 8 is connected to the advance chambers 202, and the retard chambers 201 are connected to the recycle passages 57. In the holding state, the retard chambers 201 and the advance chambers 202 are both closed. In the first operating state, the hydraulic oil is supplied to the retard chambers 201, and the hydraulic oil is returned from the advance chambers 202 to the pressure accumulation space 500. In the second operating state, the hydraulic oil is supplied to the advance chambers 202, and the hydraulic oil is returned from the retard chambers 201 to the pressure accumulation space 500. In the holding state, the hydraulic oil in the retard chambers 201 and the hydraulic oil in the advance chambers 202 are retained.

Figure 2:
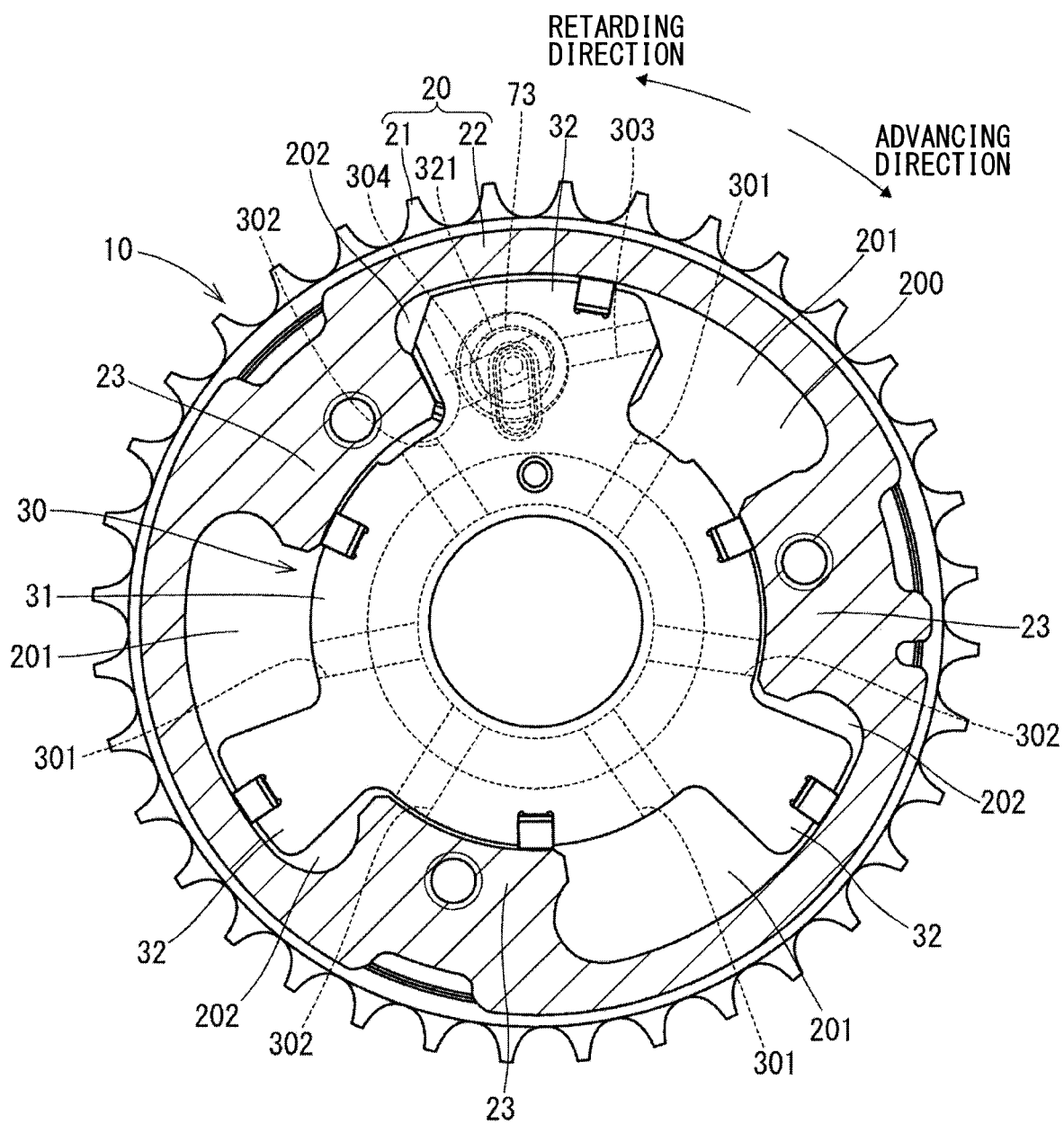
FIG. 2 is a cross-sectional view taken along line II-II in FIG. 1 and illustrating only a housing and a vane rotor.

The present embodiment is further provided with a lock pin 73 (see FIGS. 1 and 2). The lock pin 73 is shaped in a bottomed cylindrical tubular form. The lock pin 73 is received in a receiving hole 321 formed at the vane 32 in such a manner that the lock pin 73 can axially reciprocate in the receiving hole 321. A spring 74 is installed in an inside of the lock pin 73. The spring 74 urges the lock pin 73 toward the sprocket 21. A fitting recess 25 is formed at the sprocket 21 on the vane 32 side of the sprocket 21.

The lock pin 73 can be fitted into the fitting recess 25 when the vane rotor 30 is held at a most retarded position with respect to the housing 20. When the lock pin 73 is fitted into the fitting recess 25, relative rotation of the vane rotor 30 relative to the housing 20 is limited. On the other hand, when the lock pin 73 is not fitted into the fitting recess 25, the relative rotation of the vane rotor 30 relative to the housing 20 is enabled.

A pin control passage 303, which is communicated with a corresponding one of the retard chambers 201, is formed in the vane 32 at a location between the lock pin 73 and the retard chamber 201. Furthermore, a pin control passage 304, which is communicated with a corresponding one of the advance chambers 202, is formed in the vane 32 at a location between the lock pin 73 and the advance chamber 202 (see FIG. 2). The pressure of the hydraulic oil, which flows from the corresponding retard chamber 201 or the corresponding advance chamber 202 into the pin control passage 303, 304, is exerted in a removing direction for removing the lock pin 73 from the fitting recess 25 against the urging force of the spring 74.

In the valve timing adjustment device 10 constructed in the above-described manner, when the hydraulic oil is supplied to the retard chambers 201 or the advance chambers 202, the hydraulic oil flows into the pin control passage 303, 304. Thereby, the lock pin 73 is removed from the fitting recess 25, and thereby the relative rotation of the vane rotor 30 relative to the housing 20 is enabled.

The valve timing adjustment device 10 brings the passage change valve 11 into the first operating state when the rotational phase of the camshaft 3 is on the advance side of a target value. As a result, the vane rotor 30 undergoes relative rotation in the retarding direction relative to the housing 20, so that the rotational phase of the camshaft 3 shifts to the retard side.

The valve timing adjustment device 10 brings the passage change valve 11 into the second operating state when the rotational phase of the camshaft 3 is on the retard side of the target value. As a result, the vane rotor 30 undergoes relative rotation in the advancing direction relative to the housing 20, so that the rotational phase of the camshaft 3 shifts to the advance side.

The valve timing adjustment device 10 brings the passage change valve 11 into the holding state when the rotational phase of the camshaft 3 coincides with the target value. In this way, the rotational phase of the camshaft 3 is maintained.

In the present embodiment, the pressure of the variable volume space 401 is kept substantially equal to the atmospheric pressure through the breathing hole 402. Therefore, when the spool 50 is urged by the linear solenoid 9, the spool 50 can be smoothly reciprocated at the inside of the sleeve 40. When the hydraulic oil is accumulated in the variable volume space 401, the hydraulic oil flows to the outside (i.e., the atmosphere) of the valve timing adjustment device 10, which is the space located on the side of the passage change valve 11 that is opposite to the camshaft 3, through the breathing hole 402, and the hydraulic oil is then returned to the oil pan 7.

As described above, according to the present embodiment, there is provided the valve timing adjustment device 10 that is installed in the drive force transmission path for transmitting the drive force from the crankshaft 2 to the camshaft 3 of the engine 1 and adjusts the valve timing of the intake valves 4 that are driven to open and close by the camshaft 3. The valve timing adjustment device 10 includes the housing 20, the vane rotor 30, the sleeve 40, the spool 50, the supply check valve 61 and the recycle check valve 62.

It is now assumed that one of the crankshaft 2 and the camshaft 3 is defined as a first shaft, and the other one of the crankshaft 2 and the camshaft 3 is defined as a second shaft. In such a case, the housing 20 is rotated synchronously with the first shaft and is fitted to an end portion of the second shaft such that the housing 20 is rotatably supported by the second shaft.

The vane rotor 30 is fixed to the end portion of the second shaft. The vane rotor 30 includes the vanes 32, each of which partitions the inside space 200 of the housing 20 into the retard chamber 201, which is located on one side of the vane 32 in the circumferential direction, and the advance chamber 202, which is located on the other side of the vane 32 in the circumferential direction. The vane rotor 30 is rotated relative to the housing 20 depending on the pressure of hydraulic oil supplied from the oil pump 8 to the retard chambers 201 and the pressure of hydraulic oil supplied from the oil pump 8 to the advance chambers 202.

The sleeve 40 is shaped in a tubular form. The sleeve 40 includes: the supply ports 43, which are communicated with the oil pump 8; the primary control ports 44, which are communicated with the retard chambers 201; and the secondary control ports 45, which are communicated with the advance chambers 202.

The spool 50 is shaped in a tubular form and is configured to reciprocate in the axial direction at the inside of the sleeve 40. The spool 50 includes: the pressure accumulation space 500, which is formed at the inside of the spool 50; the supply passages 54, which are configured to connect the pressure accumulation space 500 to the supply ports 43; the primary control passages 55, which are configured to connect the pressure accumulation space 500 to the primary control ports 44; the secondary control passages 56, which are configured to connect the pressure accumulation space 500 to the secondary control ports 45; and the recycle passages 57, which are configured to connect the pressure accumulation space 500 to the primary control ports 44 or the secondary control ports 45. The recycle passages 57 enable reuse of the hydraulic oil discharged from the retard chambers 201 and the advance chambers 202.

When the supply check valve 61 is opened, the supply check valve 61 enables the flow of the hydraulic oil from the oil pump 8 toward the pressure accumulation space 500 through the supply passages 54. When the supply check valve 61 is closed, the supply check valve 61 limits the flow of the hydraulic oil from the pressure accumulation space 500 toward the oil pump 8 through the supply passages 54. Thereby, it is possible to limit the backflow of the hydraulic oil from the pressure accumulation space 500 toward the oil pump 8. In this way, in the state where the supply pressure of the oil pump 8 is low, it is possible to limit the flow of the hydraulic oil from the passage change valve 11 toward the oil pump 8.

When the recycle check valve 62 is opened, the recycle check valve 62 enables the flow of the hydraulic oil from the retard chambers 201 or the advance chambers 202 toward the pressure accumulation space 500 through the recycle passages 57. When the recycle check valve 62 is closed, the recycle check valve 62 limits the flow of the hydraulic oil from the pressure accumulation space 500 toward the retard chambers 201 or the advance chambers 202 through the recycle passages 57. Thereby, it is possible to limit the backflow of the hydraulic oil from the pressure accumulation space 500 toward the retard chambers 201 or the advance chambers 202. As a result, in the structure that enables the reuse of the hydraulic oil, the responsiveness of the valve timing adjustment device 10 can be increased.

In the present embodiment, the characteristic of the supply check valve 61 with respect to the valve opening of the supply check valve 61 is different from the characteristic of the recycle check valve 62 with respect to the valve opening of the recycle check valve 62. The characteristic of the supply check valve 61 with respect to the valve opening of the supply check valve 61 may be set in view of the degree of the pressure loss in such a manner that the valve opening pressure of the supply check valve 61 is relatively low, and thereby the supply check valve 61 can be easily opened. In such a case, the pressure loss of the hydraulic oil at the time of passing through the supply check valve 61 is reduced, and thereby the pressure loss of the hydraulic oil supplied to each hydraulic chamber can be reduced. Also, the characteristic of the recycle check valve 62 with respect to the valve opening of the recycle check valve 62 may be set in view of the followability of the recycle check valve 62 in such a manner that the valve opening pressure of the recycle check valve 62 is relatively high, and thereby the valve opening of the recycle check valve 62 is difficult. In such a case, the recycle check valve 62 can follow the positive and negative cam torque fluctuations in the high frequency range at the time of high speed rotation of the valve timing adjustment device 10, and thereby the responsiveness of the valve timing adjustment device 10 can be improved.

In the present embodiment, the characteristic of the supply check valve 61 with respect to the valve opening of the supply check valve 61 is set such that the valve opening of the supply check valve 61 is easier than the valve opening of the recycle check valve 62. Therefore, as described above, the pressure loss of the hydraulic oil supplied to each hydraulic chamber can be reduced, and the responsiveness of the valve timing adjustment device 10 can be improved.

In the present embodiment, the valve opening pressure of the supply check valve 61 is set to be lower than the valve opening pressure of the recycle check valve 62. Specifically, the characteristic of the supply check valve 61 with respect to the valve opening of the supply check valve 61 is set such that the valve opening of the supply check valve 61 is easier than the valve opening of the recycle check valve 62.

In the present embodiment, the supply check valve 61 is placed at the inside of the spool 50, and the supply check valve 61 closes the supply passages 54 at the time of closing the supply check valve 61. The recycle check valve 62 is placed at the inside of the spool 50, and the recycle check valve 62 closes the recycle passages 57 at the time of closing the recycle check valve 62. In the present embodiment, the supply check valve 61 and the recycle check valve 62 are both placed at the inside of the spool 50, so that the manufacturing is easy.

In the present embodiment, the supply check valve 61 and the recycle check valve 62 are made of the plate material that is resiliently deformable, and the width of the supply check valve 61 and the width of the recycle check valve 62 are different from each other. The width of the supply check valve 61 and the width of the recycle check valve 62 are different from each other in the present embodiment to implement the different characteristics with respect to the valve opening for the supply check valve 61 and the recycle check valve 62.

Moreover, in the present embodiment, the sleeve 40 is placed at the center of the vane rotor 30. Specifically, in the present embodiment, the sleeve 40 and the spool 50 of the passage change valve 11 are placed at the center of the vane rotor 30. In this way, a length of each oil path, which extends from the passage change valve 11 to a corresponding one of the retard chambers 201 and the advance chambers 202, can be made short, and thereby the response of the valve timing adjustment device 10 can be improved.

Second Embodiment

Figure 4:
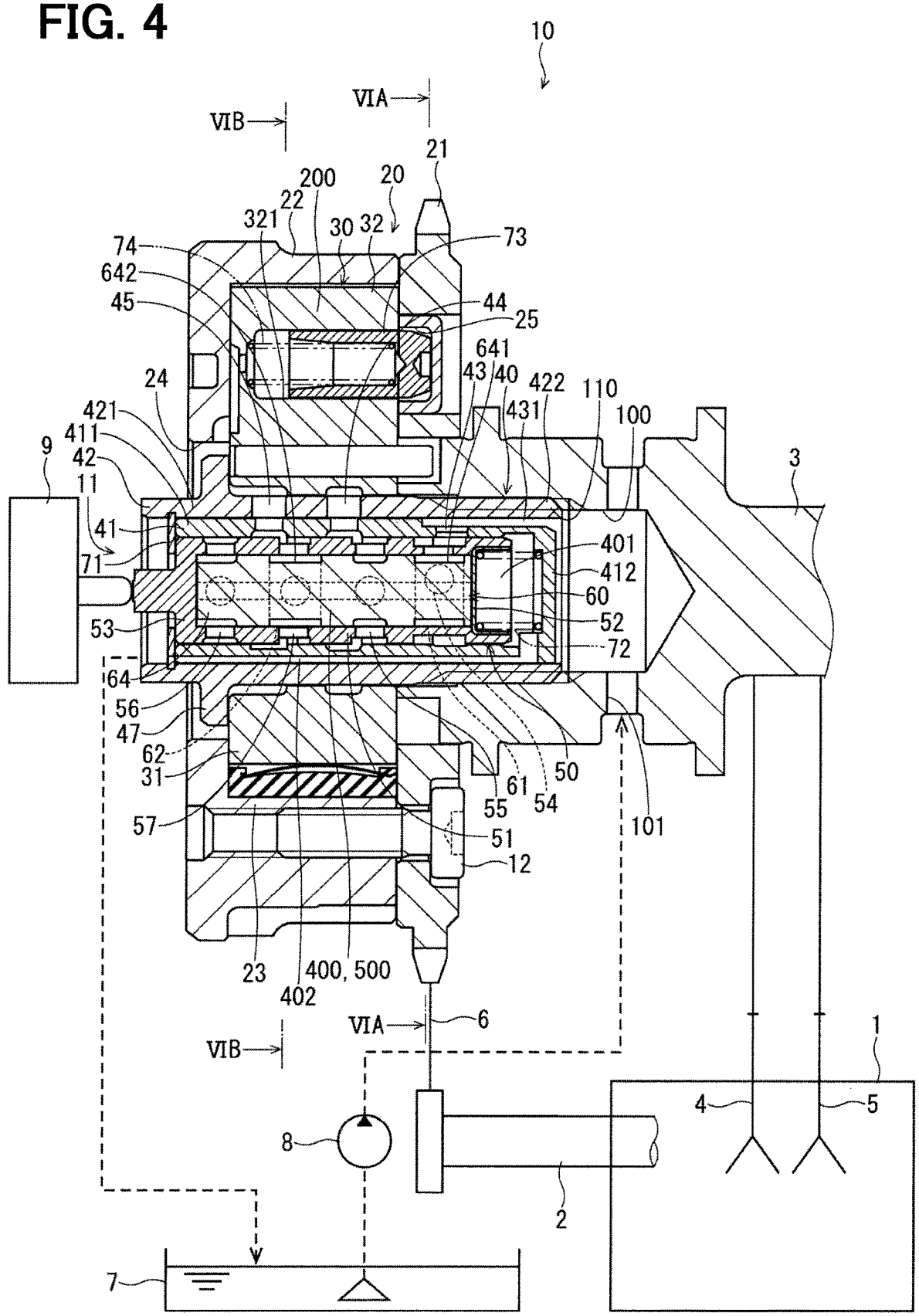
FIG. 4 is a cross-sectional view illustrating a valve timing adjustment device according to a second embodiment.

FIG. 4 illustrates a valve timing adjustment device according to a second embodiment of the present disclosure. The second embodiment differs from the first embodiment with respect to the configurations of the spool 50 and the check valve 60.

Figure 6A:
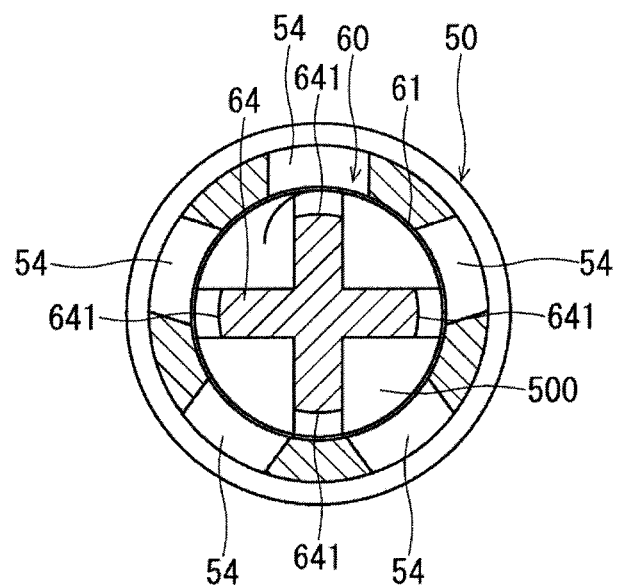
FIG. 6A is a cross-sectional view taken along line VIA-VIA in FIG. 4 and illustrating only a spool and a check valve.
Figure 6B:
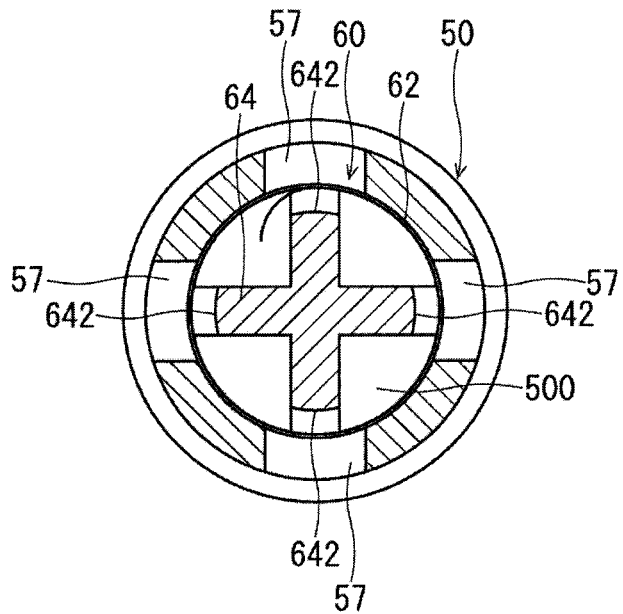
FIG. 6B is a cross-sectional view taken along line VIB-VIB in FIG. 4 and illustrating only the spool and the check valve.

In the present embodiment, the number of the supply passages 54 is five, and these five supply passages 54 are arranged one after the other at equal intervals in the circumferential direction of the spool 50 (see FIG. 6A). An inner diameter of each supply passage 54 is set to be equal to an inner diameter of the other supply passages 54. Similar to the first embodiment, the number of the recycle passages 57 is four, and these four recycle passages 57 are arranged one after the other at equal intervals in the circumferential direction of the spool 50 (see FIG. 6B). An inner diameter of each recycle passage 57 is set to be equal to an inner diameter of the other recycle passages 57. Moreover, the inner diameter of each recycle passage 57 is set to be equal to the inner diameter of each supply passage 54. Therefore, a total passage cross sectional area of the supply passages 54 is larger than a total passage cross sectional area of the recycle passages 57.

The check valve 60 has the supply check valve 61, the recycle check valve 62, and a support member 64.

The supply check valve 61, the recycle check valve 62, and the support member 64 are formed separately from one another. Similar to the first embodiment, the supply check valve 61 and the recycle check valve 62 are respectively shaped in a substantially cylindrical tubular form by rolling a thin metal plate (see FIGS. 5A to 5C). The supply check valve 61 is formed such that the supply check valve 61 is resiliently deformable in the radial direction. When the supply check valve 61 is radially inwardly deformed, an outer diameter of the supply check valve 61 is reduced. More specifically, the supply check valve 61 has an overlapping portion, in which a part of the plate material overlaps with another part of the plate material in the circumferential direction (see FIG. 5C). When a size of this overlapping portion is increased, it is radially inwardly deformed and thereby shrinks in the radial direction. In contrast, when the size of this overlapping portion is reduced, it is radially outwardly deformed and thereby expands in the radial direction. A space, which is formed at the inside of the supply check valve 61 shaped in the substantially cylindrical tubular form, is opened in the axial direction of the check valve 60. The recycle check valve 62 is formed such that the recycle check valve 62 is resiliently deformable in the radial direction. When the recycle check valve 62 is radially inwardly deformed, an outer diameter of the recycle check valve 62 is reduced. More specifically, the recycle check valve 62 has an overlapping portion, in which a part of the plate material overlaps with another part of the plate material in the circumferential direction. When a size of this overlapping portion is increased, it is radially inwardly deformed and thereby shrinks in the radial direction. In contrast, when the size of this overlapping portion is reduced, it is radially outwardly deformed and thereby expands in the radial direction. A space, which is formed at the inside of the recycle check valve 62 shaped in the substantially cylindrical tubular form, is opened in the axial direction of the check valve 60.

Here, a width of the supply check valve 61 (i.e., a length of the supply check valve 61 measured in the axial direction) is indicated by w3, and a width of the recycle check valve 62 (i.e., a length of the recycle check valve 62 measured in the axial direction) is indicated by w4. The supply check valve 61 and the recycle check valve 62 are formed to satisfy a relationship of w3=w4 (see FIG. 5A). Thus, a degree of deformability of the supply check valve 61 in the radial direction is the same as a degree of deformability of the recycle check valve 62 in the radial direction. Specifically, when an equal force is radially inwardly applied to both of the supply check valve 61 and the recycle check valve 62, the amount of deformation of the supply check valve 61 is the same as the amount of deformation of the recycle check valve 62.

Figure 5A:
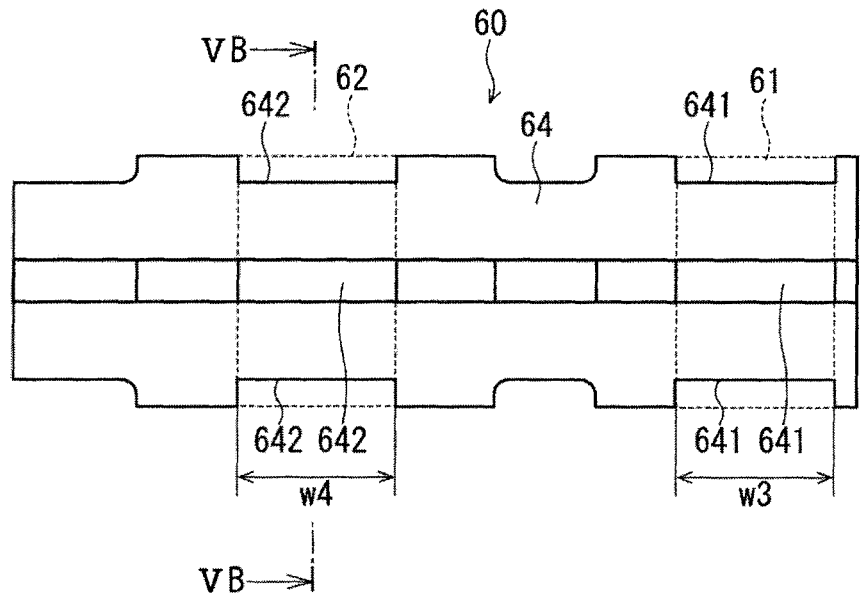
FIG. 5A is a view of a check valve of the valve timing adjustment device according to the second embodiment.
Figure 5B:
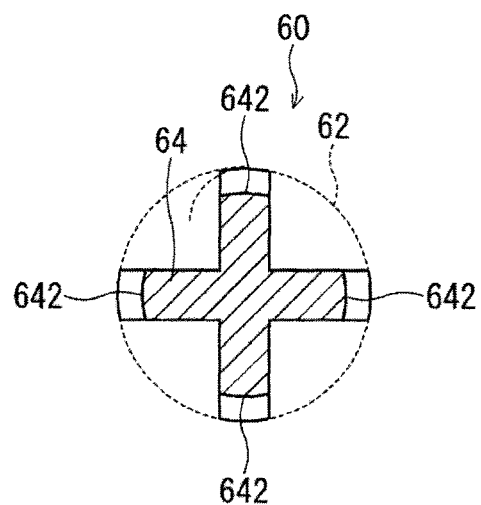
FIG. 5B is a cross-sectional view taken along line VB-VB in FIG. 5A.
Figure 5C:
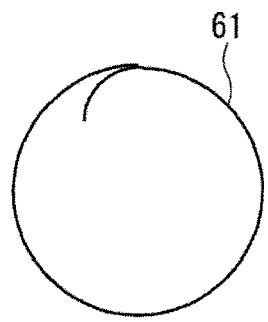
FIG. 5C is a view of a supply check valve.

As illustrated in FIGS. 5A and 5B, the support member 64 is shaped such that two rectangular plate materials are held perpendicular to each other. Therefore, a cross section of the support member 64, which is perpendicular to a longitudinal direction of the support member 64, has a crisscross form (see FIGS. 5B and 6).

The support member 64 has a plurality of cut-outs 641, 642. Each of the cut-outs 641 is formed by radially inwardly cutting an outer periphery of one longitudinal end portion of the support member 64. The number of the cut-outs 641 is four, and these cut-outs 641 are arranged one after the other at equal intervals in the circumferential direction of the support member 64. Each of the cut-outs 642 is formed by radially inwardly cutting an outer periphery of the other longitudinal end portion of the support member 64. The number of the cut-outs 642 is four, and these cut-outs 642 are arranged one after the other at equal intervals in the circumferential direction of the support member 64.

The supply check valve 61 is installed to the cut-outs 641 of the support member 64. The supply check valve 61 is radially inwardly deformable at the cut-outs 641. A length of each cut-out 641, which is measured in the longitudinal direction of the support member 64, is set to be slightly larger than the length w3 of the supply check valve 61, which is measured in the axial direction. The cut-outs 641 can limit axial movement of the supply check valve 61 relative to the support member 64.

The recycle check valve 62 is installed at the cut-outs 642 of the support member 64. The recycle check valve 62 is radially inwardly deformable in the cut-outs 642. A length of each cut-out 642, which is measured in the longitudinal direction of the support member 64, is set to be slightly larger than the length w4 of the recycle check valve 62, which is measured in the axial direction. The cut-outs 642 can limit axial movement of the recycle check valve 62 relative to the support member 64.

The check valve 60 is provided in the pressure accumulation space 500 such that the supply check valve 61 corresponds to the supply passages 54, and the recycle check valve 62 corresponds to the recycle passages 57 (see FIG. 4). The support member 64 is positioned between the spool cover 52 and the spool bottom 53 and supports the supply check valve 61 and the recycle check valve 62.

When the hydraulic oil flows from the oil pump 8 toward the pressure accumulation space 500 through the supply passages 54, an outer peripheral surface of the supply check valve 61 is radially inwardly urged by the hydraulic oil. Thus, the supply check valve 61 is radially inwardly deformed and is opened. Thereby, a gap is formed between the inner wall of the spool 50 and the supply check valve 61. As a result, the hydraulic oil can flow into the pressure accumulation space 500 through the supply passages 54. In contrast, when the hydraulic oil flows from the pressure accumulation space 500 toward the oil pump 8 through the supply passages 54, an inner peripheral surface of the supply check valve 61 is radially outwardly urged by the hydraulic oil. Thus, the supply check valve 61 is radially outwardly deformed and is thereby closed. Thereby, the supply check valve 61 is urged against the inner wall of the spool 50 to close the supply passages 54. In this way, the outflow of the hydraulic oil from the pressure accumulation space 500 to the outside of the spool 50 through the supply passages 54 is limited.

When the hydraulic oil flows from the retard chambers 201 or the advance chambers 202 toward the pressure accumulation space 500 through the recycle passages 57, an outer peripheral surface of the recycle check valve 62 is radially inwardly urged by the hydraulic oil. Thus, the recycle check valve 62 is radially inwardly deformed and is opened. Thereby, a gap is formed between the inner wall of the spool 50 and the recycle check valve 62. In this way, the hydraulic oil can flow into the pressure accumulation space 500 through the recycle passages 57. In contrast, when the hydraulic oil flows from the pressure accumulation space 500 toward retard chambers 201 or the advance chambers 202 through the recycle passages 57, an inner peripheral surface of the recycle check valve 62 is radially outwardly urged by the hydraulic oil. Thus, the recycle check valve 62 is radially outwardly deformed and is thereby closed. Thereby, the recycle check valve 62 is urged against the inner wall of the spool 50 to close the recycle passages 57. In this way, the outflow of the hydraulic oil from the pressure accumulation space 500 to the outside of the spool 50 through the recycle passages 57 is limited.

As described above, the degree of deformability of the supply check valve 61 in the radial direction is the same as the degree of deformability of the recycle check valve 62 in the radial direction. Furthermore, the total passage cross sectional area of the supply passages 54 is larger than the total passage cross sectional area of the recycle passages 57. Thus, a valve opening pressure of the supply check valve 61 is set to be lower than a valve opening pressure of the recycle check valve 62. In other words, the characteristic of the supply check valve 61 with respect to the valve opening of the supply check valve 61 is set such that the valve opening of the supply check valve 61 is easier than the valve opening of the recycle check valve 62.

Other than the points described above, the structure of the second embodiment is the same as that of the first embodiment. Therefore, the structure, which is the same as the structure of the first embodiment, can achieve the same advantages as those of the first embodiment.

As discussed above, in the present embodiment, the supply check valve 61 and the recycle check valve 62 are respectively made of the resiliently deformable plate materials, which have the identical width and the identical plate thickness. The total passage cross sectional area of the supply passages 54 is different from the total passage cross sectional area of the recycle passages 57. As a result, the characteristic of the supply check valve 61 with respect to the valve opening of the supply check valve 61 is different from the characteristic of the recycle check valve 62 with respect to the valve opening of the recycle check valve 62. In the present embodiment, the supply check valve 61 and the recycle check valve 62 are formed with the same specifications (the width and the plate thickness). Therefore, the supply check valve 61 and the recycle check valve 62 can be placed at the predetermined positions without a need for distinguishing the supply check valve 61 and the recycle check valve 62. Thus, there is no risk of erroneous assembly of the supply check valve 61 and the recycle check valve 62, and thereby the manufacturing can be eased.

Furthermore, in the present embodiment, an inner diameter of each supply passage 54 is the same as an inner diameter of each recycle passages 57, and the number of the supply passages 54 formed at the spool 50 is different from the number of recycle passages 57 formed at the spool 50. Thereby, the characteristic of the supply check valve 61 with respect to the valve opening of the supply check valve 61 becomes different from the characteristic of the recycle check valve 62 with respect to the valve opening of the recycle check valve 62. Moreover, the inner diameter of each supply passage 54 is the same as the inner diameter of each recycle passages 57, so that the supply passages 54 and the recycle passages 57 can be formed by using a common single cutting tool, such as a drill. Therefore, the manufacturing is eased.

Third Embodiment

Figure 7:
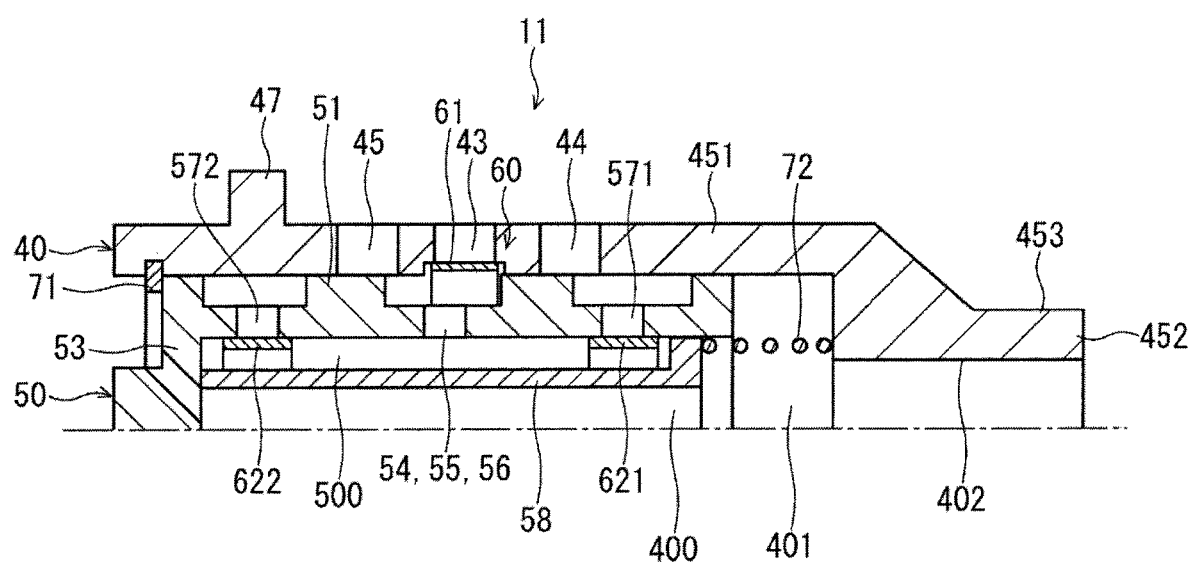
FIG. 7 is a cross-sectional view illustrating a portion of a valve timing adjustment device according to a third embodiment.

FIG. 7 illustrates a portion of a valve timing adjustment device according to a third embodiment of the present disclosure. The third embodiment differs from the first embodiment with respect to the configurations of the sleeve 40, the spool 50, and the check valve 60.

The sleeve 40 is made of metal, such as iron. The sleeve 40 has a sleeve tube 451, a sleeve bottom 452, and a threaded portion 453.

The sleeve tube 451 is shaped in a substantially cylindrical tubular form. The sleeve bottom 452 is integrally formed with the sleeve tube 451 in one piece such that the sleeve bottom 452 closes one end of the sleeve tube 451. The threaded portion 453 is formed at an outer wall of the end portion of the sleeve tube 451, which is located on the sleeve bottom 452 side.

The sleeve 40 is inserted through the inside of the boss 31 of the vane rotor 30 and is fixed to the camshaft 3 such that the threaded portion 453 of the sleeve 40 is engaged with the shaft-side threaded portion 110 of the camshaft 3.

The breathing hole 402 is formed at the sleeve bottom 452. The breathing hole 402 extends through the center of the sleeve bottom 452 in the plate thickness direction of the sleeve bottom 452. That is, the breathing hole 402 is connected to the variable volume space 401.

The breathing hole 402 is formed to communicate with the outside of the camshaft 3. Thus, the variable volume space 401 is communicated with the outside of the camshaft 3, i.e., the atmosphere through the breathing hole 402. As a result, the pressure in the variable volume space 401 can be made equal to the atmospheric pressure. In the present embodiment, the pressure of the variable volume space 401 is kept substantially equal to the atmospheric pressure through the breathing hole 402. Therefore, when the spool 50 is urged by the linear solenoid 9, the spool 50 can be smoothly reciprocated at the inside of the sleeve 40.

In the present embodiment, the supply ports 43 are formed at a location between the primary control ports 44 and the secondary control ports 45. A plurality of the supply ports 43 is arranged one after the other in the circumferential direction of the sleeve 40.

The spool 50 has a seal member 58 in place of the spool cover 52. The seal member 58 is shaped in a substantially cylindrical tubular form and is placed at the inside of the spool tube 51. The pressure accumulation space 500, which is shaped in a substantially cylindrical tubular form, is placed between an outer wall of the seal member 58 and an inner wall of the spool tube 51.

In the present embodiment, the spool 50 has a plurality of recycle passages 571 and a plurality of recycle passages 572 in place of the recycle passages 57.

On the side of the supply passages 54, which is opposite from the sleeve bottom 452, each of the recycle passages 571 is formed such that the recycle passage 571 connects between the inner wall of the spool tube 51 and an annular recess, which is formed at the outer wall of the spool tube 51. The recycle passages 571 are arranged one after the other in the circumferential direction of the spool 50, and the number of the recycle passages 571 is the same as the number of the supply ports 43. An inner diameter of each recycle passage 571 is set to be equal to an inner diameter of the other recycle passages 571. Moreover, the inner diameter of each recycle passage 571 is set to be smaller than the inner diameter of each supply port 43.

On the side of the recycle passages 571, which is opposite from the sleeve bottom 452, each of the recycle passages 572 is formed such that the recycle passage 572 connects between the inner wall of the spool tube 51 and an annular recess, which is formed at the outer wall of the spool tube 51. The recycle passages 572 are arranged one after the other in the circumferential direction of the spool 50, and the number of the recycle passages 572 is the same as the number of the recycle passages 571. An inner diameter of each recycle passage 572 is set to be equal to an inner diameter of the other recycle passages 572. Furthermore, the inner diameter of each recycle passage 572 is set to be the same as the inner diameter of each recycle passage 571.

A total passage cross sectional area of the supply ports 43 is set to be larger than a total passage cross sectional area of the recycle passages 571 or a total passage cross sectional area of the recycle passages 572.

In the present embodiment, a corresponding one of the primary control passages 55, a corresponding one of the secondary control passages 56 and a corresponding one of the supply passages 54 are formed integrally at a location between the recycle passages 571 and the recycle passages 572.

The check valve 60 has the supply check valve 61 and recycle check valves 621, 622.

The supply check valve 61 and the recycle check valves 621, 622 are formed separately from one another. Similar to the first embodiment, the supply check valve 61 and the recycle check valves 621, 622 are respectively formed by rolling a thin metal plate in a cylindrical tubular form. The plate thickness of the thin plate, which forms the supply check valve 61, is set to be smaller than the plate thickness of the thin plates, which respectively form the recycle check valves 621, 622.

The supply check valve 61 is formed such that the supply check valve 61 is resiliently deformable in the radial direction. When the supply check valve 61 is radially inwardly deformed, an outer diameter of the supply check valve 61 is reduced. The recycle check valves 621, 622 are formed to be resiliently deformable in the radial direction. When each of the recycle check valves 621, 622 is radially inwardly deformed, an outer diameter of the recycle check valve 621, 622 is reduced.

The inner diameter and the outer diameter of the supply check valve 61 are set to be larger than the outer diameter of the respective recycle check valves 621, 622. A width of the supply check valve 61, i.e., a length of the supply check valve 61 measured in the axial direction is the same as the length of the respective recycle check valves 621, 622 measured in the axial direction.

The supply check valve 61 has the plate thickness smaller than the plate thickness of each of the recycle check valves 621, 622 and has the outer diameter larger than the outer diameter of each of the recycle check valves 621, 622. Therefore, the supply check valve 61 is more easily deformable in the radial direction in comparison to the recycle check valves 621, 622. Specifically, when an equal force is radially inwardly applied to both of the supply check valve 61 and the recycle check valve 621, 622, the amount of deformation of the supply check valve 61 becomes larger than the amount of deformation of the recycle check valve 621, 622.

The supply check valve 61 is placed at a position that is between the sleeve 40 and the spool 50 and corresponds to the supply ports 43. The recycle check valve 621 is placed at a position that is between the spool tube 51 and the seal member 58 and corresponds to the recycle passages 571. The recycle check valve 622 is placed at a position that is between the spool tube 51 and the seal member 58 and corresponds to the recycle passages 572.

When the hydraulic oil flows from the oil pump 8 toward the pressure accumulation space 500 through the supply passages 54, the supply check valve 61 is radially inwardly deformed and is opened. Thereby, a gap is formed between the inner wall of the sleeve 40 and the supply check valve 61. As a result, the hydraulic oil can flow into the pressure accumulation space 500 through the supply ports 43 and the supply passages 54. In contrast, when the hydraulic oil flows from the pressure accumulation space 500 toward the oil pump 8 through the supply ports 43, the supply check valve 61 is radially outwardly deformed and is closed. Thus, the supply check valve 61 is urged against the inner wall of the sleeve 40 to close the supply ports 43. In this way, the outflow of the hydraulic oil from the pressure accumulation space 500 to the outside of the sleeve 40 through the supply passages 54 and the supply ports 43 is limited. Thus, the supply check valve 61 enables the flow of the hydraulic oil from the oil pump 8 toward the pressure accumulation space 500 through the supply passages 54 and limits the flow of the hydraulic oil from the pressure accumulation space 500 toward the oil pump 8 through the supply ports 43.

When the hydraulic oil flows from the retard chambers 201 or the advance chambers 202 toward the pressure accumulation space 500 through the recycle passages 571, 572, the recycle check valves 621, 622 are radially inwardly deformed and are opened. Thereby, a gap is formed between the inner wall of the spool 50 and the recycle check valve 621, 622. As a result, the hydraulic oil can flow into the pressure accumulation space 500 through the recycle passages 571, 572. In contrast, when the hydraulic oil flows from the pressure accumulation space 500 toward the retard chambers 201 or the advance chambers 202 through the recycle passages 571, 572, the recycle check valves 621, 622 are radially outwardly deformed and are closed. Thereby, the recycle check valves 621, 622 are urged against the inner wall of the spool 50 to close the recycle passages 571, 572. In this way, the outflow of the hydraulic oil from the pressure accumulation space 500 to the outside of the spool 50 through the recycle passages 571, 572 is limited. Thus, the recycle check valves 621, 622 enable the flow of the hydraulic oil from the retard chambers 201 or the advance chambers 202 toward the pressure accumulation space 500 through the recycle passages 571, 572 and limits the flow of the hydraulic oil from the pressure accumulation space 500 toward the retard chambers 201 or the advance chambers 202 through the recycle passages 571, 572.

In the present embodiment, when the spool 50 is positioned to contact the retaining portion 71 (see FIG. 7), the hydraulic oil is supplied to the advance chambers 202 through the secondary control ports 45, and the hydraulic oil in the retard chambers 201 flows to the recess, which is located on the radially outer side of the recycle passages 571, through the primary control ports 44. The hydraulic oil, which flows into this recess, is returned to the pressure accumulation space 500 through the recycle passages 571 and the recycle check valve 621.

When the spool 50 is positioned to contact the sleeve bottom 452, the hydraulic oil is supplied to the retard chambers 201 through the primary control ports 44, and the hydraulic oil in the advance chambers 202 flows to the recess, which is located on the radially outer side of the recycle passages 572, through the secondary control ports 45. The hydraulic oil, which flows into this recess, is returned to the pressure accumulation space 500 through the recycle passages 572 and the recycle check valve 622.

As described above, the supply check valve 61 is more easily deformable in the radial direction in comparison to the recycle check valves 621, 622. Furthermore, the total passage cross sectional area of the supply ports 43 is set to be larger than the total passage cross sectional area of the recycle passages 571 or the total passage cross sectional area of the recycle passages 572. Thus, a valve opening pressure of the supply check valve 61 is set to be lower than a valve opening pressure of the respective recycle check valves 621, 622. In other words, the characteristic of the supply check valve 61 with respect to the valve opening of the supply check valve 61 is set such that the valve opening of the supply check valve 61 is easier than the valve opening of the recycle check valves 621, 622.

Other than the points described above, the structure of the third embodiment is similar to the structure of the first embodiment. Therefore, the structure, which is the same as the structure of the first embodiment, can achieve the same advantages as those of the first embodiment.

As described above, in the present embodiment, the supply check valve 61 is placed at the outside of the spool 50 and closes the supply ports 43 at the time of closing the supply check valve 61. The recycle check valves 621, 622 are placed at the inside of the spool 50, and the recycle check valves 621, 622 close the recycle passages 571, 572 at the time of closing the recycle check valves 621, 622. In the present embodiment, the location of the supply check valve 61 at the passage change valve 11 is different from the locations of the recycle check valves 621, 622 at the passage change valve 11. Therefore, erroneous assembling can be limited.

Fourth Embodiment

Figure 8:
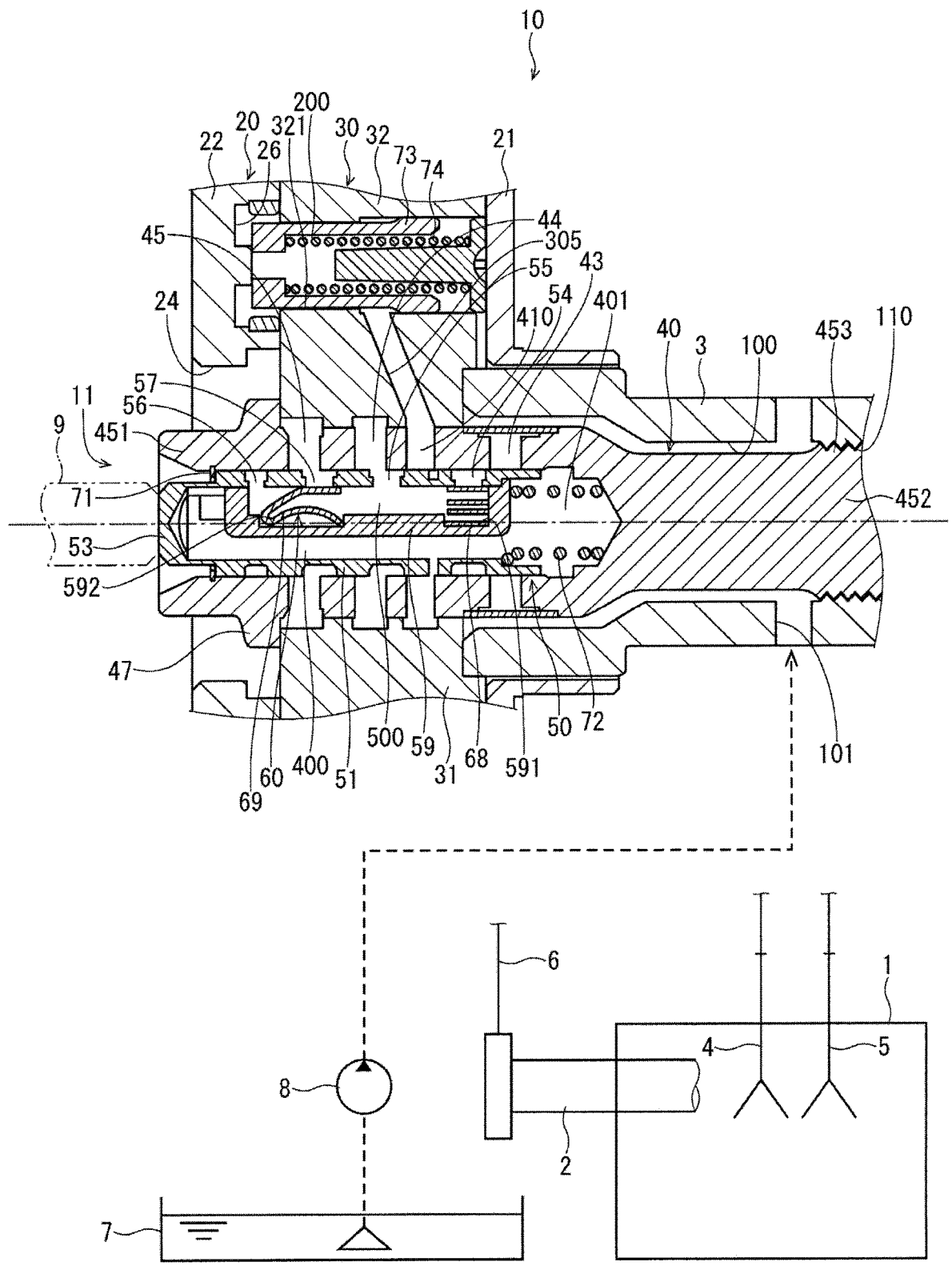
FIG. 8 is a cross-sectional view illustrating a portion of a valve timing adjustment device according to a fourth embodiment.

FIG. 8 illustrates a valve timing adjustment device according to a fourth embodiment of the present disclosure. The fourth embodiment differs from the first embodiment with respect to the configurations of the sleeve 40, the spool 50 and the check valve 60.

Similar to the third embodiment, the sleeve 40 has the sleeve tube 451, the sleeve bottom 452 and the threaded portion 453.

Each of the supply ports 43 is formed such that the supply port 43 connects between the outer wall and the inner wall of the sleeve tube 451. The supply ports 43 are communicated with the supply holes 101 through a gap that is shaped in a tubular form and is formed between the outer wall of the spool 50 and the inner wall of the shaft hole 100.

Each of the primary control ports 44 is formed such that the primary control port 44 connects between the outer wall and the inner wall of the sleeve tube 451 on the retaining portion 47 side of the supply ports 43.

Each of the secondary control ports 45 is formed such that the secondary control port 45 connects between the outer wall and the inner wall of the sleeve tube 451 on the retaining portion 47 side of the primary control ports 44.

In the present embodiment, each of pin control ports 410 is formed to connect between the outer wall and the inner wall of the sleeve tube 451 at a location that is between the supply ports 43 and the primary control ports 44. Furthermore, a pin control passage 305, which connects between the pin control ports 410 and the receiving hole 321, is formed at the vane rotor 30. A fitting recess 26, into which the lock pin 73 can be fitted, is formed at the case 22 on the side where the vane 32 is placed. The spring 74 urges the lock pin 73 toward the case 22. The pressure of the hydraulic oil, which flows into the pin control ports 410 and the pin control passage 305, is exerted in a removing direction for removing the lock pin 73 from the fitting recess 26 against the urging force of the spring 74. When the lock pin 73 is fitted into the fitting recess 26, relative rotation of the vane rotor 30 relative to the housing 20 is limited. In contrast, when the lock pin 73 is not fitted into the fitting recess 26, the relative rotation of the vane rotor 30 relative to the housing 20 is enabled.

The spool 50 has a seal member 59 in place of the spool cover 52. The seal member 59 is placed at the inside of the spool tube 51. The pressure accumulation space 500, which extends in the axial direction of the spool 50, is formed between an inner wall of the seal member 59 and the inner wall of the spool tube 51.

The supply passage 54, the primary control passage 55, the recycle passage 57 and the secondary control passage 56 are arranged in this order at predetermined intervals from one end side to the other end side of the spool 50. The supply passage 54, the primary control passage 55, the recycle passage 57 and the secondary control passage 56 communicate the pressure accumulation space 500 to the outside of the spool 50. Here, a passage cross sectional area of the supply passage 54 is set to be equal to a passage cross sectional area of the recycle passage 57.

In the present embodiment, when the spool 50 is positioned to contact the retaining portion 71 (see FIG. 8), the supply ports 43 are not connected to the supply passage 54. When the spool 50 moves toward the camshaft 3 by a predetermined amount, the supply ports 43 are connected to the supply passage 54, and the primary control passage 55 is connected to the primary control ports 44, and the secondary control ports 45 are connected to the recycle passage 57. At this time, the primary control passage 55 is connected to the pin control ports 410.

When the spool 50 is positioned to contact the sleeve bottom 412, the supply ports 43 are connected to the supply passage 54, and the secondary control passage 56 is connected to the secondary control ports 45, and the primary control ports 44 are connected to the recycle passage 57. At this time, the primary control passage 55 is connected to the pin control ports 410.

The check valve 60 has a supply check valve 68 and a recycle check valve 69.

The supply check valve 68 and the recycle check valve 69 are formed separately from each other. The supply check valve 68 and the recycle check valve 69 are respectively formed by folding a thin metal plate. A plate thickness of the thin plate, which is used to form the supply check valve 68, is set to be smaller than a plate thickness of the thin plate, which is used to form the recycle check valve 69.

The supply check valve 68 and the recycle check valve 69 are formed to be resiliently deformable. Since the plate thickness of the supply check valve 68 is smaller than the plate thickness of the recycle check valve 69, the supply check valve 68 is more easily deformable in comparison to the recycle check valve 69. Specifically, when an equal force is applied to both of the supply check valve 68 and the recycle check valve 69, the amount of deformation of the supply check valve 68 becomes larger than the amount of deformation of the recycle check valve 69.

Figure 9:
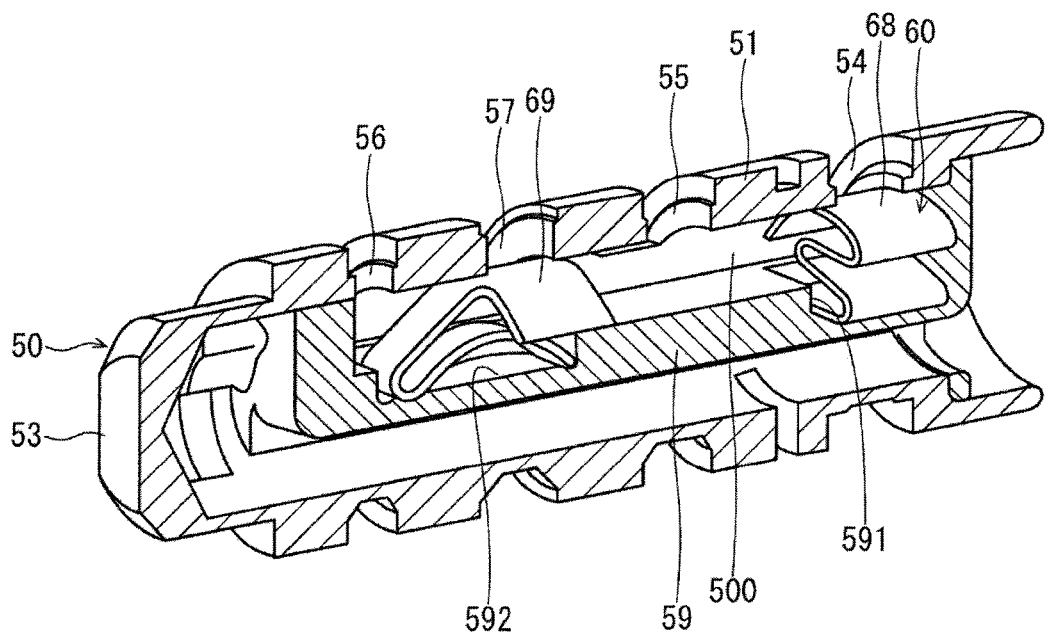
FIG. 9 is a perspective cross-sectional view illustrating a spool and a check valve of the valve timing adjustment device according to the fourth embodiment.

The supply check valve 68 is placed in the pressure accumulation space 500 at a location that corresponds to the supply passage 54. The supply check valve 68 is supported by a supply-side support portion 591 that is formed at an inner wall of the seal member 59. Here, the supply-side support portion 591 is shaped in a corresponding form that corresponds to the shape of the supply check valve 68 (see FIGS. 8 and 9). The supply check valve 68 is resiliently deformable in the radial direction of the spool 50.

The recycle check valve 69 is placed in the pressure accumulation space 500 at a location that corresponds to the recycle passage 57. The recycle check valve 69 is supported by a recycle-side support portion 592 that is formed at the inner wall of the seal member 59. Here, the recycle-side support portion 592 is shaped in a corresponding form that corresponds to a shape of the recycle check valve 69 (see FIGS. 8 and 9). The recycle check valve 69 is resiliently deformable in the radial direction of the spool 50.

When the hydraulic oil flows from the oil pump 8 toward the pressure accumulation space 500 through the supply passage 54, the supply check valve 68 is radially inwardly deformed in the radial direction of the spool 50 and is opened. Thereby, a gap is formed between the inner wall of the spool 50 and the supply check valve 68. As a result, the hydraulic oil can flow into the pressure accumulation space 500 through the supply passage 54. In contrast, when the hydraulic oil flows from the pressure accumulation space 500 toward the oil pump 8 through the supply passage 54, the supply check valve 68 is radially outwardly deformed in the radial direction of the spool 50 and is closed. Thereby, the supply check valve 68 is urged against the inner wall of the spool 50 to close the supply passage 54. In this way, the outflow of the hydraulic oil from the pressure accumulation space 500 to the outside of the spool 50 through the supply passage 54 is limited. Thus, the supply check valve 68 enables the flow of the hydraulic oil from the oil pump 8 to the pressure accumulation space 500 through the supply passage 54 and limits the flow of the hydraulic oil from the pressure accumulation space 500 to the oil pump 8 through the supply passage 54.

When the hydraulic oil flows from the retard chambers 201 or the advance chambers 202 toward the pressure accumulation space 500 through the recycle passage 57, the recycle check valve 69 is radially inwardly deformed and is opened. Thereby, a gap is formed between the inner wall of the spool 50 and the recycle check valve 69. In this way, the hydraulic oil can flow into the pressure accumulation space 500 through the recycle passage 57. In contrast, when the hydraulic oil flows from the pressure accumulation space 500 toward the retard chambers 201 or the advance chambers 202 through the recycle passage 57, the recycle check valve 69 is radially outwardly deformed and is closed. Thereby, the recycle check valve 69 is urged against the inner wall of the spool 50 to close the recycle passage 57. In this way, the outflow of the hydraulic oil from the pressure accumulation space 500 to the outside of the spool 50 through the recycle passage 57 is limited. Thus, the recycle check valve 69 enables the flow of the hydraulic oil from the retard chambers 201 or the advance chambers 202 toward the pressure accumulation space 500 through the recycle passage 57 and limits the flow of the hydraulic oil from the pressure accumulation space 500 toward the retard chambers 201 or the advance chambers 202 through the recycle passage 57.

In the present embodiment, when the spool 50 is moved from the position (see FIG. 8), at which the spool 50 contacts the retaining portion 71, toward the camshaft 3 by a predetermined amount, the hydraulic oil flows into the pressure accumulation space 500 through the supply ports 43, the supply passage 54 and the supply check valve 68, and the hydraulic oil flows into the pin control ports 410 and the pin control passage 305 through the primary control passage 55. Thereby, the relative rotation of the vane rotor 30 relative to the housing 20 is enabled. At this time, the hydraulic oil in the pressure accumulation space 500 is supplied to the retard chambers 201 through the primary control passage 55 and the primary control ports 44, and the hydraulic oil in the advance chambers 202 flows to the recess, which is located on the radially outer side of the recycle passage 57, through the secondary control ports 45. The hydraulic oil, which flows into this recess, is returned to the pressure accumulation space 500 through the recycle passage 57 and the recycle check valve 69.

When the spool 50 is positioned to contact the sleeve bottom 452, the hydraulic oil flows into the pin control ports 410 and the pin control passage 305 through the primary control passage 55. Thereby, the relative rotation of the vane rotor 30 relative to the housing 20 is enabled. At this time, the hydraulic oil is supplied to the advance chambers 202 through the secondary control passage 56 and the secondary control ports 45, and the hydraulic oil in the retard chambers 201 flows to the recess, which is located on the radially outer side of the recycle passage 57, through the primary control ports 44. The hydraulic oil, which flows into this recess, is returned to the pressure accumulation space 500 through the recycle passage 57 and the recycle check valve 69.

As described above, the supply check valve 68 is more easily deformable in comparison to the recycle check valve 69. Furthermore, the passage cross sectional area of the supply passage 54 is set to be equal to the passage cross sectional area of the recycle passage 57. Thus, the valve opening pressure of the supply check valve 68 is set to be lower than the valve opening pressure of the recycle check valve 69. Specifically, the characteristic of the supply check valve 68 with respect to the valve opening of the supply check valve 68 is set such that the valve opening of the supply check valve 68 is easier than the valve opening of the recycle check valve 69.

Other than the points described above, the structure of the fourth embodiment is similar to the structure of the first embodiment. Therefore, the structure, which is the same as the structure of the first embodiment, can achieve the same advantages as those of the first embodiment.

As described above, in the present embodiment, the spool 50 has the supply-side support portion 591, which supports the supply check valve 68, and the recycle-side support portion 592, which supports the recycle check valve 69. Thus, for example, by forming the supply-side support portion 591 to correspond to the shape of the supply check valve 68 and forming the recycle-side support portion 592 to correspond to the shape of the recycle check valve 69, the supply-side support portion 591 and the recycle-side support portion 592 have different shapes. Thereby, erroneous assembling of the supply check valve 68 and the recycle check valve 69 can be limited.

Furthermore, in the present embodiment, the supply check valve 68 and the recycle check valve 69 are respectively made of resiliently deformable plate materials, and the plate thickness of the supply check valve 68 and the plate thickness of the recycle check valve 69 are different from each other. Thus, the characteristic of the supply check valve 68 with respect to the valve opening of the supply check valve 68 is different from the characteristic of the recycle check valve 69 with respect to the valve opening of the recycle check valve 69.

Fifth Embodiment

Figure 10:
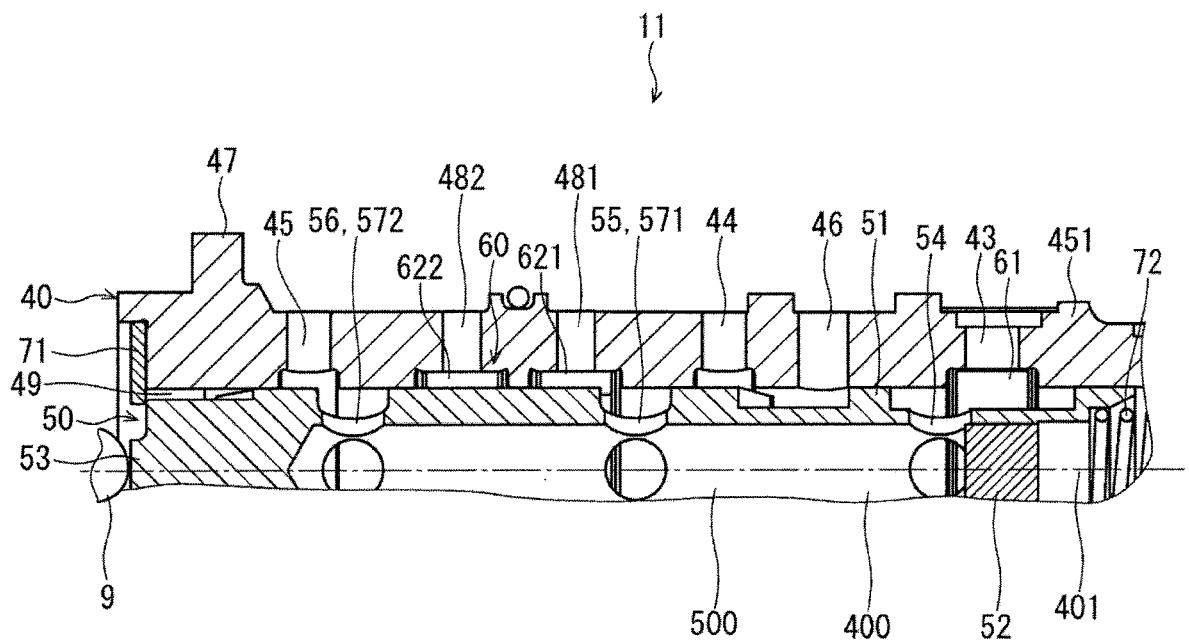
FIG. 10 is a cross-sectional view illustrating a portion of a valve timing adjustment device according to a fifth embodiment.

FIG. 10 illustrates a portion of a valve timing adjustment device according to a fifth embodiment of the present disclosure. The fifth embodiment differs from the third embodiment with respect to the configurations of the sleeve 40, the spool 50 and the check valve 60.

Each of the supply ports 43 is formed such that the supply port 43 connects between the outer wall and the inner wall of the sleeve tube 451. The supply ports 43 are connected to the oil pump 8.

Each of the primary control ports 44 is formed such that the primary control port 44 connects between the outer wall and the inner wall of the sleeve tube 451 on the retaining portion 47 side of the supply ports 43.

Each of the secondary control ports 45 is formed such that the secondary control port 45 connects between the outer wall and the inner wall of the sleeve tube 451 on the retaining portion 47 side of the primary control ports 44.

In the present embodiment, the sleeve 40 further includes a plurality of recycle ports 481, 482 and a plurality of drain ports 46, 49.

Each recycle port 481 is formed such that the recycle port 481 connects between the outer wall and the inner wall of the sleeve tube 451 at a location between the primary control ports 44 and the secondary control ports 45. The recycle ports 481 are communicated with the retard chambers 201. An inner diameter of each recycle port 481 is set to be smaller than an inner diameter of each supply port 43. Furthermore, a total passage cross sectional area of the recycle ports 481 is set to be smaller than a total passage cross sectional area of the supply ports 43.

Each of the recycle ports 482 is formed such that the recycle port 482 connects between the outer wall and the inner wall of the sleeve tube 451 at a location between the recycle ports 481 and the secondary control ports 45. The recycle ports 481 are communicated with the advance chambers 202. An inner diameter of each recycle port 482 is set to be smaller than an inner diameter of each supply port 43. A total passage cross sectional area of the recycle ports 482 is set to be smaller than a total passage cross sectional area of the supply ports 43. An inner diameter of each recycle port 482 is set to be equal to an inner diameter of each recycle port 481. A total passage cross sectional area of the recycle ports 482 is set to be equal to a total passage cross sectional area of the recycle ports 481.

The drain port 46 is formed such that the drain port 46 connects between the outer wall and the inner wall of the sleeve tube 451 at a location between the supply ports 43 and the primary control ports 44. The drain port 46 is communicated with the outside of the valve timing adjustment device 10.

The drain port 49 is placed at the inside of the end portion of the sleeve tube 451, which is located on the retaining portion 47 side, and the drain port 49 is shaped in a substantially cylindrical tubular form at a location between the end portion of the sleeve tube 451 and the spool 50. The drain port 49 is communicated with the opposite side of the passage change valve 11, which is opposite from the camshaft 3, that is, the drain port 49 is communicated with the outside of the valve timing adjustment device 10.

In the present embodiment, a corresponding one of the primary control passages 55 and a corresponding one of the recycle passages 571 are integrally formed on the spool bottom 53 side of the supply passages 54.

A corresponding one of the secondary control passages 56 and a corresponding one of the recycle passages 572 are integrally formed on the spool bottom 53 side of the primary control passages 55 and the recycle passages 571.

The check valve 60 has the supply check valve 61 and the recycle check valves 621, 622.

The supply check valve 61 and the recycle check valves 621, 622 are formed separately from one another. Similar to the third embodiment, the supply check valve 61 and the recycle check valves 621, 622 are respectively formed by rolling a thin metal plate in a cylindrical tubular form. The width and the plate thickness of the thin plate, which forms the supply check valve 61, are set to be equal to the width and the plate thickness of each of the thin plates, which respectively form the recycle check valves 621, 622. Thus, a degree of deformability of the supply check valve 61 is the same as a degree of deformability of the respective recycle check valves 621, 622. Specifically, when an equal force is radially inwardly applied to both of the supply check valve 61 and the respective recycle check valves 621, 622, the amount of deformation of the supply check valve 61 is the same as the amount of deformation of the respective recycle check valves 621, 622.

The supply check valve 61 is placed at a position that is between the sleeve 40 and the spool 50 and corresponds to the supply ports 43. The recycle check valve 621 is placed at a position that is between the sleeve 40 and the spool 50 and corresponds to the recycle ports 481. The recycle check valve 622 is placed at a position that is between the sleeve 40 and the spool 50 and corresponds to the recycle ports 482.

When the hydraulic oil flows from the oil pump 8 toward the pressure accumulation space 500 through the supply passages 54, the supply check valve 61 is radially inwardly deformed and is opened. Thereby, a gap is formed between the inner wall of the sleeve 40 and the supply check valve 61. As a result, the hydraulic oil can flow into the pressure accumulation space 500 through the supply ports 43 and the supply passages 54. In contrast, when the hydraulic oil flows from the pressure accumulation space 500 toward the oil pump 8 through the supply ports 43, the supply check valve 61 is radially outwardly deformed and is closed. Thus, the supply check valve 61 is urged against the inner wall of the sleeve 40 to close the supply ports 43. In this way, the outflow of the hydraulic oil from the pressure accumulation space 500 to the outside of the sleeve 40 through the supply passages 54 and the supply ports 43 is limited. Thus, the supply check valve 61 enables the flow of the hydraulic oil from the oil pump 8 toward the pressure accumulation space 500 through the supply passages 54 and limits the flow of the hydraulic oil from the pressure accumulation space 500 toward the oil pump 8 through the supply ports 43.

When the hydraulic oil flows from the retard chambers 201 toward the pressure accumulation space 500 through the recycle ports 481 and the recycle passages 571, the recycle check valve 621 is radially inwardly deformed and is opened. Thereby, a gap is formed between the inner wall of the sleeve 40 and the recycle check valve 621. In this way, the hydraulic oil can flow into the pressure accumulation space 500 through the recycle passages 571. In contrast, when the hydraulic oil flows from the pressure accumulation space 500 toward the retard chambers 201 through the recycle passages 571 and the recycle ports 481, the recycle check valve 621 is radially outwardly deformed and is closed. Thereby, the recycle check valve 621 is urged against the inner wall of the sleeve 40 to close the recycle ports 481. In this way, the outflow of the hydraulic oil from the pressure accumulation space 500 to the outside of the sleeve 40 through the recycle passages 571 is limited. Thus, the recycle check valve 621 enables the flow of the hydraulic oil from the retard chambers 201 toward the pressure accumulation space 500 through the recycle ports 481 and the recycle passages 571 and limits the flow of the hydraulic oil from the pressure accumulation space 500 toward the retard chambers 201 through the recycle passages 571 and the recycle ports 481.

When the hydraulic oil flows from the advance chambers 202 toward the pressure accumulation space 500 through the recycle ports 482 and the recycle passages 572, the recycle check valve 622 is radially inwardly deformed and is opened. Thereby, a gap is formed between the inner wall of the sleeve 40 and the recycle check valve 622. In this way, the hydraulic oil can flow into the pressure accumulation space 500 through the recycle passages 572. In contrast, when the hydraulic oil flows from the pressure accumulation space 500 toward the advance chambers 202 through the recycle passages 572 and the recycle ports 482, the recycle check valve 622 is radially outwardly deformed and is closed. Thereby, the recycle check valve 622 is urged against the inner wall of the sleeve 40 to close the recycle ports 482. In this way, the outflow of the hydraulic oil from the pressure accumulation space 500 to the outside of the sleeve 40 through the recycle passages 572 is limited. Thus, the recycle check valve 622 enables the flow of the hydraulic oil from the advance chambers 202 toward the pressure accumulation space 500 through the recycle ports 482 and the recycle passages 572 and limits the flow of the hydraulic oil from the pressure accumulation space 500 toward the advance chambers 202 through the recycle passages 572 and the recycle ports 482.

In the present embodiment, when the spool 50 is positioned to contact the retaining portion 71 (see FIG. 10), the hydraulic oil is supplied to the advance chambers 202 through the secondary control ports 45, and the hydraulic oil in the retard chambers 201 is returned to the pressure accumulation space 500 through the recycle ports 481 and the recycle check valve 621 and at the same time is discharged to the outside of the valve timing adjustment device 10 through the primary control ports 44 and the drain port 46.

When the spool 50 is positioned to contact the sleeve bottom 452, the hydraulic oil is supplied to the retard chambers 201 through the primary control ports 44, and the hydraulic oil in the advance chambers 202 is returned to the pressure accumulation space 500 through the recycle ports 482 and the recycle check valve 622 and at the same time is discharged to the outside of the valve timing adjustment device 10 through the secondary control ports 45 and the drain port 49.

As described above, the degree of deformability of the supply check valve 61 is the same as the degree of deformability of the respective recycle check valves 621, 622. Furthermore, a total passage cross sectional area of the supply ports 43 is set to be larger than a total passage cross sectional area of the recycle ports 481 and a total passage cross sectional area of the recycle ports 482. Thus, a valve opening pressure of the supply check valve 61 is set to be lower than a valve opening pressure of the respective recycle check valves 621, 622. In other words, the characteristic of the supply check valve 61 with respect to the valve opening of the supply check valve 61 is set such that the valve opening of the supply check valve 61 is easier than the valve opening of the recycle check valves 621, 622.

Other than the points described above, the structure of the fifth embodiment is similar to the structure of the third embodiment. Therefore, the structure, which is the same as the structure of the third embodiment, can achieve the same advantages as those of the third embodiment.

In the present embodiment, the supply check valve 61 and the recycle check valves 621, 622 are formed with the same specifications (the width and the plate thickness). The supply check valve 61 and the recycle check valves 621, 622 can thus be placed at the predetermined positions without a need for distinguishing the supply check valve 61, the recycle check valve 621 and the recycle check valve 622. Thus, there is no risk of erroneous assembly, and thereby the manufacturing can be eased.

As described above, in the present embodiment, the sleeve 40 further includes the recycle ports 481, 482, each of which is configured to connect between the pressure accumulation space 500 and the retard chambers 201 or the advance chambers 202.

The supply check valve 61 is placed at the outside of the spool 50 and closes the supply ports 43 at the time of closing the supply check valve 61.

The recycle check valves 621, 622 are placed at the outside of the spool 50 and close the corresponding recycle ports 481, 482 at the time of closing the recycle check valves 621, 622.

In the present embodiment, the supply check valve 61 and the recycle check valves 621, 622 are all placed between the spool 50 and the sleeve 40. Therefore, a size of the passage change valve 11 can be reduced in the radial direction.

Sixth Embodiment

Figure 11:
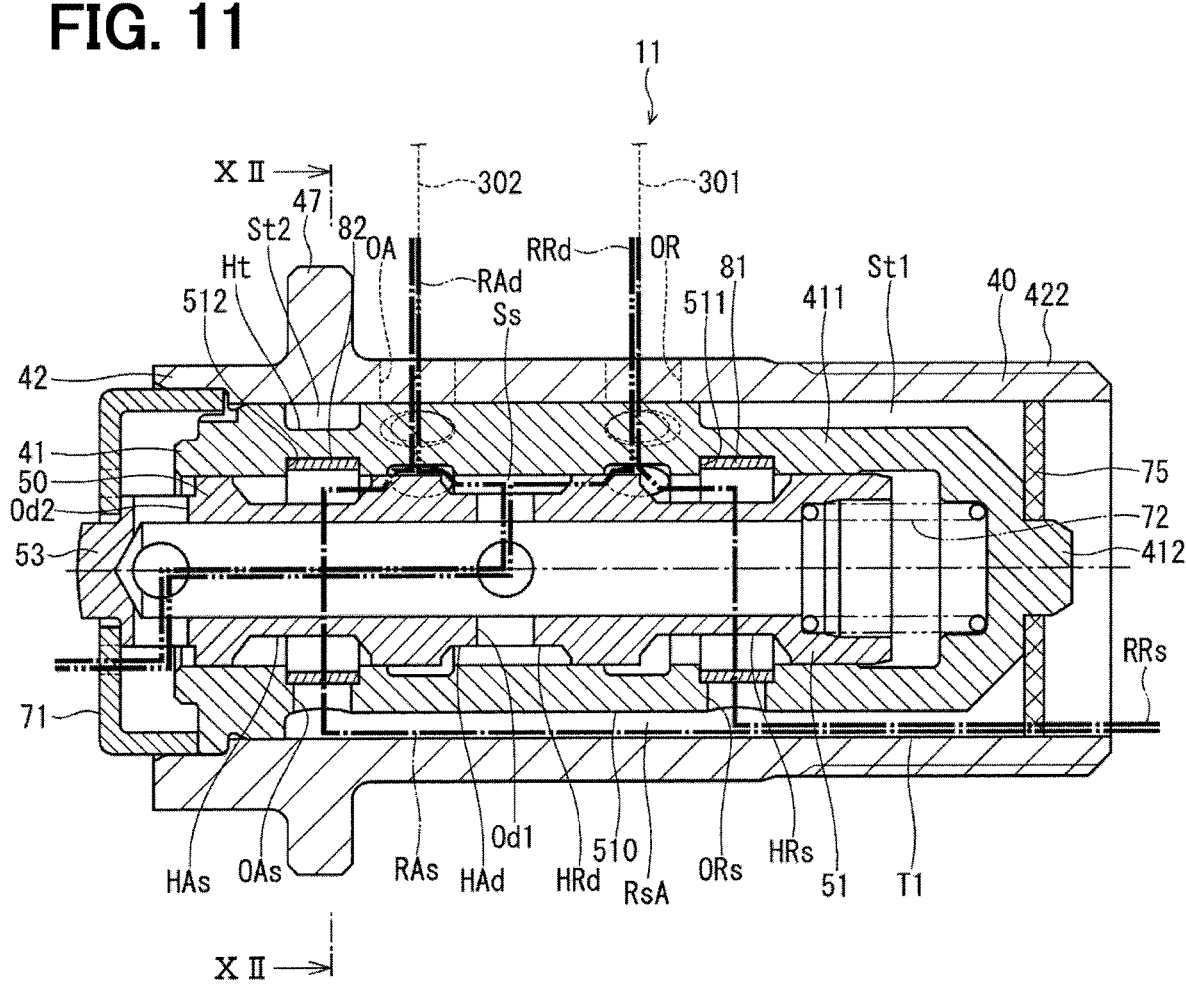
FIG. 11 is a cross-sectional view illustrating a passage change valve of a valve timing adjustment device according to a sixth embodiment.

FIG. 11 illustrates a passage change valve of a valve timing adjustment device according to a sixth embodiment of the present disclosure. The sixth embodiment differs from the first embodiment with respect to the configurations of the sleeve 40, the spool 50 and the check valve.

In the present embodiment, the valve timing adjustment device 10 includes a retard supply passage RRs, an advance supply passage RAs, a retard drain passage RRd, an advance drain passage RAd, a retard supply check valve 81 and an advance supply check valve 82 (the retard supply check valve 81 and the advance supply check valve 82 serving as check valves).

In the present embodiment, the retaining portion 71 is formed in a bottomed tubular form. An outer peripheral wall of the retaining portion 71 is fitted to an inner peripheral wall of the sleeve tube 421 of the outer sleeve 42. A hole is formed at a center of a bottom of the retaining portion 71, and the spool bottom 53 is installed in an inside of this hole.

The bottom of the retaining portion 71 is configured to retain the one end of the spool 50. The retaining portion 71 can limit movement of the spool 50 toward a side that is opposite to the sleeve bottom 412. In this way, removal of the spool 50 from the inside of the inner sleeve 41 is limited.

The spool 50 is movable in the axial direction from a position, at which the spool 50 contacts the retaining portion 71, to a position, at which the spool 50 contacts the sleeve bottom 412. Specifically, a movable range of the spool 50 relative to the sleeve 40 extends from the position, at which the spool 50 contacts the retaining portion 71 (see FIG. 11), to the position, at which the spool 50 contacts the sleeve bottom 412. Hereinafter, the movable range of the spool 50 is referred to as a stroke range.

As illustrated in FIG. 11, the sleeve bottom 412 side end region of the inner sleeve 41 has an outer diameter that is smaller than an inner diameter of the outer sleeve 42. In this way, an annular space St1, which is shaped in a substantially annular form, is formed between an outer peripheral wall of the sleeve bottom 412 side end region of the inner sleeve 41 and the inner peripheral wall of the outer sleeve 42.

Moreover, an annular recess Ht is formed at the inner sleeve 41. The annular recess Ht, which is shaped in an annular form, is radially inwardly recessed at a portion of the outer peripheral wall of the inner sleeve 41, which corresponds to the retaining portion 47. In this way, an annular space St2, which is shaped in an annular form, is formed between the annular recess Ht and the inner peripheral wall of the outer sleeve 42.

A passage groove 510 is also formed at the inner sleeve 41. The passage groove 510 is radially inwardly recessed at the outer peripheral wall of the inner sleeve 41 and extends in the axial direction of the inner sleeve 41. The passage groove 510 forms an axial supply passage RsA. Specifically, the axial supply passage RsA is formed to extend in the axial direction of the sleeve 40 at an interface T1 between the outer sleeve 42 and the inner sleeve 41. One end of the axial supply passage RsA is connected to the annular space St1, and the other end of the axial supply passage RsA is connected to the annular space St2.

Limiting grooves 511, 512 are formed at the inner sleeve 41. The limiting groove 511, which is shaped in an annular form, is radially outwardly recessed at a portion of the inner peripheral wall of the inner sleeve 41, which corresponds to an end portion of the annular space St1. The limiting groove 512, which is shaped in an annular form, is radially outwardly recessed at a portion of the inner peripheral wall of the inner sleeve 41, which corresponds to the annular recess Ht.

The sleeve 40 has a plurality of retard supply openings ORs, a plurality of advance supply openings OAs, a plurality of retard openings OR and a plurality of advance openings OA. Each retard supply opening (serving as an inflow hole) ORs extends in the radial direction of the sleeve 40 and connects the limiting groove 511 of the inner sleeve (serving as a tubular member) 41 to the annular space St1 and the axial supply passage RsA. The plurality of retard supply openings ORs is arranged one after the other in the circumferential direction of the inner sleeve 41.

Each advance supply opening (serving as an inflow hole) OAs extends in the radial direction of the sleeve 40 and connects the limiting groove 512 of the inner sleeve 41 to the annular space St2 and the axial supply passage RsA. The plurality of advance supply openings OAs is arranged one after the other in the circumferential direction of the inner sleeve 41.

Each retard opening OR extends in the radial direction of the sleeve 40 and connects the space, which is located at the inside of the inner sleeve 41, to the space, which is located at the outside of the outer sleeve 42. The plurality of the retard openings OR is arranged one after the other in the circumferential direction of the sleeve 40. Each retard opening OR is communicated with the corresponding retard chamber 201 through a corresponding retard passage 301.

Each advance opening OA extends in the radial direction of the sleeve 40 and connects the space, which is located at the inside of the inner sleeve 41, to the space, which is located at the outside of the outer sleeve 42. The advance opening OA is formed on the retaining portion 47 side of the retard openings OR. The plurality of the advance openings OA is arranged one after the other in the circumferential direction of the sleeve 40. Each advance opening OA is communicated with the corresponding advance chamber 202 through a corresponding advance passage 302.

The spool 50 has a retard supply recess HRs, a retard drain recess HRd, an advance drain recess HAd, an advance supply recess HAs, and a plurality of drain openings Od1, Od2. The retard supply recess HRs, the retard drain recess HRd, the advance drain recess HAd and the advance supply recess HAs are respectively shaped in an annular form and radially inwardly recessed from the outer peripheral wall of the spool 50. The retard supply recess HRs, the retard drain recess HRd, the advance drain recess HAd and the advance supply recess HAs are arranged in this order in the axial direction of the spool 50. The retard drain recess HRd and the advance drain recess HAd are formed integrally. The retard drain recess HRd and the advance drain recess HAd form a specific space Ss relative to the inner peripheral wall of the inner sleeve 41. Specifically, the spool 50 forms the specific space Ss between the spool 50 and the sleeve 40.

Each drain opening Od1 communicates the space, which is located at the inside of the spool 50, to the retard drain recess HRd and the advance drain recess HAd, i.e., the specific space Ss. At the spool bottom 53 side end region of the spool 50, each drain opening Od2 communicates the space, which is located at the inside of the spool 50, to the space, which is located at the outside of the spool 50. The drain openings Od1 are arranged one after the other in the circumferential direction of the spool 50, and the drain openings Od2 are arranged one after the other in the circumferential direction of the spool 50.

The retard supply passage RRs connects the oil pump 8 to the retard chambers 201 through the passage change valve 11. The advance supply passage RAs connects the oil pump 8 to the advance chambers 202 through the passage change valve 11. The retard drain passage RRd, which serves as the drain passage, connects the retard chambers 201 to the oil pan 7. The advance drain passage RAd, which serves as the drain passage, connects the advance chambers 202 to the oil pan 7.

The retard supply passage RRs connects the oil pump 8 to the retard chambers 201 through the supply holes 101, the shaft hole 100, the annular space St1, the axial supply passage RsA, the retard supply openings ORs, the limiting groove 511, the retard supply recess HRs, the retard openings OR and the retard passages 301. The advance supply passage RAs connects the oil pump 8 to the advance chambers 202 through the supply holes 101, the shaft hole 100, the annular space St1, the axial supply passage RsA, the advance supply openings OAs, the limiting groove 512, the advance supply recess HAs, the advance openings OA, and the advance passages 302.

The retard drain passage RRd connects the retard chambers 201 to the oil pan 7 through the retard passages 301, the retard openings OR, the retard drain recess HRd and the drain openings Od1, Od2. The advance drain passage RAd connects the advance chambers 202 to the oil pan 7 through the advance passages 302, the advance openings OA, the advance drain recess HAd and the drain openings Od1, Od2. Thus, a portion of each of the retard supply passage RRs, the advance supply passage RAs, the retard drain passage RRd and the advance drain passage RAd is formed at the inside of the passage change valve 11.

When the spool 50 is in contact with the retaining portion 71 (see FIG. 11), that is, when the spool 50 is positioned at one end of the stroke range, the spool 50 opens the retard openings ORs. Thereby, the oil pump 8 is communicated with the retard chambers 201 through the supply holes 101, the shaft hole 100, the annular space St1, the axial supply passage RsA, the retard supply openings ORs, the limiting groove 511, the retard supply recess HRs, the retard openings OR and the retard passages 301 of the retard supply passage RRs. As a result, the hydraulic oil can be supplied from the oil pump 8 to the retard chambers 201 through the retard supply passage RRs. Moreover, at this time, the advance chambers 202 are communicated with the oil pan 7 through the advance passages 302, the advance openings OA, the advance drain recess HAd and the drain openings Od1, Od2 of the advance drain passage RAd. As a result, the hydraulic oil can be discharged from the advance chambers 202 to the oil pan 7 through the advance drain passage RAd.

When the spool 50 is positioned between the retaining portion 71 and the sleeve bottom 412, that is, when the spool 50 is positioned in the middle of the stroke range, the oil pump 8 is communicated with the advance chambers 202 through the supply holes 101, the shaft hole 100, the annular space St1, the axial supply passage RsA, the advance supply openings OAs, the limiting groove 512, the advance supply recess HAs, the advance openings OA and the advance passages 302 of the advance supply passage RAs. At this time, the oil pump 8 and the retard chambers 201 are communicated with each other through the retard supply passage RRs. As a result, the hydraulic oil can be supplied from the oil pump 8 to the retard chambers 201 and the advance chambers 202 through the retard supply passage RRs and the advance supply passage RAs. However, the retard drain passage RRd and the advance drain passage RAd are closed, i.e., are blocked by the spool 50. Therefore, the hydraulic oil is not discharged from the retard chambers 201 and the advance chambers 202 to the oil pan 7.

When the spool 50 is in contact with the sleeve bottom 412, that is, when the spool 50 is positioned at the other end of the stroke range, the retard chambers 201 are communicated with the oil pan 7 through the retard passages 301, the retard openings OR, the retard drain recess HRd and the drain openings Od1, Od2 of the retard drain passage RRd. At this time, the oil pump 8 is communicated with the advance chambers 202 through the advance supply passage RAs. As a result, the hydraulic oil can be discharged from the retard chambers 201 to the oil pan 7 through the retard drain passage RRd, and the hydraulic oil can be supplied from the oil pump 8 to the advance chambers 202 through the advance supply passage RAs.

A filter 75 is installed at an inside of the sleeve bottom 412 side end region of the outer sleeve 42, that is, the filter 75 is installed at the middle of the retard supply passage RRs and the advance supply passage RAs. The filter 75 is, for example, a mesh that is shaped in a circular disk form. The filter 75 can capture foreign objects contained in the hydraulic oil. Therefore, it is possible to limit flow of the foreign objects toward the downstream side of the filter 75, i.e., toward the side that is opposite from the oil pump 8.

The present embodiment is provided with a retard supply check valve 81 and an advance supply check valve 82 (serving as check valves). Each of the retard supply check valve 81 and the advance supply check valve 82 is shaped in a tubular form by rolling a single rectangular metal plate such that a longitudinal direction of the rectangular metal plate coincides with the circumferential direction. When each of the retard supply check valve 81 and the advance supply check valve 82 (serving as the check valves) is installed at the inside of the inner sleeve 41 (serving as a tubular member), an inner end portion of the supply check valve 81, 82, which is one circumferential end portion of the supply check valve 81, 82, is placed at an inside of an outer end portion of the supply check valve 81, 82, which is the other circumferential end portion of the supply check valve 81, 82. An overlap portion 830 is formed at the outer end portion of the supply check valve 81, 82 while the overlap portion 830 is a portion that overlaps with the inner end portion of the supply check valve 81, 82 in the circumferential direction. The configurations of the retard supply check valve 81 and the advance supply check valve 82 with respect to the shapes or the like thereof will be described later in detail.

The retard supply check valve 81 is installed in the limiting groove 511. The retard supply check valve 81 is installed such that the retard supply check valve 81 is resiliently deformable in the radial direction in the limiting groove 511. The retard supply check valve 81 is located on the radially inner side of the retard supply openings ORs in the radial direction of the inner sleeve 41. The retard supply check valve 81 is installed in the limiting groove 511 as follows. That is, in a state where the hydraulic oil (serving as fluid) does not flow in the retard supply passage RRs, i.e., in a state where an external force is not applied to the retard supply check valve 81, the overlap portion 830 of the retard supply check valve 81 overlaps with the inner end portion of the retard supply check valve 81.

When the hydraulic oil flows from the retard supply opening ORs side toward the retard supply recess HRs in the retard supply passage RRs, the retard supply check valve 81 is deformed such that the outer peripheral wall of the retard supply check valve 81 is radially inwardly urged by the hydraulic oil and shrinks radially inward, that is, an inner diameter of the retard supply check valve 81 is reduced. In this way, the outer peripheral wall of the retard supply check valve 81 is spaced away from the retard supply openings ORs, and thereby the hydraulic oil can flow toward the retard supply recess HRs through the retard supply check valve 81. At this time, the overlap portion 830 maintains a state in which a part of the overlap portion 830 overlaps with the inner end portion of the retard supply check valve 81 while a length of the overlapping range, in which the overlap portion 830 overlaps with the inner end portion of the retard supply check valve 81, is increased.

When the flow rate of the hydraulic oil flowing through the retard supply passage RRs becomes lower than or equal to a predetermined value, the retard supply check valve 81 is deformed to expand radially outward, that is, the inner diameter of the retard supply check valve 81 is increased. When the hydraulic oil flows from the retard supply recess HRs side toward the retard supply openings ORs, the inner peripheral wall of the retard supply check valve 81 is radially outwardly urged by the hydraulic oil. Thereby, the retard supply check valve 81 contacts the retard supply openings ORs. In this way, the flow of the hydraulic oil from the retard supply recess HRs side toward the retard supply openings ORs is limited.

As discussed above, the retard supply check valve 81 functions as a check valve such that the retard supply check valve 81 enables the flow of the hydraulic oil from the retard supply opening ORs side toward the retard supply recess HRs and limits the flow of the hydraulic oil from the retard supply recess HRs side toward the retard supply openings ORs. Specifically, the retard supply check valve 81 is installed at the inside of the inner sleeve 41 that is shaped in the tubular form and includes the retard supply openings ORs, each of which communicates between the outer peripheral wall and the inner peripheral wall of the inner sleeve 41. The retard supply check valve 81 enables the flow of the hydraulic oil toward the inside of the inner sleeve 41 through the retard supply openings ORs and limits flow of the hydraulic oil from the inside of the inner sleeve 41 toward the retard supply openings ORs. The retard supply check valve 81 is located on the oil pump 8 side of the spool 50 of the passage change valve 11 in the retard supply passage RRs, and the retard supply check valve 81 enables only the flow of the hydraulic oil from the oil pump 8 toward the retard chambers 201.

The advance supply check valve 82 is installed in the limiting groove 512. The advance supply check valve 82 is installed such that the advance supply check valve 82 is resiliently deformable in the radial direction in the limiting groove 512. The advance supply check valve 82 is located on the radially inner side of the advance supply openings OAs in the radial direction of the inner sleeve 41. The advance supply check valve 82 is installed in the limiting groove 512 as follows. That is, in a state where the hydraulic oil does not flow in the advance supply passage RAs, i.e., in a state where an external force is not applied to the advance supply check valve 82, the overlap portion 830 overlaps with the inner end portion of the advance supply check valve 82 (see FIG. 12).

When the hydraulic oil flows from the advance supply opening OAs side toward the advance supply recess HAs in the advance supply passage RAs, the advance supply check valve 82 is deformed such that the outer peripheral wall of the advance supply check valve 82 is radially inwardly urged by the hydraulic oil and shrinks radially inward, that is, an inner diameter of the advance supply check valve 82 is reduced. In this way, the outer peripheral wall of the advance supply check valve 82 is spaced away from the advance supply openings OAs, and thereby the hydraulic oil can flow toward the advance supply recess HAs through the advance supply check valve 82. At this time, the overlap portion 830 maintains a state in which a part of the overlap portion 830 overlaps with the inner end portion of the advance supply check valve 82 while a length of the overlapping range, in which the overlap portion 830 overlaps with the inner end portion of the advance supply check valve 82, is increased.

When the flow rate of the hydraulic oil flowing through the advance supply passage RAs becomes lower than or equal to a predetermined value, the advance supply check valve 82 is deformed to expand radially outward, that is, the inner diameter of the advance supply check valve 82 is increased. When the hydraulic oil flows from the advance supply recess HAs side toward the advance supply openings OAs, the inner peripheral wall of the advance supply check valve 82 is radially outwardly urged by the hydraulic oil. Thereby, the advance supply check valve 82 contacts the advance supply openings OAs. In this way, the flow of the hydraulic oil from the advance supply recess HAs side toward the advance supply openings OAs is limited.

As discussed above, the advance supply check valve 82 functions as a check valve such that the advance supply check valve 82 enables the flow of the hydraulic oil from the advance supply opening OAs side toward the advance supply recess HAs and limits the flow of the hydraulic oil from the advance supply recess HAs side toward the advance supply openings OAs. Specifically, the advance supply check valve 82 is installed at the inside of the inner sleeve 41 that is shaped in the tubular form and has the advance supply openings OAs, each of which communicates between the outer peripheral wall and the inner peripheral wall of the inner sleeve 41. The advance supply check valve 82 enables the flow of the hydraulic oil toward the inside of the inner sleeve 41 through the advance supply openings OAs and limits the flow of the hydraulic oil from the inside of the inner sleeve 41 toward the advance supply openings OAs. The advance supply check valve 82 is located on the oil pump 8 side of the spool 50 of the passage change valve 11 in the advance supply passage RAs, and the advance supply check valve 82 enables only the flow of the hydraulic oil from the oil pump 8 toward the advance chambers 202.

Figure 12:
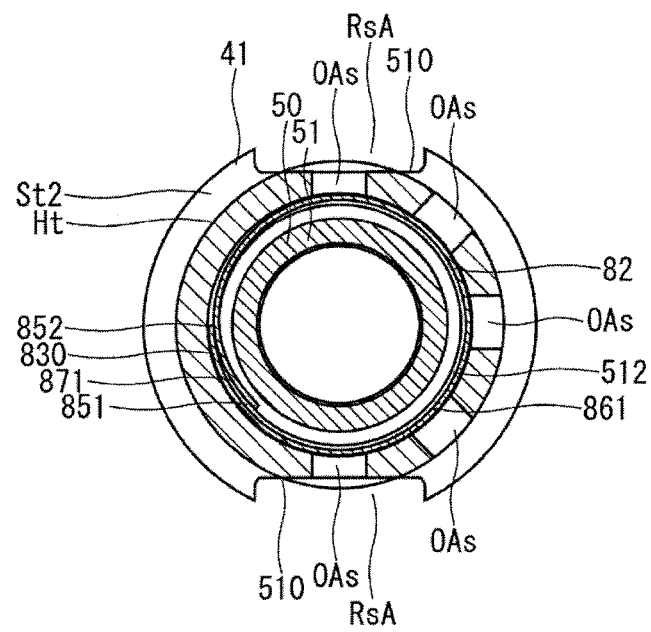
FIG. 12 is a cross-sectional view taken along line XII-XII in FIG. 11.

The limiting grooves 511, 512 can respectively limit axial movement of the retard supply check valve 81 and the axial movement of the advance supply check valve 82. As illustrated in FIG. 12, the number of the advance supply openings OAs formed at the inner sleeve 41 is five. The advance supply openings OAs are formed in a range approximately half of the entire circumferential extent of the inner sleeve 41. That is, the advance supply openings OAs are formed unevenly at a specific site in the circumferential direction of the inner sleeve 41. Thus, when the hydraulic oil flows from the advance supply opening OAs side toward the advance supply recess HAs, the advance supply check valve 82 is urged by the hydraulic oil toward the side that is opposite to the advance supply openings OAs in the limiting groove 512. In this way, removal of the advance supply check valve 82 from the limiting groove 512 can be limited. The limiting groove 512 can thus maintain the function of limiting the axial movement of the advance supply check valve 82.

Like the advance supply openings OAs, the number of the retard supply openings ORs formed at the inner sleeve 41 is five. The retard supply openings ORs are formed in a range approximately half of the entire circumferential extent of the inner sleeve 41. That is, the retard supply openings ORs are formed unevenly at a specific site in the circumferential direction of the inner sleeve 41. Thus, when the hydraulic oil flows from the retard supply opening ORs side toward the retard supply recess HRs, the retard supply check valve 81 is urged by the hydraulic oil toward the side that is opposite to the retard supply openings ORs in the limiting groove 511. In this way, removal of the retard supply check valve 81 from the limiting groove 511 can be limited. The limiting groove 511 can thus maintain the function of limiting the axial movement of the retard supply check valve 81.

The linear solenoid 9 is configured to contact the spool bottom 53. When the linear solenoid 9 is energized, the linear solenoid 9 urges the spool 50 toward the camshaft 3 through the spool bottom 53 against the urging force of the spring 72. As a result, the position of the spool 50 in the axial direction with respect to the sleeve 40 changes in the stroke range.

The configurations with respect to the shapes of the retard supply check valve 81 and the advance supply check valve 82 will be described in detail. The configuration of the retard supply check valve 81 is similar to the configuration of the advance supply check valve 82, so that only the configuration of the advance supply check valve 82 will be described, and the configuration of the retard supply check valve 81 will not be described for the sake of simplicity.

Figure 13:
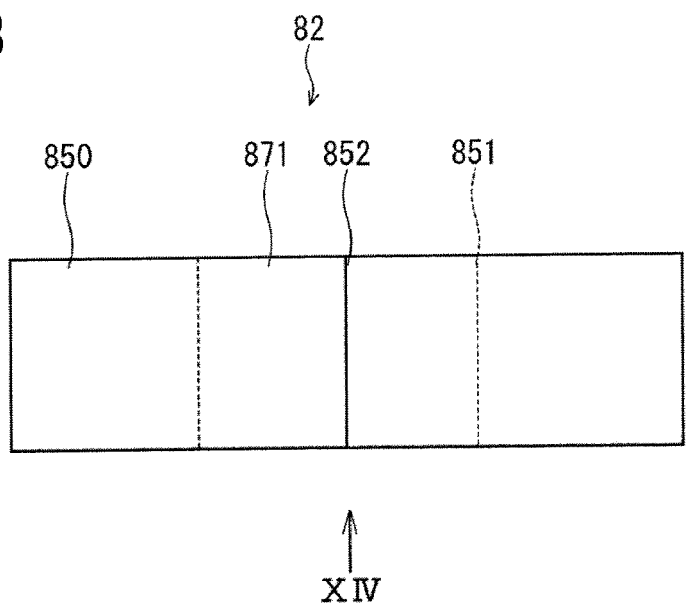
FIG. 13 is a view of a check valve of the valve timing adjustment device according to the sixth embodiment.
Figure 14:
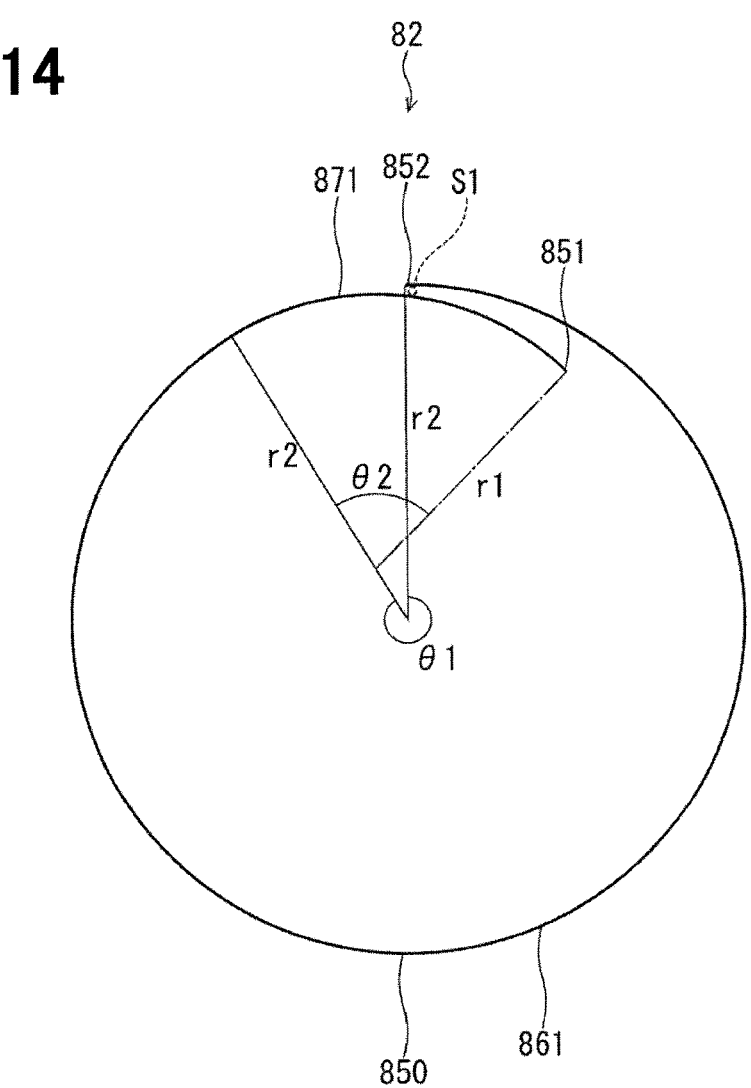
FIG. 14 is a view taken in a direction of an arrow XIV in FIG. 13.

As illustrated in FIGS. 13 and 14, the advance supply check valve 82 includes a valve main body 850. FIGS. 13 and 14 illustrate the advance supply check valve 82 in a state where the advance supply check valve 82 is not yet installed at the inside of the inner sleeve 41, i.e., in a free state where an external force is not applied to the advance supply check valve 82. The valve main body 850 is shaped in the tubular form by rolling the single rectangular metal plate such that the longitudinal direction of the rectangular metal plate coincides with the circumferential direction. The valve main body 850 is formed such that in the free state of the advance supply check valve 82, an inner end 851 side portion of the valve main body 850 is placed on a radially inner side of an outer end 852 side portion of the valve main body 850 while the inner end 851 is one circumferential end of the valve main body 850, and the outer end 852 is the other circumferential end of the valve main body 850 (see FIG. 14).

The valve main body 850 has a constant curvature portion 861 and a small curvature portion 871. The constant curvature portion 861 is a specific portion of the valve main body 850 in the circumferential direction of the valve main body 850. One end of the constant curvature portion 861 coincides with the outer end 852, and the other end of the constant curvature portion 861 is located between the outer end 852 and the inner end 851. The small curvature portion 871 is another specific portion of the valve main body 850 in the circumferential direction of the valve main body 850. One end of the small curvature portion 871 coincides with the other end of the constant curvature portion 861, and the other end of the small curvature portion 871 coincides with the inner end 851.

In the free state of the advance supply check valve 82, the constant curvature portion 861 has a curvature that is constant along an entire extent of the constant curvature portion 861, which is from the one end to the other end of the constant curvature portion 861. Furthermore, in the free state of the advance supply check valve 82, the small curvature portion 871 has a curvature that is constant along an entire extent of the small curvature portion 871, which is from the one end to the other end of the small curvature portion 871. Here, a radius r1 of the small curvature portion 871 is smaller than a radius r2 of the constant curvature portion 861 (see FIG. 14). Specifically, in the free state of the advance supply check valve 82, the valve main body 850 has: the constant curvature portion 861, which has the constant curvature and is located at the specific circumferential portion; and the small curvature portion 871, which has the curvature smaller than the curvature of the constant curvature portion 861 and is located at the other circumferential portion that is other than the constant curvature portion 861.

An angle θ1 measured from the one end to the other end of the constant curvature portion 861 is, for example, about 330°. An angle θ2 measured from the one end to the other end of the small curvature portion 871 is, for example, about 75°. In the free state of the advance supply check valve 82, the outer end 852 of the valve main body 850 is positioned on the radially outer side of a generally middle point between the one end and the other end of the small curvature portion 871. At this time, a gap S1 is formed between an inner peripheral wall of the outer end 852 and an outer peripheral wall of the small curvature portion 871 of the valve main body 850 (see FIG. 14). As discussed above, in the present embodiment, the valve main body 850 is formed such that in the free state of the advance supply check valve 82, the inner end 851 side portion of the valve main body 850 is placed on the radially inner side of the outer end 852 side portion of the valve main body 850, that is, the two end portions of the valve main body 850 overlap with each other in the circumferential direction.

Figure 15:
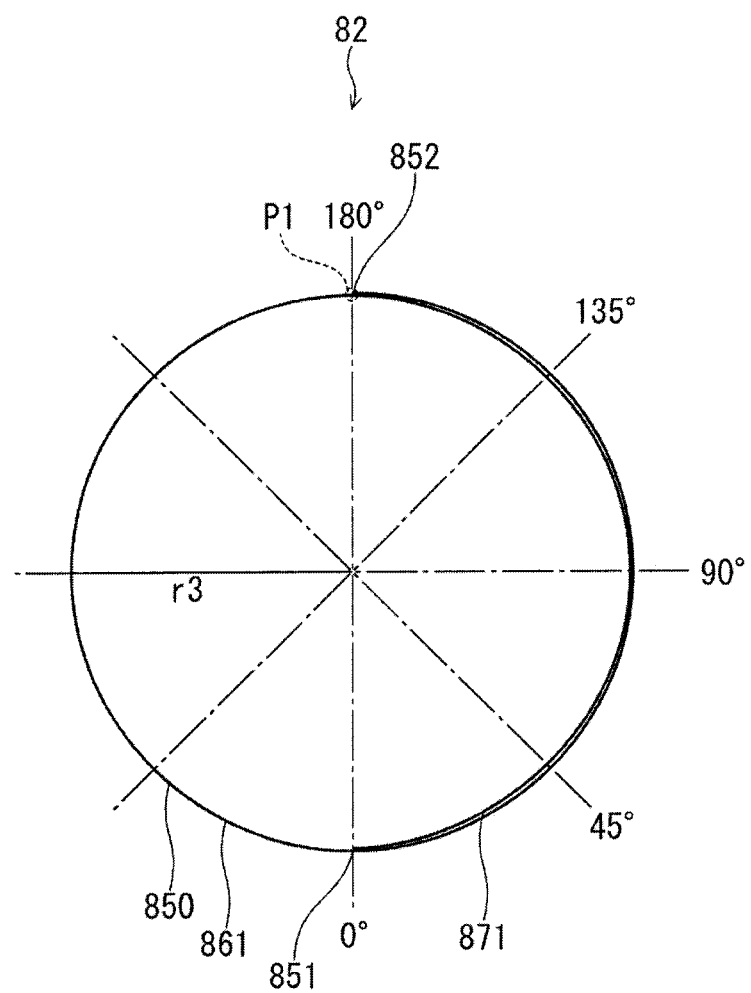
FIG. 15 is a view of a check valve of the valve timing adjustment device of the sixth embodiment in a state at the time of maximum deformation of the check valve.

FIG. 15 illustrates the advance supply check valve 82 in a state where the advance supply check valve 82 is deformed to its maximum degree at the inside of the inner sleeve 41 by the flow of the hydraulic oil applied from the advance supply openings OAs. At this time, the constant curvature portion 861 is deformed such that the constant curvature portion 861 has a reduced radius r3 that is smaller than the radii r1, r2. In the present embodiment, the valve main body 850 is formed to satisfy a relationship of R=0.58 while R denotes a curvature reduction factor and is expressed by (r2−r1)/(r2−r3). Here, r1 denotes the radius of the small curvature portion 871, which is measured in the free state of the advance supply check valve 82; r2 denotes the radius of the constant curvature portion 861, which is measured in the free state of the advance supply check valve 82; and r3 denotes the radius of the constant curvature portion 861, which is measured in the state where the advance supply check valve 82 is deformed to its maximum degree at the inside of the inner sleeve 41 by the flow of the hydraulic oil applied from the advance supply openings OAs.

As illustrated in FIG. 15, when the advance supply check valve 82 is deformed to its maximum degree at the inside of the inner sleeve 41 by the flow of the hydraulic oil applied from the advance supply openings OAs, a maximum stress generating point P1, which is a point of generating the maximum stress in the valve main body 850, is located at a position that is circumferentially displaced from the inner end 851 by about 180°.

Next, advantages of the present embodiment over first and second comparative examples will be described through comparison of the advance supply check valve 82 of the present embodiment with the first and second comparative examples.

Figure 16:
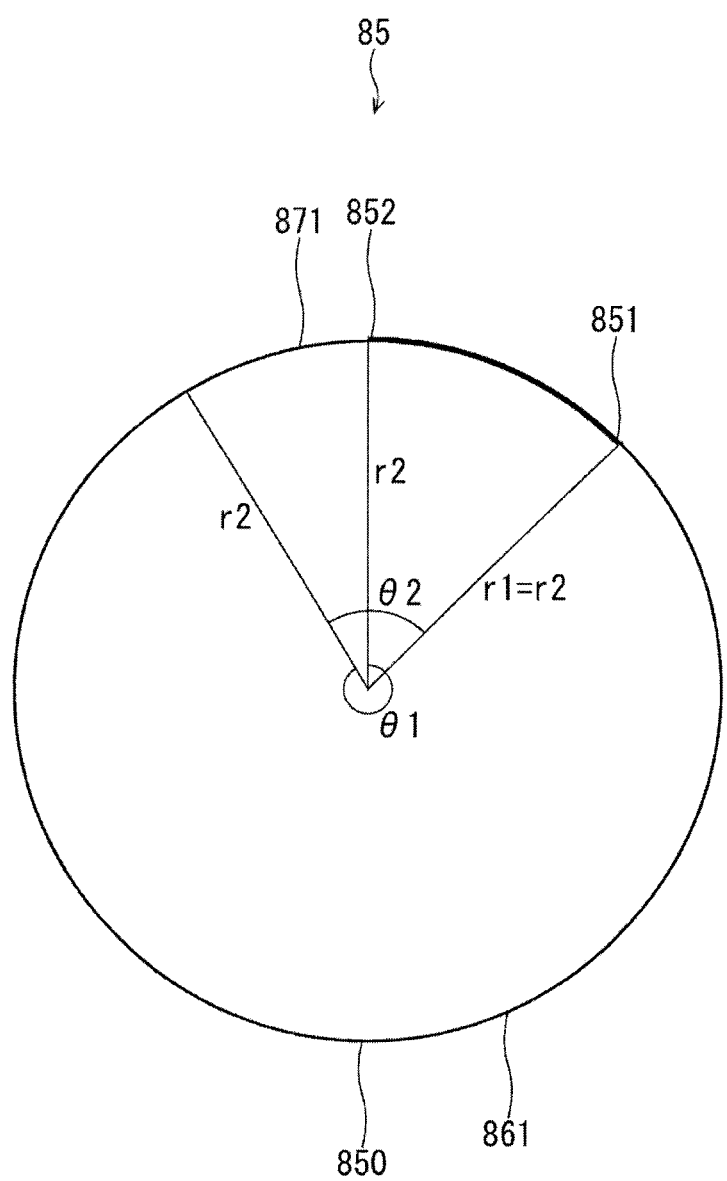
FIG. 16 is a view of a check valve of a first comparative example.

An advance supply check valve 85 of the first comparative example illustrated in FIG. 16 is different from the advance supply check valve 82 of the present embodiment with respect to that the valve main body 850 of the advance supply check valve 85 is formed to satisfy a relationship of R=0.00. Specifically, in the free state of the advance supply check valve 85 of the first comparative example, the radius r1 of the small curvature portion 871 is equal to the radius r2 of the constant curvature portion 861. Thus, in the advance supply check valve 85 of the first comparative example, it can be said that the valve main body 850 does not have the small curvature portion 871 but has the constant curvature portion 861 that has a constant curvature (r2) from the outer end 852 to the inner end 851. Accordingly, in the free state of the advance supply check valve 85, the inner peripheral wall of the outer end 852 of the valve main body 850 contacts the outer peripheral wall of the inner end 851 side portion of the valve main body 850 (see FIG. 16). The advance supply check valve 85 of the first comparative example has the configuration that is similar to the configuration of the previously proposed check valve described above.

Figure 17:
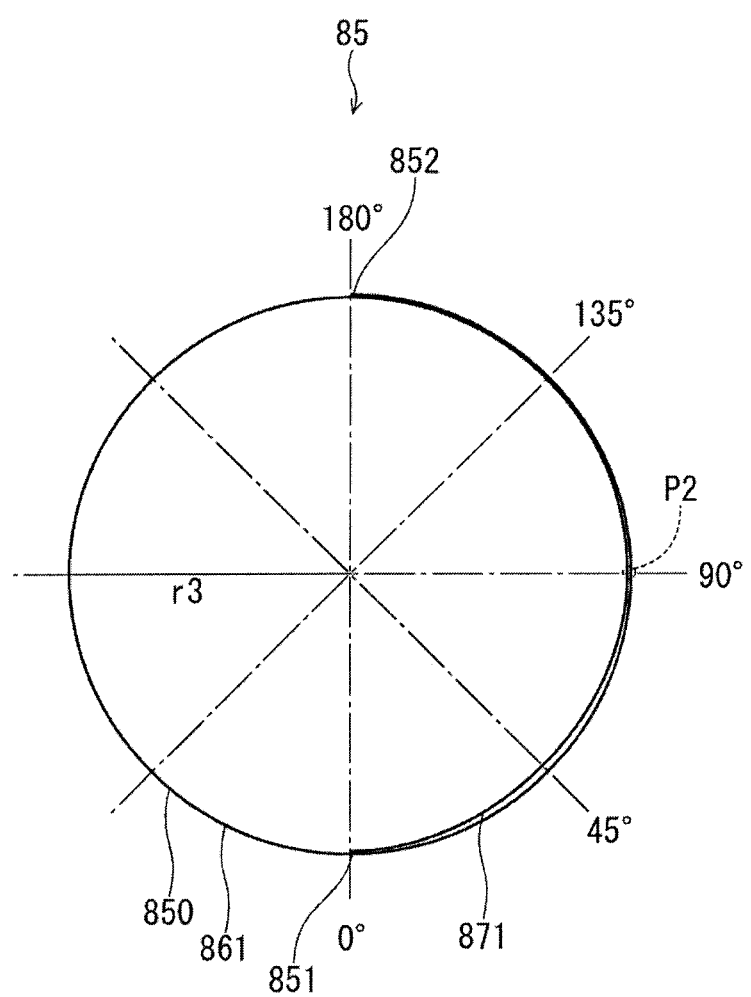
FIG. 17 is a view of the check valve of the first comparative example in a state at the time of maximum deformation of the check valve.

As illustrated in FIG. 17, when the advance supply check valve 85 of the first comparative example is deformed to its maximum degree at the inside of the inner sleeve 41 by the flow of the hydraulic oil applied from the advance supply openings OAs, the inner end 851 serves as a support point, and a maximum stress generating point P2, which is a point of generating the maximum stress in the valve main body 850, is located at a position that is circumferentially displaced from the inner end 851 by about 90°.

Figure 18:
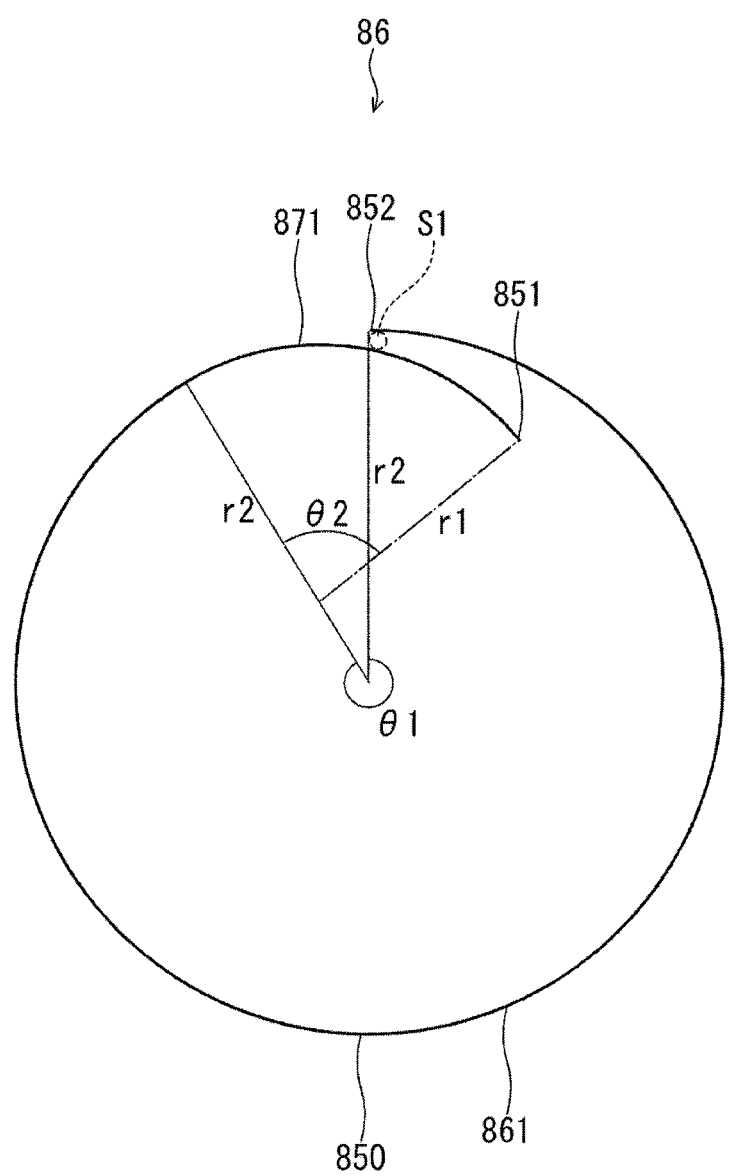
FIG. 18 is a view of a check valve of a second comparative example.

An advance supply check valve 86 of the second comparative example illustrated in FIG. 18 is different from the advance supply check valve 82 of the present embodiment with respect to that the valve main body 850 is formed to satisfy a relationship of R=1.00. Specifically, in the free state of the advance supply check valve 86 of the second comparative example, the radius r1 of the small curvature portion 871 is smaller than the radius r1 of the small curvature portion 871 of the advance supply check valve 82 of the present embodiment. Thus, in the free state of the advance supply check valve 86 of the second comparative example, the gap S1 formed between the inner peripheral wall of the outer end 852 of the valve main body 850 and the outer peripheral wall of the small curvature portion 871 is larger than the gap S1 of the advance supply check valve 82 of the present embodiment.

Figure 19:
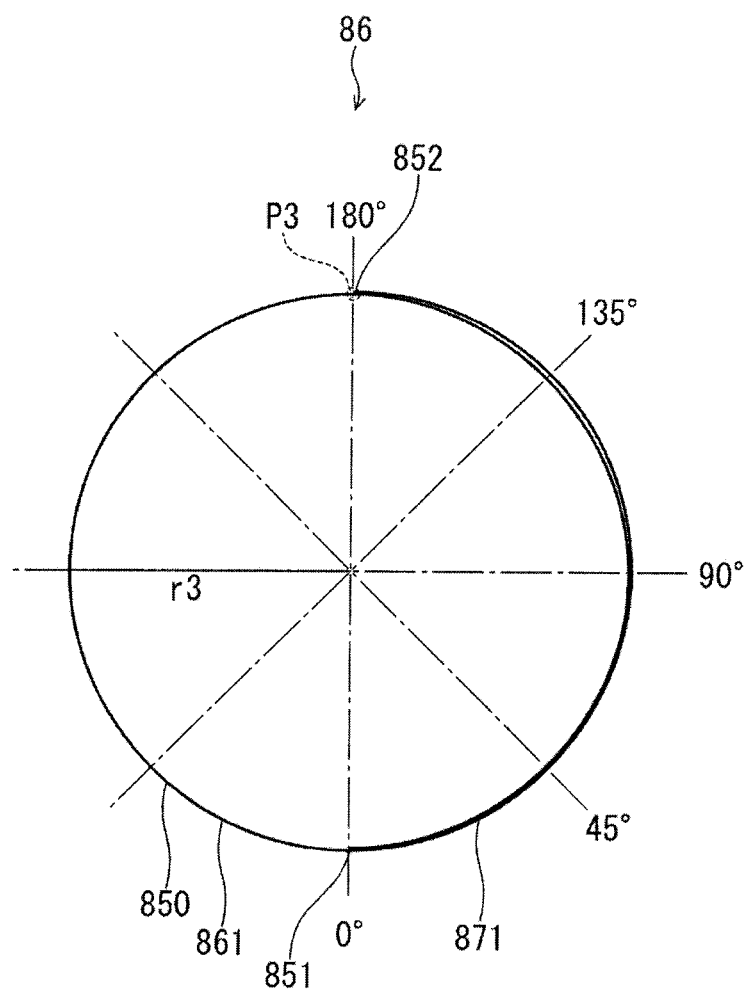
FIG. 19 is a view of the check valve of the second comparative example in a state at the time of maximum deformation of the check valve.

As illustrated in FIG. 19, when the advance supply check valve 86 of the second comparative example is deformed to its maximum degree at the inside of the inner sleeve 41 by the flow of the hydraulic oil applied from the advance supply openings OAs, a maximum stress generating point P3, which is a point of generating the maximum stress in the valve main body 850, is located at a position that is circumferentially displaced from the inner end 851 by about 180°.

Figure 20:
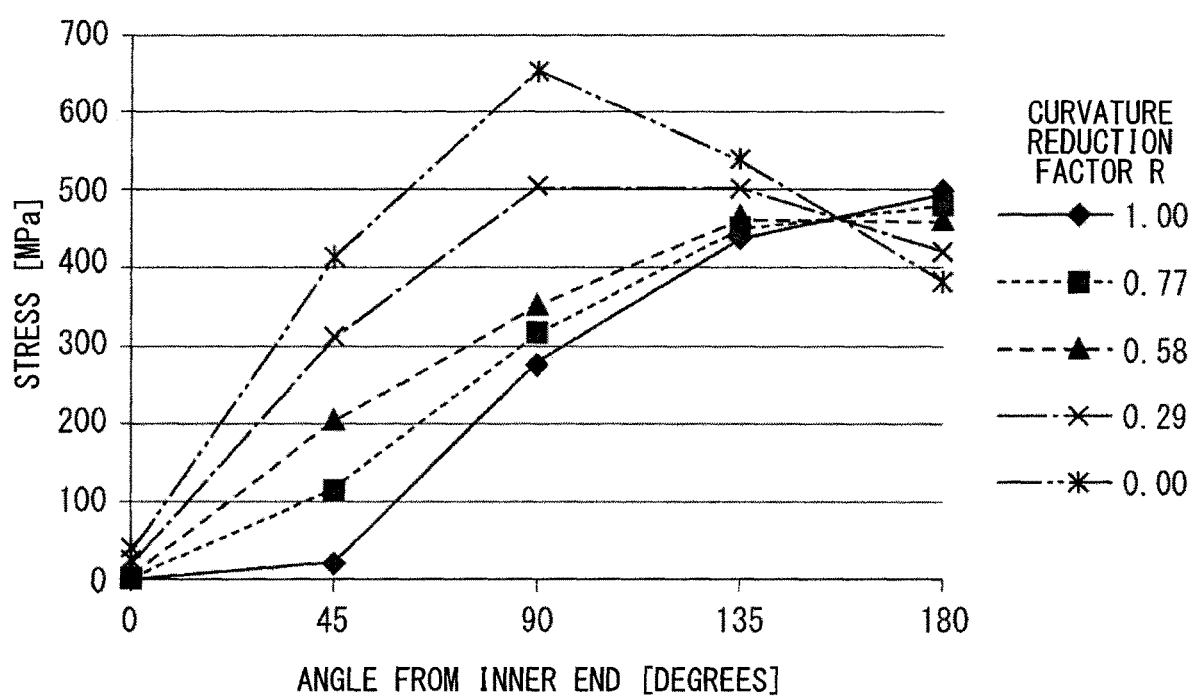
FIG. 20 is a diagram indicating a relationship between an angle, which is measured from an inner end of a valve main body, and the amount of stress generated at the valve main body, at the time of maximum deformation of the valve main body.

FIG. 20 illustrates a relationship between an angle (position), which is measured from the inner end 851 of the valve main body 850, and the amount of stress, which is generated at this angle (position), in the state where the valve main body 850 is deformed to its maximum degree at the inside of the inner sleeve 41 by the flow of the hydraulic oil from the advance supply openings OAs for various cases where the curvature reduction factors R are set to be 0.00 (the first comparative example), 0.29 and 0.58 (the present embodiment) and 0.77 and 1.00 (the second comparative example).

As illustrated in FIG. 20, in the case where the curvature reduction factor R is 0.00 (the first comparative example), the stress increases in a range of 0° to about 90° measured from the inner end 851, and the stress decreases in a range of about 90° to 180° measured from the inner end 851. Specifically, in the case where the curvature reduction factor R is 0.00 (the first comparative example), the maximum stress is generated at the position that is displaced from the inner end 851 by about 90°. Furthermore, this maximum stress is relatively large. Therefore, the large stress is generated at the position that is displaced from the inner end 851 by about 90°. That is, the stress is concentrated at the specific location to possibly cause deformation or damage of the valve main body 850.

As illustrated in FIG. 20, in the case where the curvature reduction factor R is 1.00 (the second comparative example), the stress is substantially zero in a range of 0° to about 45° measured from the inner end 851, and the stress increases in a range of about 45° to 180° measured from the inner end 851. Specifically, in the case where the curvature reduction factor R is 1.00 (the second comparative example), the maximum stress is generated at the position that is displaced from the inner end 851 by about 180°. Furthermore, this maximum stress is smaller than the maximum stress that is generated in the case where the curvature reduction factor R is 0.00 (the first comparative example). Thus, although the concentration of stress can be avoided while decreasing the stress in the valve main body 850, the amount of flexural deformation of a portion around the inner end 851 of the valve main body 850 (the range of 0° to about 45°) becomes excessively small, so that the valve main body 850 may not be able to exert a sufficient spring force.

As illustrated in FIG. 20, in the case where the curvature reduction factor R is 0.58 (the present embodiment), the stress progressively increases in a range of 0° to 180° measured from the inner end 851. Specifically, in the case where the curvature reduction factor R is 0.58 (the present embodiment), the maximum stress is generated at the position that is displaced from the inner end 851 by about 180°. Furthermore, this maximum stress is smaller than the maximum stress that is generated in the case where the curvature reduction factor R is 1.00 (the second comparative example). As a result, the valve main body 850 is smoothly flexed in the range, which is from the inner end 851 to the position of about 180°, and the sufficient amount of spring force is exerted by the valve main body 850 while reducing the amount of stress generated at the valve main body 850 and avoiding the concentration of the stress. Thus, the advance supply check valve 82 of the present embodiment is advantageous over the first and second comparative examples with respect to that the sufficient amount of spring force is exerted by the valve main body 850 while reducing the amount of stress generated at the valve main body 850 and avoiding the concentration of the stress at the valve main body 850 when the advance supply check valve 82 is deformed to its maximum degree.

As illustrated in FIG. 20, even in the case where the curvature reduction factor R is 0.29, the concentration of stress can also be avoided while reducing the stress generated at the valve main body 850 in comparison to the case where the curvature reduction factor R is 0.00 (the first comparative example). Moreover, even in the case where the curvature reduction factor R is 0.77, the amount of flexural deformation of a portion around the inner end 851 of the valve main body 850 (from 0° to about 45°) can be made larger than that of the case where the curvature reduction factor R is 1.00 (the second comparative example). Thereby, the valve main body 850 can exert an appropriate amount of spring force.

In the present embodiment, the curvature (r1) of the small curvature portion 871 measured in the free state of the advance supply check valve 82 (see FIG. 14) is set to be larger than the curvature (r3) of the constant curvature portion 861 measured in the state where the advance supply check valve 82 is deformed to its maximum degree at the inside of the inner sleeve 41 by the flow of the hydraulic oil applied from the advance supply openings OAs (see FIG. 15).

In the present embodiment, the small curvature portion 871 is formed to include the inner end 851 of the valve main body 850. In the state where the advance supply check valve 82 is installed at the inside of the inner sleeve 41, the end portion of the small curvature portion 871, which is opposite to the constant curvature portion 861, i.e., the inner end 851 of the small curvature portion 871 is spaced away from the inner peripheral wall of the constant curvature portion 861 (see FIG. 12). The end of the small curvature portion 871, which is opposite to the constant curvature portion 861, i.e., the inner end 851 of the small curvature portion 871 contacts the inner peripheral wall of the constant curvature portion 861 before the time, at which the advance supply check valve 82 is deformed to its maximum degree at the inside of the inner sleeve 41 by the flow of the hydraulic oil applied from the advance supply openings OAs (see FIG. 15).

Specifically, according to the present embodiment, in the state where the advance supply check valve 82 is installed at the inside of the inner sleeve 41, the inner end 851 of the valve main body 850 is spaced away from the inner peripheral wall of the outer end 852 side portion of the valve main body 850. Thereafter, the inner end 851 of the valve main body 850 contacts the inner peripheral wall of the outer end 852 side portion of the valve main body 850 before the time, at which the advance supply check valve 82 is deformed to its maximum degree at the inside of the inner sleeve 41 by the flow of the hydraulic oil applied from the advance supply openings OAs.

As described above, in the present embodiment, the retard supply check valve 81 and the advance supply check valve 82 are provided. The retard supply check valve 81 and the advance supply check valve 82 are installed at the inside of the inner sleeve 41. In the present embodiment, the inner sleeve 41 is the tubular member and includes the retard supply openings ORs and the advance supply openings OAs, which serve as the inflow holes that communicate between the outer peripheral wall and the inner peripheral wall of the inner sleeve 41. Each of the retard supply check valve 81 and the advance supply check valve 82 (hereinafter referred to as a supply check valve 81, 82 for the sake of simplification) includes the valve main body 850 and is configured to enable the flow of the hydraulic oil to the inside of the inner sleeve 41 through the corresponding ones of the retard supply openings ORs and the advance supply openings OAs and limit the flow of the hydraulic oil from the inside of the inner sleeve 41 toward the corresponding ones (hereinafter referred to as corresponding supply openings ORs, OAa) of the retard supply openings ORs and the advance supply openings OAs. The valve main body 850 is shaped in the tubular form by rolling the single plate material.

In the free state of the supply check valve 81, 82, the valve main body 850 has: the constant curvature portion 861 that has the constant curvature and is located at a specific portion of the valve main body 850 between the inner end 851, which is the one circumferential end of the valve main body 850, and the outer end 852, which is the other circumferential end of the valve main body 850; and the small curvature portion 871 that has the curvature smaller than the curvature of the constant curvature portion 861 and is circumferentially located at another portion of the valve main body 850, which is other than the constant curvature portion 861. Thereby, the timing of starting the deformation of the inner end 851 side portion of the valve main body 850 can be delayed relative to the timing of starting the deformation of the outer end 852 side portion of the valve main body 850 when the supply check valve 81, 82 is radially inwardly deformed to shrink and is opened at the inside of the inner sleeve 41 by the flow of the hydraulic oil applied from the corresponding supply openings ORs, OAs. Therefore, it is possible to limit the phenomenon, in which the inner end 851 acts as the support point, and the stress caused by the bias of the load is generated at the location that is circumferentially displaced from the inner end 851 by about 90°. As a result, the deformation or the damage of each of the retard supply check valve 81 and the advance supply check valve 82 can be limited. In the present embodiment, the valve main body 850 is formed such that in the free state of the supply check valve 81, 82, the inner end 851 side portion of the valve main body 850 is placed on the radially inner side of the outer end 852 side portion of the valve main body 850, that is, the two end portions of the valve main body 850 overlap with each other in the circumferential direction.

Furthermore, in the present embodiment, the small curvature portion 871 is formed at the inner end 851 of the valve main body 850. By placing the small curvature portion 871 adjacent to the inner end 851 of the valve main body 850, the contact point of the valve main body 850, which contacts the outer end 852 side portion of the valve main body 850, is progressively displaced in the circumferential direction in response to a decrease in the diameter of the valve main body 850. Thereby, it is possible to limit generation of an extreme inflection point in a spring load characteristic of the valve main body 850 that would be otherwise generated by a rapid change in the location of the contact point.

In the present embodiment, the curvature of the small curvature portion 871 of the supply check valve 81, 82 is set as follows. Specifically, the curvature of the small curvature portion 871, which is measured in the free state of the supply check valve 81, 82, is set to be larger than the curvature of the constant curvature portion 861, which is measured in the state where the supply check valve 81, 82 is deformed to its maximum degree at the inside of the inner sleeve 41 by the flow of the hydraulic oil applied from the corresponding supply openings ORs, OAs. By setting the curvature of the small curvature portion 871 to a value, which is larger than the curvature at the time of maximum deformation of the entire valve main body 850, the entire small curvature portion 871 can be deformed to exert the larger spring force.

Furthermore, according to the present embodiment, in the state where the supply check valve 81, 82 is installed at the inside of the inner sleeve 41, the inner end 851 of the valve main body 850 is spaced away from the inner peripheral wall of the outer end 852 side portion of the valve main body 850. Thereafter, the inner end 851 of the valve main body 850 contacts the inner peripheral wall of the outer end 852 side portion of the valve main body 850, before the time, at which the supply check valve 81, 82 is deformed to its maximum degree at the inside of the inner sleeve 41 by the flow of the hydraulic oil applied from the corresponding supply openings ORs, OAs. Thereby, the valve main body 850 can exert the spring force at a time point that falls in a time period from the time of being installed at the inside of the inner sleeve 41 to the time of maximum deformation of the valve main body 850 while the stress concentration at the valve main body 850 is avoided.

In the present embodiment, the valve main body 850 is formed to satisfy a relationship of $R > 0.29$ while the curvature reduction factor $R$ is expressed by $(r_2 - r_1)/(r_2 - r_3)$. Here, $r_1$ denotes the radius of the small curvature portion 871, which is measure in the free state of the supply check valve 81, 82; r2 denotes the radius of the constant curvature portion 861, which is measured in the free state of the supply check valve 81, 82; and r3 denotes the radius of the constant curvature portion 861, which is measured in the state where the supply check valve 81, 82 is deformed to its maximum degree at the inside of the inner sleeve 41 by the flow of the hydraulic oil applied from the corresponding advance supply openings OAs, ORs. Thereby, the concentration of the stress at the valve main body 850 can be avoided while the stress generated at the valve main body 850 is reduced.

Moreover, in the present embodiment, the valve main body 850 is formed to satisfy a relationship of R<0.77. As a result, the amount of flexural deformation of a portion around the inner end 851 of the valve main body 850 (the range from 0° to about 45°) can be increased, and thereby the valve main body 850 can exert an appropriate amount of spring force. In the present embodiment, the valve main body 850 is formed to satisfy the relationship of R=0.58 and can thus be deformed smoothly in the range, which is from the inner end 851 to the position of about 180°, and the sufficient amount of spring force can be exerted by the valve main body 850 while reducing the amount of stress generated at the valve main body 850 and avoiding the concentration of the stress at the valve main body 850.

Seventh Embodiment

Figure 21:
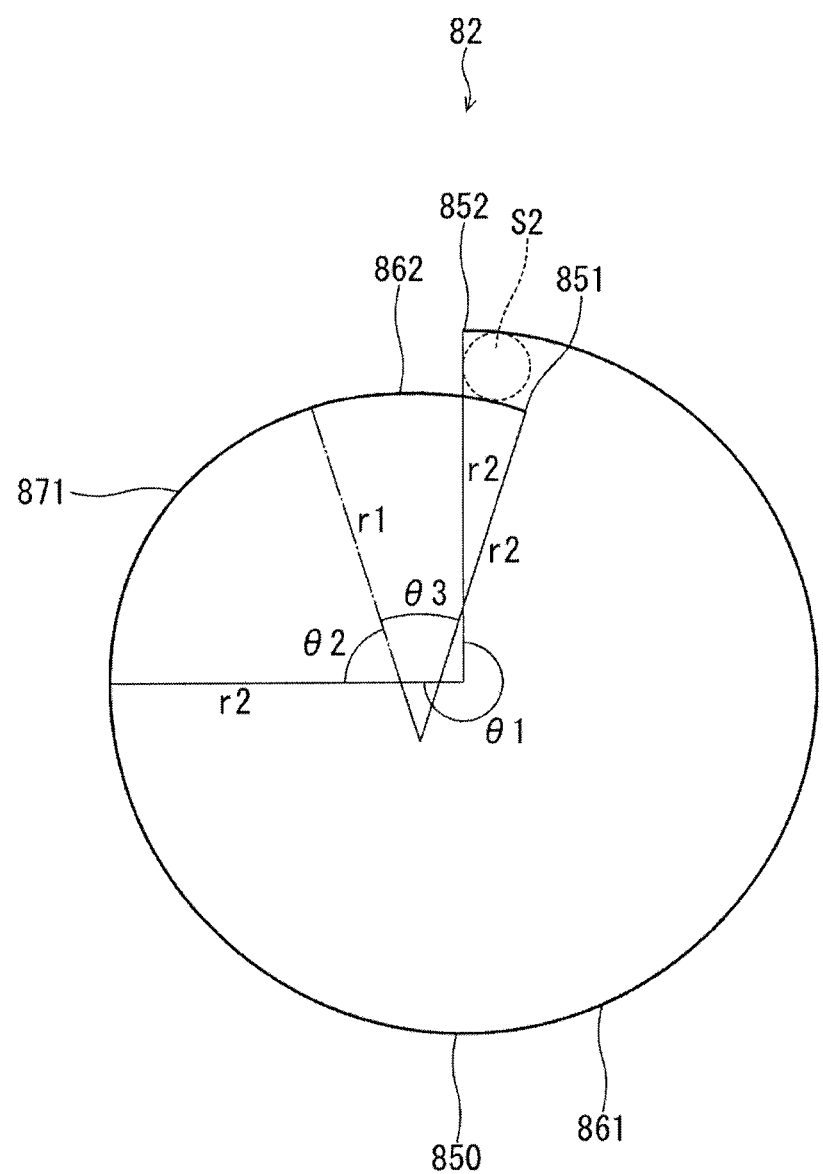
FIG. 21 is a view of a check valve according to a seventh embodiment.

FIG. 21 illustrates an advance supply check valve, which is a component of a valve timing adjustment device according to a seventh embodiment of the present disclosure. The seventh embodiment differs from the sixth embodiment with respect to the configurations of the retard supply check valve 81 and the advance supply check valve 82.

FIG. 21 illustrates the advance supply check valve 82 in the free state. As illustrated in FIG. 21, in the advance supply check valve 82 of the present embodiment, the valve main body 850 has the constant curvature portion 861, the small curvature portion 871 and a constant curvature portion 862. The constant curvature portion 861 is a specific portion of the valve main body 850 in the circumferential direction of the valve main body 850. One end of the constant curvature portion 861 coincides with the outer end 852, and the other end of the constant curvature portion 861 is located between the outer end 852 and the inner end 851. The small curvature portion 871 is a specific portion in the circumferential direction of the valve main body 850. One end of the small curvature portion 871 coincides with the other end of the constant curvature portion 861, and the other end of the small curvature portion 871 is located between outer end 852 and the inner end 851. The constant curvature portion 862 is a specific portion in the circumferential direction of the valve main body 850. One end of the constant curvature portion 862 coincides with the other end of the small curvature portion 871, and the other end of the constant curvature portion 862 coincides with the inner end 851.

Each of the constant curvature portion 861 and the constant curvature portion 862 is formed such that a curvature is constant throughout the entire extent of the constant curvature portion 861, 862, which is from one end to the other end of the constant curvature portion 861, 862, in the free state of the advance supply check valve 82. Furthermore, the small curvature portion 871 has a constant curvature along an entire extent of the small curvature portion 871, which is from the one end to the other end of the small curvature portion 871, in the free state of the advance supply check valve 82. Here, the radius r1 of the small curvature portion 871 is smaller than the radius r2 of each of the constant curvature portions 861, 862 (see FIG. 21). Specifically, in the free state of the advance supply check valve 82, the valve main body 850 has: the constant curvature portions 861, 862, each of which has the constant curvature and is located at the corresponding specific circumferential portion; and the small curvature portion 871, which has the curvature smaller than the curvature of each of the constant curvature portions 861, 862 and is located at the other circumferential portion that is other than the constant curvature portions 861, 862. In other words, the small curvature portion 871 is located between the inner end 851 and the outer end 852 of the valve main body 850 such that the small curvature portion 871 is formed at the location that is spaced away from both of the inner end 851 and the outer end 852.

An angle θ1 measured from one end to the other end of the constant curvature portion 861 is, for example, about 270°. An angle θ2 measured from one end to the other end of the small curvature portion 871 is, for example, about 70°. An angle θ3 measured from one end to the other end of the constant curvature portion 862 is, for example, about 35°. When the advance supply check valve 82 is in the free state, the outer end 852 of the valve main body 850 is positioned on the radially outer side of the constant curvature portion 862. At this time, a gap S2 is formed between the inner peripheral wall of the outer end 852 of the valve main body 850 and the outer peripheral wall of the constant curvature portion 862 of the valve main body 850 (see FIG. 21). As discussed above, in the present embodiment, the valve main body 850 is formed such that in the free state of the advance supply check valve 82, the inner end 851 side portion of the valve main body 850 is placed on the radially inner side of the outer end 852 side portion of the valve main body 850, that is, the two end portions of the valve main body 850 overlap with each other in the circumferential direction. The configuration of the retard supply check valve 81 is similar to the configuration of the advance supply check valve 82.

As discussed above, in the present embodiment, in the free state of the supply check valve 81, 82, the valve main body 850 has: the constant curvature portions 861, 862 that respectively have the constant curvature and are respectively located at the corresponding specific portion of the valve main body 850 between the inner end 851, which is the one circumferential end of the valve main body 850, and the outer end 852, which is the other circumferential end of the valve main body 850; and the small curvature portion 871 that has the curvature smaller than the curvature of each of the constant curvature portions 861, 862 and is circumferentially located at the other portion of the valve main body 850, which is other than the constant curvature portions 861, 862. Thus, similar to the sixth embodiment, in the present embodiment, the deformation or the damage of the retard supply check valve 81 and the advance supply check valve 82 can be limited. In the present embodiment, the valve main body 850 is formed such that in the free state of the supply check valve 81, 82, the inner end 851 side portion of the valve main body 850 is placed on the radially inner side of the outer end 852 side portion of the valve main body 850, that is, the two end portions of the valve main body 850 overlap with each other in the circumferential direction.

In the present embodiment, the small curvature portion 871 is formed between the inner end 851 and the outer end 852. The small curvature portion 871 is formed at the position, which is spaced away from each of the inner end 851 and the outer end 852 by a predetermined distance, and the small curvature portion 871 does not overlap with the outer end 852 in the circumferential direction.

Eighth Embodiment

Figure 22:
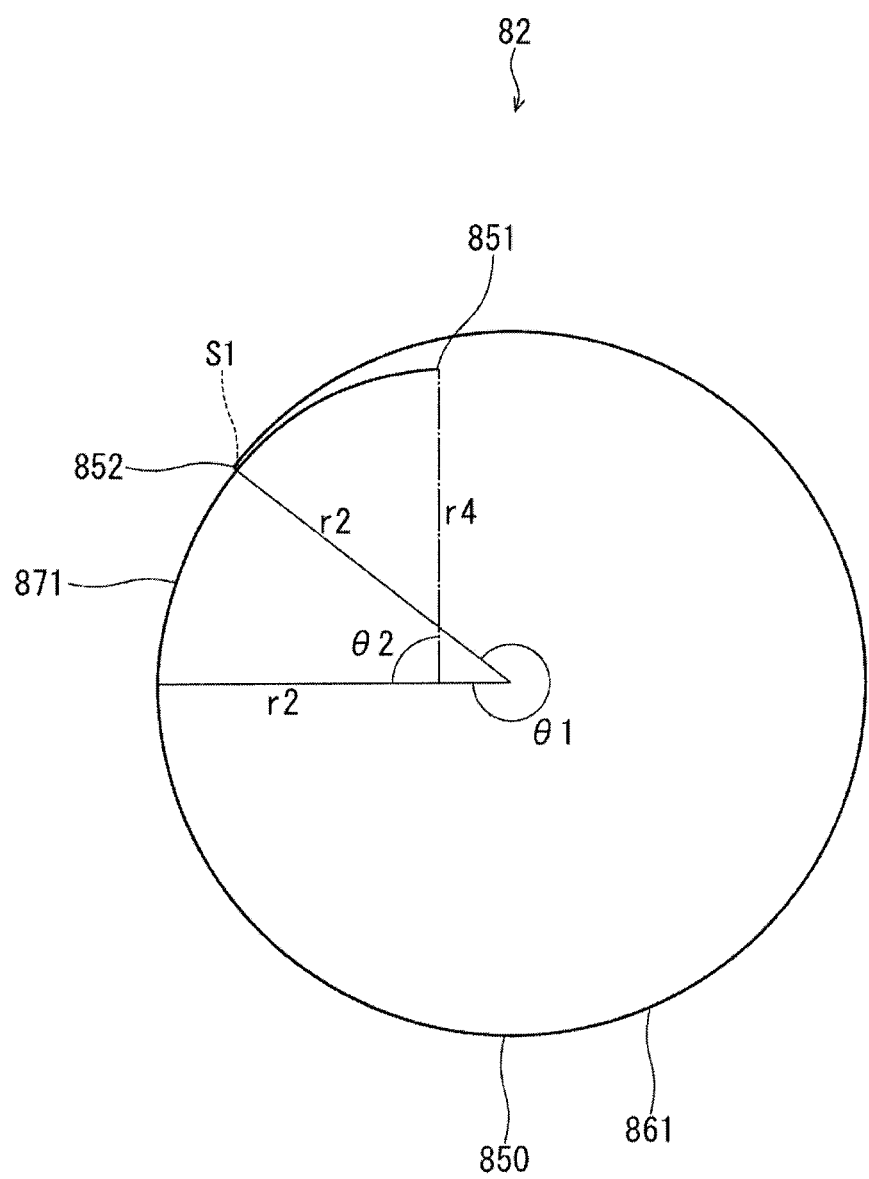
FIG. 22 is a view of a check valve according to an eighth embodiment.

FIG. 22 illustrates an advance supply check valve, which is a component of a valve timing adjustment device according to an eighth embodiment of the present disclosure. The eighth embodiment differs from the sixth embodiment with respect to the configurations of the retard supply check valve 81 and the advance supply check valve 82.

FIG. 22 illustrates the advance supply check valve 82 in the free state. In the present embodiment, the small curvature portion 871 is formed such that the radius of the small curvature portion 871 is progressively reduced from one end to the other end of the small curvature portion 871. One end of the small curvature portion 871, i.e., the constant curvature portion 861 side end of the small curvature portion 871 has the radius of r2, and the other end of the small curvature portion 871, i.e., the inner end 851 has the radius of r4. An average of the radius r2 and the radius r4 is r1. Here, the valve main body 850 is formed to satisfy the relationship of R=0.58 while R denotes the curvature reduction factor expressed by (r2−r1)/(r2−r3). Here, r3 denotes the radius of the constant curvature portion 861, which is measured in the state where advance supply check valve 82 is deformed to its maximum degree at the inside of the inner sleeve 41 by the flow of the hydraulic oil applied from the advance supply openings OAs. The configuration of the retard supply check valve 81 is similar to the configuration of the advance supply check valve 82. Similar to the sixth embodiment, in the present embodiment, the deformation or the damage of the retard supply check valve 81 and the advance supply check valve 82 can be limited.

Ninth Embodiment

Figure 23:
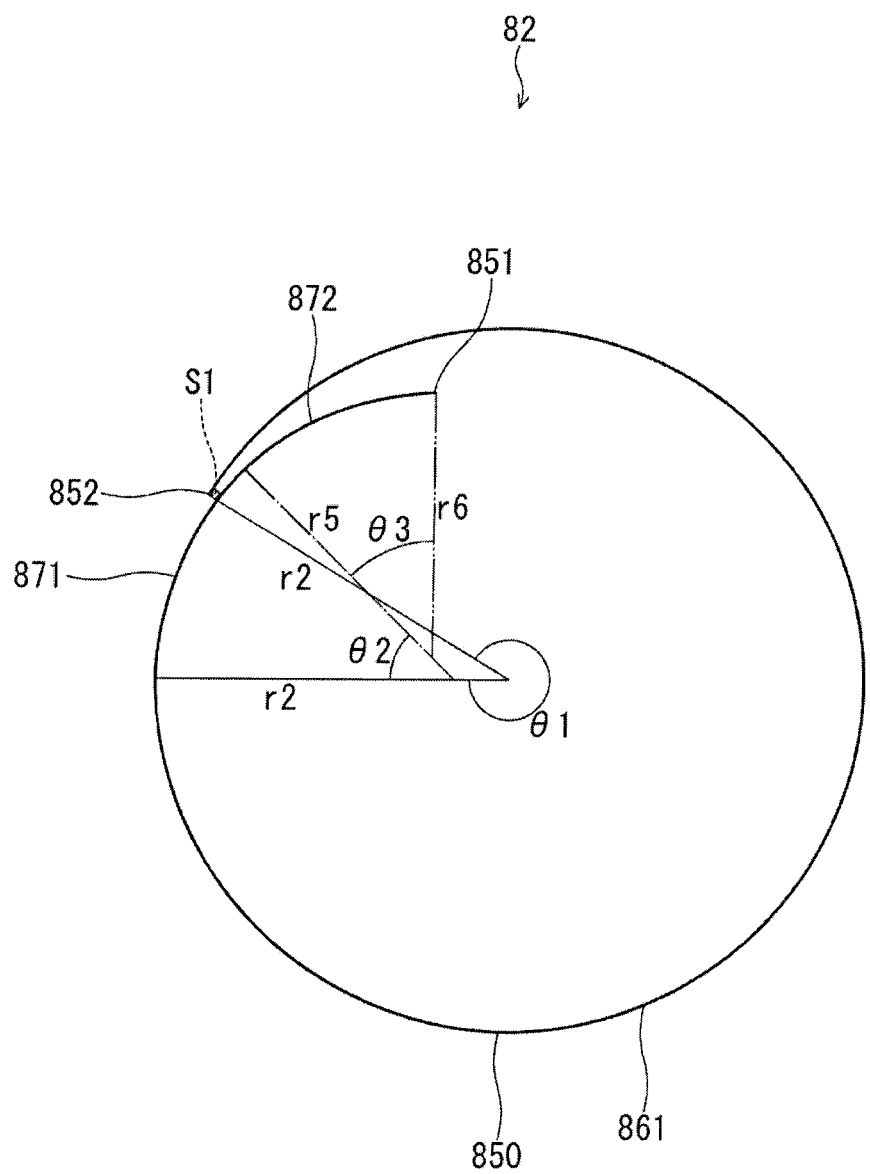
FIG. 23 is a view of a check valve according to a ninth embodiment.

FIG. 23 illustrates an advance supply check valve, which is a component of a valve timing adjustment device according to a ninth embodiment of the present disclosure. The ninth embodiment differs from the sixth embodiment with respect to the configurations of the retard supply check valve 81 and the advance supply check valve 82.

FIG. 23 illustrates the advance supply check valve 82 in the free state. In the present embodiment, the valve main body 850 has the constant curvature portion 861, the small curvature portion 871 and a small curvature portion 872. The constant curvature portion 861 is a specific portion of the valve main body 850 in the circumferential direction of the valve main body 850. One end of the constant curvature portion 861 coincides with the outer end 852, and the other end of the constant curvature portion 861 is located between the outer end 852 and the inner end 851. The small curvature portion 871 is a specific portion in the circumferential direction of the valve main body 850. One end of the small curvature portion 871 coincides with the other end of the constant curvature portion 861, and the other end of the small curvature portion 871 is located between outer end 852 and the inner end 851. The small curvature portion 872 is a specific portion in the circumferential direction of the valve main body 850. One end of the small curvature portion 872 coincides with the other end of the small curvature portion 871, and the other end of the small curvature portion 872 coincides with the inner end 851.

An angle θ1 measured from the one end to the other end of the constant curvature portion 861 is, for example, about 330°. An angle θ2 measured from the one end to the other end of the small curvature portion 871 is, for example, about 45°. An angle θ3 measured from one end to the other end of the small curvature portion 872 is, for example, about 45°. When the advance supply check valve 82 is in the free state, the outer end 852 of the valve main body 850 is positioned on a radially outer side of a portion around the other end of the small curvature portion 871 (see FIG. 23).

In the free state of the advance supply check valve 82, the constant curvature portion 861 has a constant curvature along an entire extent of the constant curvature portion 861, which is from the one end to the other end of the constant curvature portion 861. Furthermore, when the advance supply check valve 82 is in the free state, each of the small curvature portions 871, 872 has a constant curvature throughout the entire extent of the small curvature portion 871, 872, which is from the one end to the other end of the small curvature portion 871, 872. Here, a radius r5 of the small curvature portion 871 is smaller than the radius r2 of the constant curvature portion 861. A radius r6 of the small curvature portion 872 is smaller than the radius r5 of the small curvature portion 871 (see FIG. 23). An average of the radius r5 and the radius r6 is r1. Here, the valve main body 850 is formed to satisfy the relationship of R=0.58 while R denotes the curvature reduction factor expressed by (r2−r1)/(r2−r3). Here, r3 denotes the radius of the constant curvature portion 861, which is measured in the state where advance supply check valve 82 is deformed to its maximum degree at the inside of the inner sleeve 41 by the flow of the hydraulic oil applied from the advance supply openings OAs. The configuration of the retard supply check valve 81 is similar to the configuration of the advance supply check valve 82. Similar to the sixth embodiment, in the present embodiment, the deformation or the damage of the retard supply check valve 81 and the advance supply check valve 82 can be limited.

Tenth Embodiment

Figure 24:
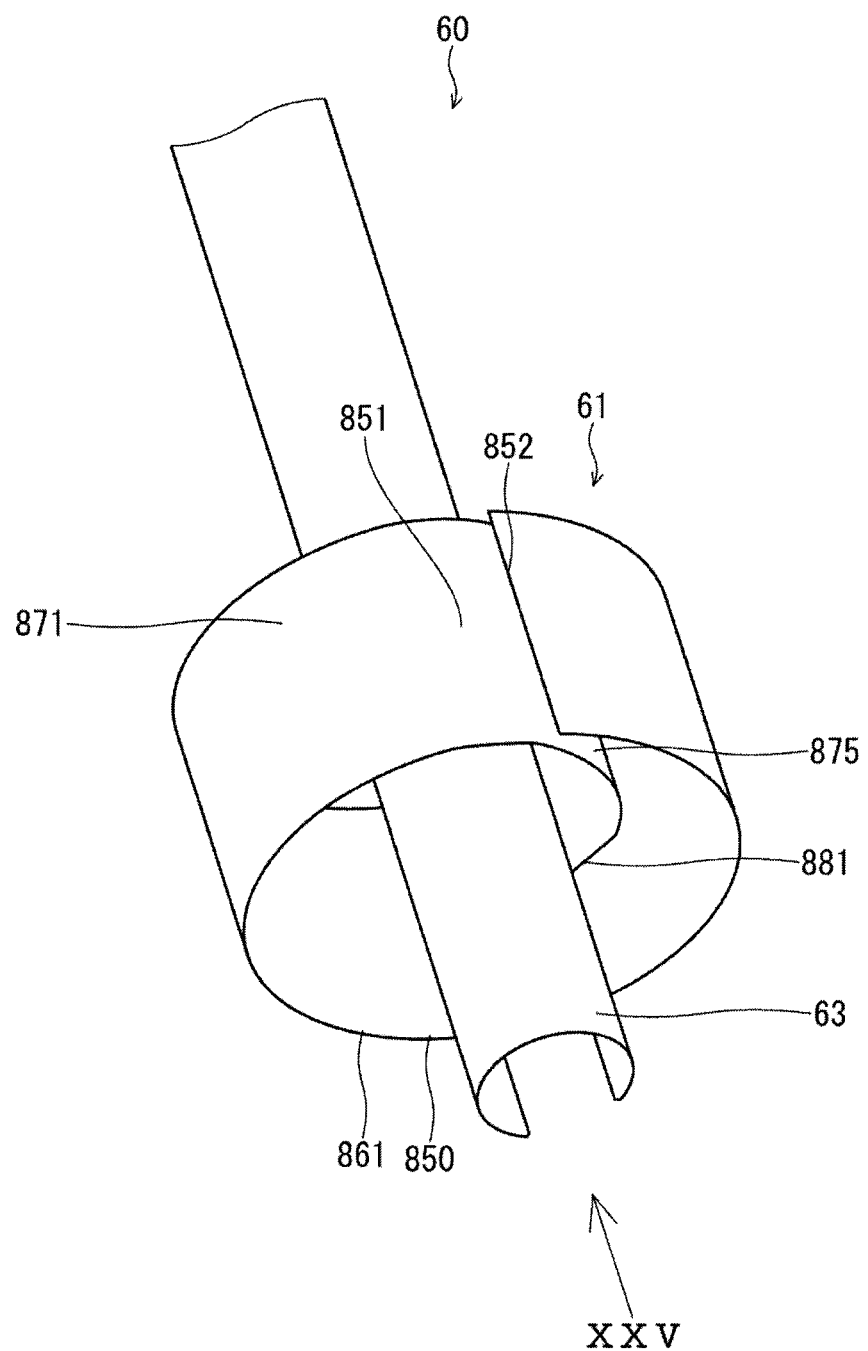
FIG. 24 is a perspective view of a check valve according to a tenth embodiment.
Figure 25:
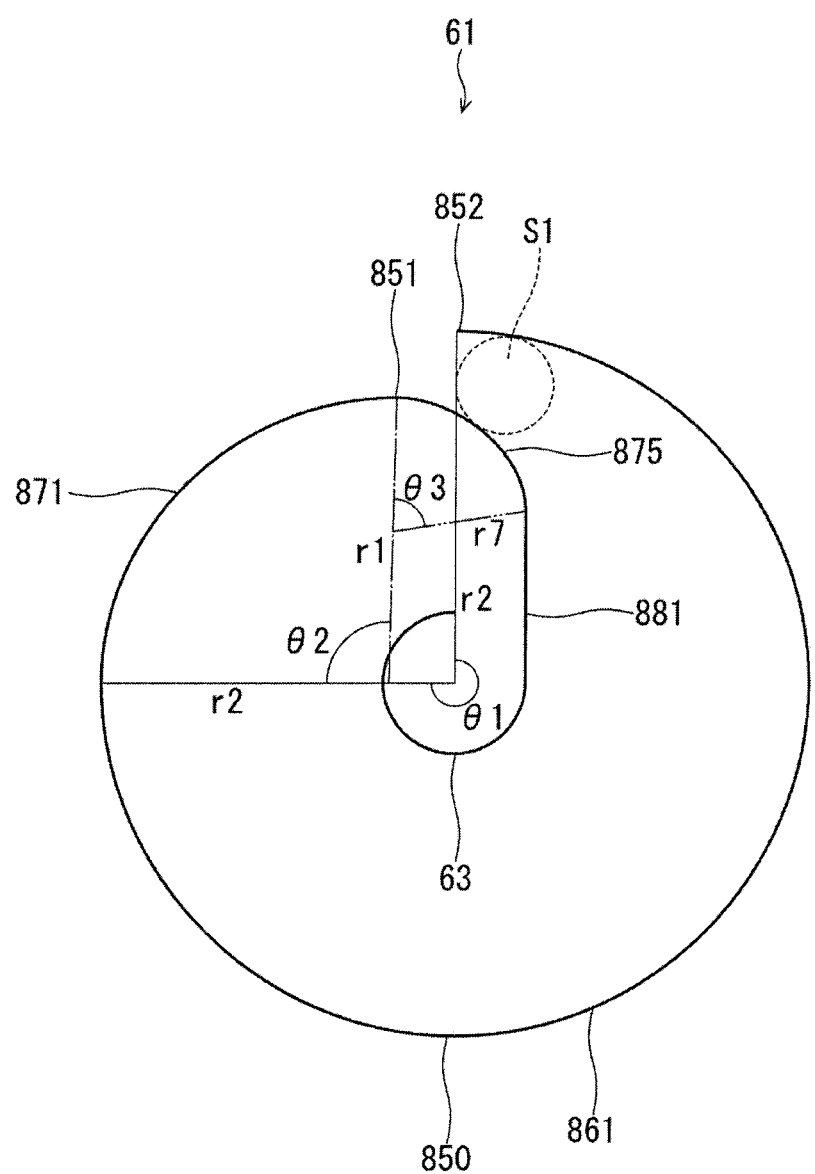
FIG. 25 is a view taken in a direction of an arrow XXV in FIG. 24.

FIGS. 24 and 25 illustrate a check valve, which is a component of a valve timing adjustment device according to a tenth embodiment of the present disclosure. The tenth embodiment differs from the first embodiment with respect to the configurations of the supply check valve 61 and the recycle check valve 62. The configuration of the recycle check valve 62 is similar to the configuration of the supply check valve 61, so that only the configuration of the supply check valve 61 will be described, and the configuration of the recycle check valve 62 will not be described for the sake of simplicity.

FIGS. 24 and 25 illustrate the supply check valve 61 of the check valve 60 in the free state. In the present embodiment, the supply check valve 61 includes the valve main body 850, a small curvature portion 875, and a planar portion 881. The valve main body 850 has the constant curvature portion 861 and the small curvature portion 871. The constant curvature portion 861 is a specific portion of the valve main body 850 in the circumferential direction of the valve main body 850. One end of the constant curvature portion 861 coincides with the outer end 852, and the other end of the constant curvature portion 861 is located between the outer end 852 and the inner end 851. The small curvature portion 871 is another specific portion of the valve main body 850 in the circumferential direction of the valve main body 850. One end of the small curvature portion 871 coincides with the other end of the constant curvature portion 861, and the other end of the small curvature portion 871 coincides with the inner end 851.

One end of the small curvature portion 875 coincides with the other end of the small curvature portion 871, i.e., the inner end 851 of the valve main body 850. The planar portion 881 is shaped in a planar form. The planar portion 881 is integrally formed with the valve main body 850, the small curvature portion 875 and the shaft 63 such that one end of the planar portion 881 is connected to the other end of the small curvature portion 875, and the other end of the planar portion 881 is connected to the shaft 63. The shaft 63, the planar portion 881, and the small curvature portion 875 support the valve main body 850.

An angle θ1 measured from the one end to the other end of the constant curvature portion 861 is, for example, about 270°. An angle θ2 measured from the one end to the other end of the small curvature portion 871 is, for example, about 90°. An angle θ3 measured from the one end to the other end of the small curvature portion 875 is, for example, about 90°. When the supply check valve 61 is in the free state, the outer end 852 of the valve main body 850 is positioned on a radially outer side of a portion around the one end of the small curvature portion 875. At this time, the gap S1 is formed between the inner peripheral wall of the outer end 852 of the valve main body 850 and the outer peripheral wall of the small curvature portion 875 (see FIG. 25). Thus, in the present embodiment, the valve main body 850 is formed such that the inner end 851 and the outer end 852 do not overlap with each other in the circumferential direction when the supply check valve 61 is in the free state.

When the supply check valve 61 is in the free state, the constant curvature portion 861 has a constant curvature along an entire extent of the constant curvature portion 861, which is from the one end to the other end of the constant curvature portion 861. Furthermore, when the supply check valve 61 is in the free state, each of the small curvature portions 871, 875 has a constant curvature throughout the entire extent of the small curvature portion 871, 875, which is from the one end to the other end of the small curvature portion 871, 875. Here, the radius r1 of the small curvature portion 871 is smaller than the radius r2 of the constant curvature portion 861. A radius r7 of the small curvature portion 875 is smaller than the radius r1 of the small curvature portion 871 (see FIG. 25). The valve main body 850 is formed to satisfy the relationship of R=0.58 where R denotes the curvature reduction factor expressed by (r2−r1)/(r2−r3). Here, r3 denotes the radius of the constant curvature portion 861 measured in the state where the supply check valve 61 is deformed to its maximum degree at the inside of the spool 50 by the flow of the hydraulic oil applied from the supply passages 54. Moreover, the dimension of r3 is adjusted to satisfy a relationship of r3>r7, so that the small curvature portion 875 is not deformed and thus exerts no spring force even when the supply check valve 61 is deformed to its maximum degree.

Next, advantages of the present embodiment over a third comparative example will be described by comparing the supply check valve 61 of the present embodiment with the third comparative example.

Figure 26:
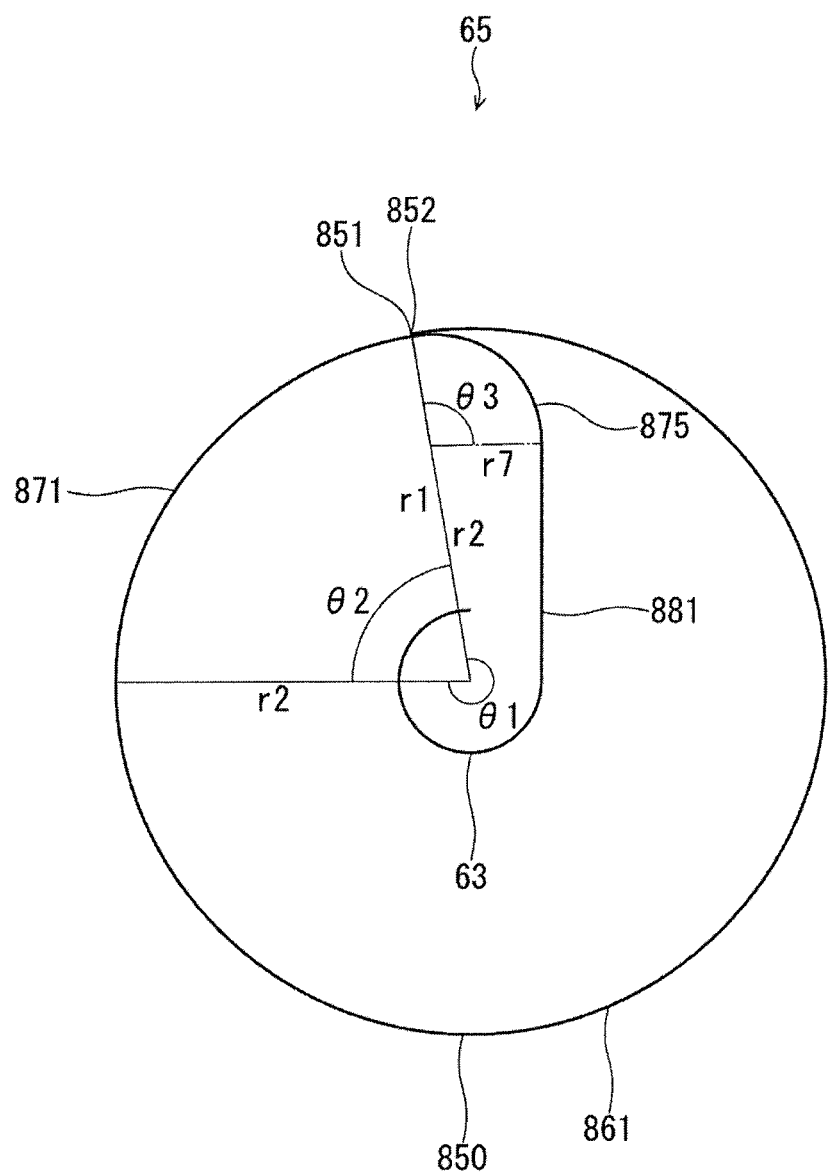
FIG. 26 is a view of a check valve according to a third comparative example.

A supply check valve 65 of the third comparative example illustrated in FIG. 26 is different from the supply check valve 61 of the present embodiment with respect to that the radius r1 of the small curvature portion 871 is the same as the radius r2 of the constant curvature portion 861. Thus, in the supply check valve 65 of the third comparative example, it can be said that the valve main body 850 does not have the small curvature portion 871 but has the constant curvature portion 861 that has a constant curvature (r2) from the outer end 852 to one end of the small curvature portion 875, i.e., the inner end 851. In the supply check valve 65 of the third comparative example, an angle θ1 measured from the one end to the other end of the constant curvature portion 861 is, for example, about 270°. An angle θ2 measured from the one end to the other end of the constant curvature portion 871 is, for example, about 90°. Thereby, when the supply check valve 65 is in the free state, the inner peripheral wall of the outer end 852 of the valve main body 850 contacts the outer peripheral wall of the small curvature portion 871 of the valve main body 850 (see FIG. 26). The supply check valve 65 of the third comparative example is formed such that the valve main body 850 satisfies the relationship of R=0.00. The supply check valve 65 of the third comparative example has the configuration that is similar to the configuration of the supply check valve 61 of the first embodiment.

When the supply check valve 65 of the third comparative example is deformed to its maximum degree at the inside of the spool 50 by the flow of the hydraulic oil applied from the supply passages 54, the inner end 851 serves as a support point, and a maximum stress generating point, which is a point of generating the maximum stress in the valve main body 850, is located at a position that is circumferentially displaced from the inner end 851 by about 90°.

In contrast, when the supply check valve 61 of the present embodiment is deformed to its maximum degree at the inside of spool 50 by the flow of the hydraulic oil applied from the supply passages 54, a maximum stress generating point, which is a point of generating the maximum stress in the valve main body 850, is located at a position that is displaced from the inner end 851 by about 180°. This maximum stress is lower than the maximum stress generated at the supply check valve 65 of the third comparative example. Thus, the supply check valve 61 of the present embodiment is advantageous over the third comparative example with respect to that concentration of the stress at the valve main body 850 can be avoided while decreasing the stress generated at the valve main body 850 when the supply check valve 61 is deformed to its maximum degree.

As described above, in the present embodiment, the supply check valve 61 and the recycle check valve 62, each of which includes the valve main body 850, are provided. The supply check valve 61 and the recycle check valve 62 are installed at the inside of the spool 50. In the present embodiment, the spool 50 is the tubular member and includes the supply passages 54 and the recycle passages 57, which serve as the inflow holes that communicate between the outer peripheral wall and the inner peripheral wall of the spool 50. Each of the supply passages 54 and the recycle passages 57 is configured to enable the flow of the hydraulic oil to the inside of the spool 50 through the corresponding ones of the supply passages 54 and the recycle passages 57 and limit the flow of the hydraulic oil from the inside of the spool 50 toward the corresponding ones of the supply passages 54 and the recycle passages 57. The valve main body 850 is shaped in the tubular form by rolling the single plate material.

In the free state of each of the supply check valve 61 and the recycle check valve 62, the valve main body 850 has: the constant curvature portion 861 that has the constant curvature and is located at a specific portion of the valve main body 850 between the inner end 851, which is the one circumferential end of the valve main body 850, and the outer end 852, which is the other circumferential end of the valve main body 850; and the small curvature portion 871 that has the curvature smaller than the curvature of the constant curvature portion 861 and is located at another portion of the valve main body 850, which is other than the constant curvature portion 861. Thus, the timing of starting the deformation of the inner end 851 side portion of the valve main body 850 can be delayed relative to the timing of starting the deformation of the outer end 852 side portion of the valve main body 850 when the check valve 61, 62 is radially inwardly deformed to shrink and is opened at the inside of the spool 50 by the flow of the hydraulic oil applied from the corresponding ones of the supply passages 54 and the recycle passages 57. Therefore, it is possible to limit the phenomenon, in which the inner end 851 acts as the support point, and the stress caused by the bias of the load is generated at the location that is circumferentially displaced from the inner end 851 by about 90°. Thus, the deformation or the damage of the supply check valve 61 and the recycle check valve 62 can be limited. In the present embodiment, the valve main body 850 of each of the supply check valve 61 and the recycle check valve 62 is formed such that the inner end 851 and the outer end 852 do not overlap with each other in the circumferential direction in the free state of each of the supply check valve 61 and the recycle check valve 62.

Other Embodiments

The above embodiments illustrate the example in which the sleeve 40 and the spool 50 of the passage change valve 11 are placed at the center of the vane rotor 30. In another embodiment of the present disclosure, the passage change valve 11 may be placed at a location, such as the outside of the housing 20, which is other than the center of the vane rotor 30.

The above embodiments illustrate the primary control passages 55, which are connectable to the primary control ports, and the secondary control passages 56, which are connectable to the secondary control ports, as the control passages formed at the spool 50. In another embodiment of the present disclosure, a common control passage, which is connectable to the primary control ports and the secondary control ports, may be formed at the spool 50. In this case, a drain passage connected to each of the control ports may be formed at the spool.

The sixth embodiment illustrates the example, in which the valve main body 850 is formed to satisfy the relationship of R=0.58. In another embodiment of the present disclosure, the valve main body 850 may not be formed to satisfy the relationship of R=0.58. However, in view of the advantages that can be exerted, the valve main body 850 is preferably formed to satisfy the relationship of $0.29 < R < 0.77$.

The sixth embodiment illustrates the example, in which the small curvature portion 871 is formed to include the inner end 851 of the valve main body 850. In the state where the advance supply check valve 82 is installed at the inside of the inner sleeve 41, the end portion of the small curvature portion 871, which is opposite to the constant curvature portion 861, i.e., the inner end 851 of the small curvature portion 871 is spaced away from the inner peripheral wall of the constant curvature portion 861 (see FIG. 12). The end of the small curvature portion 871, which is opposite to the constant curvature portion 861, i.e., the inner end 851 of the small curvature portion 871 contacts the inner peripheral wall of the constant curvature portion 861 before the time, at which the advance supply check valve 82 is deformed to its maximum degree at the inside of the inner sleeve 41 by the flow of the hydraulic oil applied from the advance supply openings OAs (see FIG. 15). In another embodiment of the present disclosure, the end of the small curvature portion 871, which is opposite to the constant curvature portion 861, that is, the inner end 851 may contact the inner peripheral wall of the constant curvature portion 861 in the state where the advance supply check valve 82 is installed at the inside of the inner sleeve 41. Specifically, the valve main body 850 may be formed such that the inner end 851 contacts the inner peripheral wall of the outer end 852 side portion of the valve main body 850 in the state where the advance supply check valve 82 is installed at the inside of the inner sleeve 41. In this embodiment, the valve main body 850 can exert the spring force while avoiding the concentration of the stress at the valve main body 850 in the state where the valve main body 850 is installed at the inside of the inner sleeve 41.

In another embodiment of the present disclosure, the housing 20 and the crankshaft 2 may be connected by a transmission member, such as a belt, in place of the chain 6.

The above embodiments illustrate the example, in which the crankshaft 2 serves as the first shaft, and the camshaft 3 serve as the second shaft. In another embodiment of the present disclosure, the crankshaft 2 may serve as the second shaft, and the camshaft 3 may serve as the first shaft. Specifically, the vane rotor 30 may be fixed to the end of the crankshaft 2, and the housing 20 may be rotated synchronously with the camshaft 3.

The valve timing adjustment device 10 of the present disclosure may adjust the valve timing of the exhaust valves 5 of the engine 1.

As discussed above, the present disclosure is not limited to the above embodiments and can be implemented in various forms without departing from the scope thereof.

The present disclosure has been described with reference to the embodiments. However, the present disclosure should not be limited to the embodiments and the structures described therein. The present disclosure covers various modifications and variations on the scope of equivalents. Also, various combinations and forms as well as other combinations, each of which includes only one element or more or less of the various combinations, are also within the scope and spirit of the present disclosure.

What is claimed is:

1. A valve timing adjustment device for a drive force transmission path configured to transmit a drive force from a drive shaft to a driven shaft of an internal combustion engine so as to adjust a valve timing of a valve that is driven to open and close by the driven shaft, wherein the drive shaft is defined as a first shaft and the driven shaft is defined as a second shaft, the valve timing adjustment device comprising:

a housing configured to rotate synchronously with the first shaft, wherein the housing is configured to be rotatably supported by an end portion of the second shaft;

a vane rotor configured to be fixed to the end portion of the second shaft, the vane rotor includes one or more vanes that respectively partition an inside space of the housing into one or more primary hydraulic chambers and one or more secondary hydraulic chambers such that each of the one or more primary hydraulic chambers is located on a first circumferential side of a corresponding vane of the one or more vanes, and each of the one or more secondary hydraulic chambers is located on a second circumferential side of the corresponding vane, wherein the vane rotor is configured to rotate relative to the housing depending on a pressure of hydraulic oil supplied from a hydraulic oil supply source to the one or more primary hydraulic chambers or to the one or more secondary hydraulic chambers;

a cylindrical sleeve including:

one or more supply ports configured to communicate with the hydraulic oil supply source;

one or more primary control ports configured to respectively communicate with the one or more primary hydraulic chambers; and
one or more secondary control ports configured to respectively communicate with the one or more secondary hydraulic chambers;
a cylindrical spool configured to reciprocate in an axial direction inside the sleeve, the spool including:
a pressure accumulation space formed inside the spool;
one or more supply passages configured to respectively connect the pressure accumulation space to the one or more supply ports;
one or more control passages configured to respectively connect the pressure accumulation space to the one or more primary control ports or the one or more secondary control ports; and
one or more recycle passages configured to respectively connect the pressure accumulation space to the one or more primary control ports or the one or more secondary control ports;
a supply check valve configured to enable a flow of the hydraulic oil from the hydraulic oil supply source toward the pressure accumulation space through the one or more supply passages and to limit a flow of the hydraulic oil from the pressure accumulation space toward the hydraulic oil supply source through the one or more supply passages;
a recycle check valve configured to enable a flow of the hydraulic oil from the one or more primary hydraulic chambers or the one or more secondary hydraulic chambers toward the pressure accumulation space through the one or more recycle passages to limit a flow of the hydraulic oil from the pressure accumulation space toward the one or more primary hydraulic chambers or the one or more secondary hydraulic chambers through the one or more recycle passages; and
a shaft placed on a radially inner side of the supply check valve and the recycle check valve;
wherein a characteristic of a valve opening of the supply check valve is different from a characteristic of a valve opening of the recycle check valve;
the shaft, the supply check valve and the recycle check valve are respectively made of a resilient plate material rolled in a tubular form; and
the shaft is formed integrally with the supply check valve and the recycle check valve in one-piece.

2. The valve timing adjustment device according to claim 1, wherein a valve opening pressure of the supply check valve is less than a valve opening pressure of the recycle check valve.

3. The valve timing adjustment device according to claim 1, wherein:
the supply check valve and the recycle check valve are arranged inside the spool.

4. The valve timing adjustment device according to claim 1, wherein a width of the supply check valve differs from a width of the recycle check valve.

5. The valve timing adjustment device according to claim 1, wherein:
a width and a plate thickness of the supply check valve are equal to a width and a plate thickness of the recycle check valve; and
a total passage cross sectional area of the one or more supply passages is different from a total passage cross sectional area of the one or more recycle passages.

6. The valve timing adjustment device according to claim 5, wherein an inner diameter of each of the one or more supply passages is equal to an inner diameter of each of the one or more recycle passages, and a number of the one or more supply passages is different from a number of the one or more recycle passages.

7. The valve timing adjustment device according to claim 1, wherein the sleeve is arranged at a center of the vane rotor.

8. A check valve for installation inside a tube member including one or more inflow holes that communicate between an outer peripheral wall of the tube member and an inner peripheral wall of the tube member, the check valve configured to enable a flow of fluid inside the tube member through the one or more inflow holes and to limit the flow of fluid from inside the tube member toward the one or more inflow holes, the check valve comprising:
a valve main body made of a single plate material rolled in a tubular form,
wherein in a free state of the check valve, the valve main body includes:
a constant curvature portion located at an outer end side of the valve main body in a circumferential direction;
a small curvature portion located at an inner end side of the valve main body in a circumferential direction such that a curvature of the small curvature portion is less than a curvature of the constant curvature portion; and
in the free state of the check valve, an inner end of the valve main body in the circumferential direction is radially spaced from an inner peripheral wall of a radially opposed portion of the valve main body, which is radially opposed to the inner end of the valve main body.

9. The check valve according to claim 8, wherein the small curvature portion is formed at the inner end.

10. The check valve according to claim 8, wherein the curvature of the small curvature portion in the free state of the check valve is greater than a curvature of the constant curvature portion in a state where the check valve is deformed to a maximum degree by the flow of fluid through the one or more inflow holes.

11. The check valve according to claim 8, wherein:
in an installed state of the check valve where the check valve is installed inside the tube member, the inner end of the valve main body is still spaced away from the inner peripheral wall when the flow of fluid is not applied to the check valve through the one or more inflow holes; and
the inner end contacts the inner peripheral wall before the check valve is deformed to a maximum degree by the flow of fluid through the one or more inflow holes.

12. The check valve according to claim 8, wherein in an installed state of the check valve where the check valve is installed inside the tube member, the inner end contacts the inner peripheral wall.

13. The check valve according to claim 8, wherein the valve main body is formed to satisfy a relationship of R>0.29 wherein:
R denotes a curvature reduction factor expressed by $(r_2-r_1)/(r_2-r_3)$;
$r_1$ denotes a radius of the small curvature portion measured in the free state of the check valve;
$r_2$ denotes a radius of the constant curvature portion measured in the free state of the check valve; and
$r_3$ denotes a radius of the constant curvature portion measured when the check valve is deformed to a maximum degree by the flow of fluid through the one or more inflow holes.

14. The check valve according to claim 13, wherein the valve main body is further formed to satisfy a relationship of R<0.77.

15. A valve timing adjustment device for a drive force transmission path configured to transmit a drive force from a drive shaft to a driven shaft of an internal combustion engine so as to adjust a valve timing of a valve that is driven to open and close by the driven shaft, wherein the drive shaft is defined as a first shaft and the driven shaft is defined as a second shaft, the valve timing adjustment device comprising:
- a housing configured to rotate synchronously with the first shaft, wherein the housing is configured to be rotatably supported by an end portion of the second shaft;
- a vane rotor configured to be fixed to the end portion of the second shaft, the vane rotor includes one or more vanes that respectively partition an inside space of the housing into one or more primary hydraulic chambers and one or more secondary hydraulic chambers such that each of the one or more primary hydraulic chambers is located on a first circumferential side of a corresponding vane of the one or more vanes, and each of the one or more secondary hydraulic chambers is located on a second circumferential side of the corresponding vane, wherein the vane rotor is configured to rotate relative to the housing depending on a pressure of hydraulic oil supplied from a hydraulic oil supply source to the one or more primary hydraulic chambers or to the one or more secondary hydraulic chambers;
- a cylindrical sleeve including:
  - one or more supply ports configured to communicate with the hydraulic oil supply source;
  - one or more primary control ports configured to respectively communicate with the one or more primary hydraulic chambers; and
  - one or more secondary control ports configured to respectively communicate with the one or more secondary hydraulic chambers;
- a cylindrical spool configured to reciprocate in an axial direction inside the sleeve, the spool including:
  - a pressure accumulation space formed inside the spool;
  - one or more supply passages configured to respectively connect the pressure accumulation space to the one or more supply ports;
  - one or more control passages configured to respectively connect the pressure accumulation space to the one or more primary control ports or the one or more secondary control ports; and
  - one or more recycle passages configured to respectively connect the pressure accumulation space to the one or more primary control ports or the one or more secondary control ports;
- a supply check valve configured to enable a flow of the hydraulic oil from the hydraulic oil supply source toward the pressure accumulation space through the one or more supply passages and to limit a flow of the hydraulic oil from the pressure accumulation space toward the hydraulic oil supply source through the one or more supply passages;
- a recycle check valve configured to enable a flow of the hydraulic oil from the one or more primary hydraulic chambers or the one or more secondary hydraulic chambers toward the pressure accumulation space through the one or more recycle passages and to limit a flow of the hydraulic oil from the pressure accumulation space toward the one or more primary hydraulic chambers or the one or more secondary hydraulic chambers through the one or more recycle passages; and
- a shaft member placed on a radially inner side of the supply check valve and the recycle check valve;
- wherein a characteristic of a valve opening of the supply check valve is different from a characteristic of a valve opening of the recycle check valve;
- the supply check valve and the recycle check valve are respectively made of a resilient plate material rolled in a tubular form that circumferentially extends all around the shaft member;
- the shaft member is configured to enable resilient deformation of each of the supply check valve and the recycle check valve in a radial direction and limit movement of each of the supply check valve and the recycle check valve relative to the shaft member in the axial direction; and
- the supply check valve and the recycle check valve are configured to move integrally with the cylindrical spool in the axial direction when the cylindrical spool is moved in the axial direction.

16. The valve timing adjustment device according to claim 15, wherein:
- the supply check valve is installed at a first cut-out of the shaft member; and
- the recycle check valve is installed at a second cut-out of the shaft member.

* * * * *